US012340300B1

(12) United States Patent
Abts et al.

(10) Patent No.: US 12,340,300 B1
(45) Date of Patent: Jun. 24, 2025

(54) STREAMING PROCESSOR ARCHITECTURE

(71) Applicant: Groq, Inc., Mountain View, CA (US)

(72) Inventors: Dennis Charles Abts, Mountain View, CA (US); Jonathan Alexander Ross, Mountain View, CA (US)

(73) Assignee: Groq, Inc., Mountain View, CA (US)

( * ) Notice: Subject to any disclaimer, the term of this patent is extended or adjusted under 35 U.S.C. 154(b) by 242 days.

(21) Appl. No.: 17/203,214

(22) Filed: Mar. 16, 2021

Related U.S. Application Data

(63) Continuation of application No. 17/103,910, filed on Nov. 24, 2020, now abandoned, and a continuation-in-part of application No. 16/928,958, filed on Jul. 14, 2020, now Pat. No. 11,307,827, and a continuation-in-part of application No. 16/132,196, filed on Sep. 14, 2018, now Pat. No. 11,114,138, and (Continued)

(51) Int. Cl.
G06N 3/063 (2023.01)
G06F 9/30 (2018.01)
G06F 18/214 (2023.01)
G06N 3/08 (2023.01)

(52) U.S. Cl.
CPC ........... *G06N 3/063* (2013.01); *G06F 9/3001* (2013.01); *G06F 9/30036* (2013.01); *G06F 18/214* (2023.01); *G06N 3/08* (2013.01)

(58) Field of Classification Search
CPC ..... G06N 3/063; G06F 18/214; G06F 9/3001; G06F 9/30036
See application file for complete search history.

(56) References Cited

U.S. PATENT DOCUMENTS 4,670,856 A 6/1987 Nishino et al.
5,058,001 A 10/1991 Li
(Continued)

FOREIGN PATENT DOCUMENTS

CN 108073983 A 5/2018
CN 108459995 A 8/2018
(Continued)

OTHER PUBLICATIONS

Abts, D. et al., "Think Fast: A Tensor Streaming Processor (TSP) for Accelerating Deep Learning Workloads," 2020 ACM/IEEE 47th Annual International Symposium on Computer Architecture, May 2020, pp. 145-158.

(Continued)

*Primary Examiner* — Zachary K Huson
(74) *Attorney, Agent, or Firm* — Dority & Manning, P.A.

(57) ABSTRACT

Improved placement of memory and functional modules, 'tiles', within a tiled processor architecture are disclosed for linear algebra calculations involving vectors and matrices comprising large amounts of data. The improved placement places the data in close proximity to the functional modules performing calculations using the data. These modules enable these calculations to be performed more quickly while using less energy. These modules, in particular, improve the efficiency of the training and application of deep learning and artificial neural network systems. This Abstract and the independent Claims are concise signifiers of embodiments of the claimed inventions. The Abstract does not limit the scope of the claimed inventions.

10 Claims, 30 Drawing Sheets

Related U.S. Application Data a continuation-in-part of application No. 16/932,632, filed on Jul. 17, 2020, now Pat. No. 11,165,428, and a continuation-in-part of application No. 16/243,768, filed on Jan. 9, 2019, now Pat. No. 11,115,147, and a continuation-in-part of application No. 16/951,938, filed on Nov. 18, 2020, and a continuation-in-part of application No. 16/526,916, filed on Jul. 30, 2019, now Pat. No. 11,210,594, and a continuation-in-part of application No. 16/561,516, filed on Sep. 5, 2019, now Pat. No. 11,136,116, and a continuation-in-part of application No. 16/526,936, filed on Jul. 30, 2019, now Pat. No. 11,568,275, and a continuation-in-part of application No. 16/277,817, filed on Feb. 15, 2019, now Pat. No. 10,908,900, and a continuation-in-part of application No. 16/686,858, filed on Nov. 18, 2019, now Pat. No. 11,455,370, and a continuation-in-part of application No. 16/686,864, filed on Nov. 18, 2019, now Pat. No. 11,204,976, and a continuation-in-part of application No. 16/686,866, filed on Nov. 18, 2019, now Pat. No. 11,301,546, and a continuation-in-part of application No. 16/686,870, filed on Nov. 18, 2019, now Pat. No. 11,537,687.

(56) References Cited

U.S. PATENT DOCUMENTS

| | | |
|---|---|---|
| 5,146,543 A | 9/1992 | Vassiliadis et al. |
| 5,179,702 A | 1/1993 | Spix et al. |
| 5,333,279 A | 7/1994 | Dunning |
| 5,379,440 A | 1/1995 | Kelly et al. |
| 5,488,729 A | 1/1996 | VeQesna et al. |
| 5,541,914 A | 7/1996 | Krishnamoorthy et al. |
| 5,590,083 A | 12/1996 | Pinkham et al. |
| 5,594,915 A | 1/1997 | Atalla |
| 5,794,062 A | 8/1998 | Baxter |
| 5,796,745 A | 8/1998 | Adams et al. |
| 5,842,034 A | 11/1998 | Bolstad et al. |
| 5,889,413 A | 3/1999 | Bauer |
| 5,898,881 A | 4/1999 | Miura et al. |
| 5,958,041 A | 9/1999 | Petolino, Jr. et al. |
| 6,181,164 B1 | 1/2001 | Miller |
| 6,243,808 B1 | 6/2001 | Wang |
| 6,279,057 B1 | 8/2001 | Westby |
| 6,298,162 B1 | 10/2001 | Sutha et al. |
| 6,304,953 B1 | 10/2001 | Henstrom et al. |
| 6,681,316 B1 | 1/2004 | Clermidy et al. |
| 6,712,313 B2 | 3/2004 | Zoppitelli et al. |
| 6,988,181 B2 | 1/2006 | Saulsbury et al. |
| 7,015,913 B1 | 3/2006 | Lindholm et al. |
| 7,181,484 B2 | 2/2007 | Stribaek et al. |
| 7,236,995 B2 | 6/2007 | Hinds |
| 7,272,730 B1 | 9/2007 | Acquaviva et al. |
| 7,339,941 B2 | 3/2008 | Twomey |
| 7,421,559 B1 | 9/2008 | Yadav |
| 7,640,528 B1 | 12/2009 | Baeckler |
| 7,805,392 B1 | 9/2010 | Steele et al. |
| 7,861,060 B1 | 12/2010 | Nickolls et al. |
| 7,912,889 B1 * | 3/2011 | Juffa .................. G06F 17/16 708/607 |
| 7,965,725 B2 | 6/2011 | Langevin et al. |
| 8,038,539 B2 | 10/2011 | Stamps et al. |
| 8,089,959 B2 | 1/2012 | Szymanski |
| 8,250,555 B1 | 8/2012 | Lee et al. |
| 8,255,765 B1 | 8/2012 | Yeo et al. |
| 8,286,172 B2 | 10/2012 | Chakradhar et al. |
| 8,345,540 B2 | 1/2013 | Rollins |
| 8,370,280 B1 | 2/2013 | Lin et al. |
| 8,407,167 B1 | 3/2013 | Abts et al. |
| 8,583,895 B2 | 11/2013 | Jacobs et al. |
| 8,655,937 B1 | 2/2014 | Vanderspek |
| 8,689,202 B1 | 4/2014 | Braun et al. |
| 8,830,993 B1 | 9/2014 | Dublin et al. |
| 8,850,262 B2 | 9/2014 | Cardinell et al. |
| 8,989,220 B2 | 3/2015 | Scrobohaci et al. |
| 9,009,660 B1 | 4/2015 | Griffin et al. |
| 9,146,747 B2 | 9/2015 | Moloney et al. |
| 9,304,775 B1 * | 4/2016 | Lindholm ............. G06F 9/3851 |
| 9,388,862 B2 | 7/2016 | Lidak |
| 9,432,298 B1 | 8/2016 | Smith |
| 9,442,757 B2 | 9/2016 | Munshi et al. |
| 9,535,869 B2 | 1/2017 | Zheng |
| 9,639,490 B2 | 5/2017 | Blankenship et al. |
| 9,672,188 B2 | 6/2017 | Vorbach |
| 9,690,938 B1 | 6/2017 | Saxe et al. |
| 9,691,019 B1 | 6/2017 | Gulland et al. |
| 9,697,463 B2 | 7/2017 | Ross et al. |
| 9,710,265 B1 | 7/2017 | Temam et al. |
| 9,710,748 B2 | 7/2017 | Ross et al. |
| 9,723,317 B2 | 8/2017 | Hattori |
| 9,805,303 B2 | 10/2017 | Ross et al. |
| 10,073,816 B1 * | 9/2018 | Lu ......................... G06F 17/14 |
| 10,167,800 B1 | 1/2019 | Chuna et al. |
| 10,175,980 B2 | 1/2019 | Temam et al. |
| 10,235,735 B2 | 3/2019 | Venkatesh et al. |
| 10,320,390 B1 | 6/2019 | Ross |
| 10,489,680 B2 | 11/2019 | Aliabadi et al. |
| 10,521,488 B1 | 12/2019 | Ross et al. |
| 10,621,269 B2 | 4/2020 | Phelps et al. |
| 10,754,621 B2 | 8/2020 | Thorson |
| 10,776,110 B2 | 9/2020 | Pearce et al. |
| 10,936,569 B1 | 3/2021 | Baskaran et al. |
| 10,970,362 B2 | 4/2021 | Phelps et al. |
| 11,086,623 B2 | 8/2021 | Valentine et al. |
| 11,210,594 B1 | 12/2021 | Ross et al. |
| 11,243,880 B1 | 2/2022 | Ross et al. |
| 11,467,841 B1 | 10/2022 | Tran |
| 11,652,484 B1 | 5/2023 | Gunter et al. |
| 11,868,250 B1 | 1/2024 | Ross et al. |
| 2001/0051860 A1 | 12/2001 | Copeland et al. |
| 2001/0052053 A1 | 12/2001 | Nemirovsky et al. |
| 2002/0060796 A1 | 5/2002 | Kanno et al. |
| 2002/0103961 A1 | 8/2002 | Ayukawa et al. |
| 2003/0095547 A1 | 5/2003 | Schofield |
| 2003/0206527 A1 | 11/2003 | Yim |
| 2004/0078555 A1 | 4/2004 | Porten et al. |
| 2004/0098563 A1 | 5/2004 | Parthasarathy et al. |
| 2004/0150543 A1 | 8/2004 | Wang et al. |
| 2004/0215679 A1 | 10/2004 | Beaumont |
| 2005/0125594 A1 | 6/2005 | Mattausch et al. |
| 2005/0147036 A1 | 7/2005 | Hammarlund et al. |
| 2005/0278505 A1 | 12/2005 | Lim et al. |
| 2006/0161338 A1 | 7/2006 | Sohn et al. |
| 2006/0179207 A1 | 8/2006 | Eisen et al. |
| 2006/0190519 A1 | 8/2006 | Stribaek et al. |
| 2006/0225061 A1 | 10/2006 | Ludwig et al. |
| 2007/0124732 A1 | 5/2007 | Lia et al. |
| 2008/0126761 A1 | 5/2008 | Fontenot et al. |
| 2008/0209181 A1 | 8/2008 | Petkov et al. |
| 2008/0244135 A1 | 10/2008 | Akesson et al. |
| 2008/0301354 A1 | 12/2008 | Bekooij |
| 2009/0138534 A1 | 5/2009 | Lee et al. |
| 2009/0150621 A1 | 6/2009 | Lee |
| 2011/0022791 A1 | 1/2011 | Iyer et al. |
| 2011/0173258 A1 | 7/2011 | Arimilli et al. |
| 2011/0273479 A1 | 11/2011 | Letellier et al. |
| 2011/0320698 A1 | 12/2011 | Wang et al. |
| 2012/0072699 A1 | 3/2012 | Vorbach et al. |
| 2012/0127818 A1 | 5/2012 | Levy et al. |
| 2012/0159507 A1 | 6/2012 | Kwon et al. |
| 2012/0240185 A1 | 9/2012 | Kapoor et al. |
| 2012/0260065 A1 | 10/2012 | Henry et al. |
| 2012/0275545 A1 | 11/2012 | Utsunomiya et al. |
| 2012/0303933 A1 | 11/2012 | Manet et al. |
| 2012/0317065 A1 | 12/2012 | Bernstein et al. |
| 2012/0331197 A1 | 12/2012 | Campbell et al. |
| 2013/0010636 A1 | 1/2013 | Regula |
| 2013/0070588 A1 | 3/2013 | Steele et al. |
| 2013/0212277 A1 | 8/2013 | Bodik et al. |

(56) References Cited

U.S. PATENT DOCUMENTS

| | | |
|---|---|---|
| 2014/0047211 A1 | 2/2014 | Fleischer et al. |
| 2014/0115301 A1 | 4/2014 | Sanghai et al. |
| 2014/0181171 A1 | 6/2014 | Dourbal |
| 2014/0201755 A1 | 7/2014 | Munshi et al. |
| 2014/0281284 A1 | 9/2014 | Block et al. |
| 2015/0046678 A1 | 2/2015 | Moloney et al. |
| 2015/0378639 A1 | 12/2015 | Chien et al. |
| 2015/0379429 A1 | 12/2015 | Lee et al. |
| 2016/0062947 A1* | 3/2016 | Chetlur ............. G06F 17/153 708/420 |
| 2016/0246506 A1 | 8/2016 | Hebig et al. |
| 2016/0328158 A1 | 11/2016 | Bromberg et al. |
| 2016/0337484 A1 | 11/2016 | Tola |
| 2016/0342892 A1 | 11/2016 | Ross |
| 2016/0342893 A1 | 11/2016 | Ross et al. |
| 2016/0371093 A1 | 12/2016 | Chang |
| 2016/0378471 A1 | 12/2016 | Lerzer et al. |
| 2017/0032281 A1 | 2/2017 | Hsu |
| 2017/0063609 A1 | 3/2017 | Philip et al. |
| 2017/0085475 A1 | 3/2017 | Cheng et al. |
| 2017/0103316 A1 | 4/2017 | Ross et al. |
| 2017/0139677 A1 | 5/2017 | Lutz et al. |
| 2017/0161037 A1 | 6/2017 | Henry et al. |
| 2017/0168990 A1* | 6/2017 | Kernert ............. G06F 17/16 |
| 2017/0177352 A1 | 6/2017 | Quid-Ahmed-Vall |
| 2017/0220719 A1 | 8/2017 | Elrabaa et al. |
| 2017/0316312 A1 | 11/2017 | Goyal et al. |
| 2017/0331881 A1* | 11/2017 | Chandramouli ........ H04L 67/12 |
| 2017/0347109 A1 | 11/2017 | Hendry et al. |
| 2017/0372202 A1 | 12/2017 | Ginsburg et al. |
| 2018/0046903 A1 | 2/2018 | Yao et al. |
| 2018/0046907 A1 | 2/2018 | Ross et al. |
| 2018/0075338 A1 | 3/2018 | Gokmen |
| 2018/0121196 A1 | 5/2018 | Temam et al. |
| 2018/0121796 A1 | 5/2018 | Deisher et al. |
| 2018/0145850 A1 | 5/2018 | Tam et al. |
| 2018/0157966 A1 | 6/2018 | Henry et al. |
| 2018/0191537 A1 | 7/2018 | Xiong et al. |
| 2018/0198730 A1 | 7/2018 | Cook et al. |
| 2018/0247190 A1 | 8/2018 | Chuna et al. |
| 2018/0267932 A1 | 9/2018 | Zhu et al. |
| 2018/0314671 A1 | 11/2018 | Zhang et al. |
| 2018/0315157 A1 | 11/2018 | Quid-Ahmed-Vall et al. |
| 2018/0329479 A1 | 11/2018 | Meixner |
| 2018/0357019 A1 | 12/2018 | Karr et al. |
| 2019/0089619 A1 | 3/2019 | Yeager et al. |
| 2019/0206454 A1 | 7/2019 | Ross et al. |
| 2019/0244080 A1 | 8/2019 | Li et al. |
| 2019/0303147 A1 | 10/2019 | Brewer |
| 2019/0311243 A1 | 10/2019 | Whatmough et al. |
| 2019/0370645 A1 | 12/2019 | Lee et al. |
| 2020/0117993 A1 | 4/2020 | Martinez-Canales et al. |
| 2020/0192701 A1 | 6/2020 | Horowitz et al. |
| 2020/0285605 A1 | 9/2020 | Nam |
| 2020/0310815 A1 | 10/2020 | Ayupov et al. |
| 2020/0310817 A1 | 10/2020 | Cook et al. |
| 2021/0312266 A1 | 10/2021 | Youn et al. |

FOREIGN PATENT DOCUMENTS

| | | |
|---|---|---|
| EP | 0940012 B1 | 4/2002 |
| EP | 3343463 A1 | 7/2018 |
| JP | 2017-062781 A | 3/2017 |
| TW | 200926033 A | 6/2009 |
| TW | 201706871 A | 2/2017 |
| TW | 201706917 A | 2/2017 |
| TW | 201732560 A | 9/2017 |
| TW | 201734764 A | 10/2017 |
| TW | 201804320 A | 2/2018 |
| TW | 201810538 A | 3/2018 |
| TW | 201833819 A | 9/2018 |
| WO | 01/52101 A2 | 7/2001 |
| WO | WO 2016/186826 A1 | 11/2016 |

OTHER PUBLICATIONS

Bouaziz, M. et al, "Parallel Long Short-Term Memory for Multi-Stream Classification", IEEE, Feb. 2017, pp. 218-223.

Bustamam, A. et al, "Fast Parallel Markov Clustering in Bioinformatics Using Massively Parallel Computing on GPU with CU DA and ELLPACK-R Sparse Format", IEEE, Dec. 2010, pp. 679-692.

Chang, W, "Computer Organization," CSC137. Sacramento State University, Spring Semester 2020, pp. 1-37.

De, A. et al., "Fast Integer Multiplication Using Modular Arithmetic," SIAM Journal on Computing, vol. 42, No. 2, Apr. 18, 2013, pp. 1-18.

Fuchs, R. et al, "Parallel Vectors Criteria for Unsteady Flow Vortices", IEEE, May 2008, pp. 615-626.

Gil-Cacho, J.M. et al, "Nonlinear Acoustic Echo Cancellation Based On a Parallel-Cascade Kernel Affine Projection Algorithm", IEEE, Mar. 2012, pp. 33-36.

Groq, "Groq Announces World's First Architecture Capable of 1,000,000,000,000,000 Operations per Second on a Single Chip," Nov. 14, 2019, three pages, [Online] [Retrieved on Jan. 12, 2021] Retrieved from the Internet <URL: https://www.prnewswire.com/news-releases/groq-announces-worlds-firstarchitecture-capable-of-1-000-000-000-000-000-operations-per-second-on-a-single-chip-300958743.html>.

Hai Dar, A. et al., "Harnessing GPU Tensor Cores for Fast FP16 Arithmetic to Speed up Mixed-Precision Iterative Refinement Solvers," SC18, Nov. 11-16, 2018, pp. 1-11.

Hu, Y. et al., "On-Chip Instruction Generation for Cross-Layer CNN Accelerator on FPGA," 2019 IEEE Computer Society Annual Symposium on VLSI (ISVLSI), Jul. 2019, pp. 7-12.

Johnson, J., "Making floating point math highly efficient for AI hardware," Nov. 8, 2018, nine pages, [Online] [Retrieved on Jan. 20, 2021] Retrieved from the Internet <URL: https://engineering.fb.com/2018/11/08/ai-research/floating-point-math/>.

Jouppi, N.P. et al., "In-Datacenter Performance Analysis of a Tensor Processing Unit," ISCA '17, Jun. 2017, pp. 1-12.

Lopes, A.R. et al., "A Fused Hybrid Floating-Point and Fixed-Point Dot-product for FPGAs," International Symposium on Applied Reconfigurable Computing, Mar. 2010, pp. 157-168.

Narksith, P. et al., "Switch adjusting on hierarchical shuffle-exchange networks for all-to-all personalized exchange," The 2013 10th International Joint Conference on Computer Science and Software Engineering, May 29-31, 2013, pp. 121-126.

PCT International Search Report and Written Opinion, PCT Application No. PCT/US20/62241, dated Feb. 11, 2021, 20 pages.

PCT International Search Report and Written Opinion, PCT Application No. PCT/US2019/048568, dated Nov. 20, 2019, 15 pages.

PCT International Search Report and Written Opinion, PCT Application No. PCT/US2019/062303, dated Mar. 25, 2020, 18 pages.

PCT International Search Report and Written Opinion, PCT Application No. PCT/US2019/068767, dated Mar. 17, 2020, 14 pages.

PCT International Search Report and Written Opinion. PCT Application No. PCT/US2019/022357, dated Nov. 7, 2019, 11 pages.

Ren, K. et al., "Permutation Capability of Optical Cantor Network", IEEE, Dec. 2007, pp. 398-403.

Rodrigues, C. et al, "SIMDization of Small Tensor Multiplication Kernels for Wide SIMD Vector Processors", ACM, Feb. 2018, pp. 1-8.

Suh, J. et al, "A Performance Analysis of PIM, Stream Processing, and Tiled Processing on Memory-Intensive Signal Processing Kernels", IEEE, Jun. 2003, pp. 1-10.

Taiwanese Intellectual Property Office, Office Action, TW Patent Application No. 108109969, dated Feb. 14, 2020, 12 pages (with concise explanation of relevance).

United States Office Action, U.S. Appl. No. 16/117,763, dated Oct. 24, 2019, 11 pages.

United States Office Action, U.S. Appl. No. 16/686,866, dated Sep. 23, 2021, eight pages.

United States Office Action, U.S. Appl. No. 16/132,243, dated Aug. 10, 2020, 20 pages.

United States Office Action, U.S. Appl. No. 16/132,243, dated Dec. 31, 2019, 15 pages.

(56) References Cited

OTHER PUBLICATIONS

United States Office Action, U.S. Appl. No. 16/686,858, dated Jan. 25, 2022, 12 pages.
United States Office Action, U.S. Appl. No. 16/686,864, dated Jun. 1, 2021, eiaht pages.
United States Office Action, U.S. Appl. No. 17/105,976, dated Sep. 30, 2021, 18 pages.
Van Gelder, A. et al, "Using PVsolve to Analyze and Locate Positions of Parallel Vectors", IEEE, Jul. 2009, pp. 682-695.
Waksman, A., "A Permutation Network," Journal of the Association for Computing Machinery, vol. 15, No. 1, Jan. 1968, pp. 159-163.
Wang, X. et al., "Hera: A Reconfigurable and Mixed-Mode Parallel Computing Engine on Platform FPGAS," Jan. 2004, pp. 1-6.
Wikipedia, "Complex instruction set computer," Last edited Dec. 27, 2020, pp. 1-5, [Online] [Retrieved Jan. 20, 2021] Retrieved from the Internet <URL: https://en.wikipedia.org/wiki/Complex instruction set computer>.
Wikipedia, "Harvard architecture," Last edited Mar. 4, 2020, pp. 1-4, [Online] [Retrieved Jan. 20, 2021] Retrieved from the Internet <URL: https://en.wikipedia.org/wiki/Harvard architecture>.
Wikipedia, "Instruction pipelining," Last edited Jan. 14, 2021, pp. 1-8, [Online] [Retrieved Jan. 8, 2021] Retrieved from the Internet <URL: https://en.wikipedia.org/wiki/Instruction pipelining>.
Wikipedia, "Parallel computing," Last edited Jan. 16, 2021, pp. 1-12, [Online] [Retrieved Jan. 22, 2021] Retrieved from the Internet <URL: https://en.wikipedia.org/wiki/Parallel_computing>.
Wikipedia, "Reduced instruction set computer," Last edited Jan. 14, 2021, pp. 1-10, [Online] [Retrieved Jan. 20, 2021] Retrieved from the Internet <URL: https://en.wikipedia.ora/wiki/Reduced_instruction_set_computer>.
Wikipedia, "SIMD," Last edited Dec. 18, 2020, pp. 1-9, [Online] [Retrieved Jan. 22, 2021] Retrieved from the Internet <URL: https://en.wikipedia.org/wiki/SIMD>.
Wikipedia, "Tensor," Last edited Jan. 10, 2021, pp. 1-20, [Online] [Retrieved Jan. 15, 2021] Retrieved from the Internet <URL: https://en.wikipedia.org/wiki/Tensor>.
Yang, X. et al., "Fast subword permutation instructions based on butterfly network," Proceedings of SPIE, Media Processor 2000, Jan. 27-28, 2000, pp. 80-86.
Korean Intellectual Property Office, Office Action, KR Patent Application No. 10-2021-7012323, dated Aug. 29, 2022, ten pages.
Taiwan Intellectual Property Office, Office Action, TW Patent Application No. 108131334, dated Jun. 30, 2022, six pages.
United States Office Action, U.S. Appl. No. 16/951,938, dated Feb. 4, 2022, six pages.
United States Office Action, U.S. Appl. No. 16/951,938, dated Aug. 17, 2021, 12 pages.
United States Office Action, U.S. Appl. No. 16/932,632, dated May 19, 2021, 13 pages.
United States Office Action, U.S. Appl. No. 16/928,958, dated Sep. 21, 2021, 15 pages.
United States Office Action, U.S. Appl. No. 16/928,958, dated Jul. 23, 2021, 15 pages.
United States Office Action, U.S. Appl. No. 16/928,958, dated Jun. 4, 2021, 15 pages.
United States Office Action, U.S. Appl. No. 16/928,958, dated Apr. 12, 2021, 14 pages.
United States Office Action, U.S. Appl. No. 16/686,858, dated Jun. 29, 2022, 14 pages.
United States Office Action, U.S. Appl. No. 16/686,870, dated May 27, 2022, 19 pages.
United States Office Action, U.S. Appl. No. 16/526,936, dated Jul. 1, 2022, 12 pages.
United States Office Action, U.S. Appl. No. 16/277,817, dated May 20, 2020, 13 pages.
United States Office Action, U.S. Appl. No. 16/243,768, dated Apr. 26, 2021, 12 pages.
United States Office Action, U.S. Appl. No. 16/243,768, dated Sep. 1, 2020, 17 pages.
United States Office Action, U.S. Appl. No. 16/132,196, dated Dec. 8, 2020, 13 pages.
United States Office Action, U.S. Appl. No. 16/132,196, dated May 20, 2020, 22 pages.
United States Office Action, U.S. Appl. No. 16/132,196, dated Dec. 11, 2019, 20 pages.
United States Office Action, U.S. Appl. No. 17/397,158,dated Oct. 6, 2022, 17 pages.
Taiwan Intellectual Property Office, Taiwan Patent Application No. 108142039, dated Jan. 3, 2023, 25 pages.
United States Office Action, U.S. Appl. No. 17/528,609, dated Jan. 4, 2023, 14 pages.
United States Office Action, U.S. Appl. No. 17/532,694, dated Jan. 19, 2023, 14 pages.
Groq, Inc. "The Challenge of Batch Size 1: Groq Adds Responsiveness to Inference Performance" White Paper, Apr. 2020, pp. 1-7.
Indian Patent Office, Office Action, Indian Patent Application No. 202247031762, dated Sep. 20, 2022, 6 pages.
Lethin, R.A. et al. "How VLIW Almost Disappeared—and Then Proliferated," *IEEE Solid-State Circuits Magazine*, vol. 1, No. 3, Aug. 7, 2009, pp. 15-23.
Mercaldi, M. et al. "Instruction Scheduling for a Tiled Dataflow Architecture," *ACM SIGARCH Computer Architecture News*, vol. 34, No. 5, Oct. 20, 2006, pp. 141-150.
Sotiropoulos, A. et al. "Enhancing the Performance of Tiled Loop Execution onto Clusters Using Memory Mapped Network Interfaces and Pipelined Schedules," *ipdps*, Apr. 15, 2002, pp. 1-9.
Southard, D. "Tensor Streaming Architecture Delivers Unmatched Performance for Compute-Intensive Workloads" Groq White Paper, Nov. 18, 2019, pp. 1-7.
United States Office Action, U.S. Appl. No. 17/684,337, dated Feb. 14, 2023, 14 pages.
United States Office Action, U.S. Appl. No. 17/104,465, dated Nov. 12, 2021, 18 pages.
Non Final Office Action received for U.S. Appl. No. 17/519,425 dated Jan. 26, 2023, 17 pages.
Japan Patent Office, Office Action, Japanese Patent Application No. 2021-527941 dated Dec. 20, 2022, 11 pages (Including English Translation).
Notice of Allowance received for U.S. Appl. No. 17/519,425 dated Mar. 15, 2023, 25 pages.
Notice of Allowance received for U.S. Appl. No. 16/686,858 dated Aug. 3, 2022, 25 pages.
Notice of Allowance received for U.S. Appl. No. 16/686,864 dated Jul. 29, 2021, 14 pages.
Notice of Allowance received for U.S. Appl. No. 16/686,866 dated Dec. 7, 2021, 13 pages.
Notice of Allowance received for U.S. Appl. No. 16/686,870 dated Aug. 17, 2022, 54 pages.
Notice of Allowance received for U.S. Appl. No. 16/686,870 dated Aug. 24, 2022, 5 pages.
Notice of Allowance received for U.S. Appl. No. 16/686,870 dated Oct. 25, 2022, 5 pages.
Notice of Allowance received for U.S. Appl. No. 16/132,196 dated Apr. 30, 2021, 35 pages.
Notice of Allowance received for U.S. Appl. No. 17/397,158 dated Mar. 22, 2023, 39 pages.
Notice of Allowance received for U.S. Appl. No. 16/243,768 dated May 21, 2021, 30 pages.
Non Final Office Action received for U.S. Appl. No. 17/582,895 dated Apr. 6, 2023, 32 pages.
Notice of Allowance received for U.S. Appl. No. 16/951,938 dated Dec. 23, 2022, 33 pages.
Notice of Allowance received for U.S. Appl. No. 16/132,102 dated Jul. 1, 2021, 26 pages.
Notice of Allowance received for U.S. Appl. No. 16/526,916 dated Sep. 20, 2021, 28 pages.
Notice of Allowance received for U.S. Appl. No. 16/526,922 dated Aug. 27, 2021, 25 pages.
Notice of Allowance received for U.S. Appl. No. 16/526,936 dated Oct. 13, 2022, 23 pages.
Notice of Allowance received for U.S. Appl. No. 17/528,609 dated Jan. 30, 2023, 27 pages.

(56) References Cited

OTHER PUBLICATIONS

Non Final Office Action received for U.S. Appl. No. 16/117,763 dated Oct. 24, 2019, 17 pages.
Notice of Allowance received for U.S. Appl. No. 17/532,694 dated Feb. 10, 2023, 27 pages.
Notice of Allowance received for U.S. Appl. No. 16/932,632 dated Sep. 9, 2021, 25 pages.
Notice of Allowance received for U.S. Appl. No. 16/277,817 dated Sep. 30, 2020, 34 pages.
Notice of Allowance received for U.S. Appl. No. 16/928,958 dated Dec. 17, 2021, 16 pages.
Notice of Allowance received for U.S. Appl. No. 16/117,763 dated Apr. 14, 2020, 17 pages.
Notice of Allowance received for U.S. Appl. No. 16/117,763 dated Jun. 8, 2020, 5 pages.
Notice of Intent to Grant for European Patent Application Serial No. 19765954.3 dated Feb. 17, 2023, 41 pages.
Notice of Intent to Grant for European Patent Application No. 19765954.3 dated Oct. 17, 2022, 41 pages.
Communication Pursuant to Article 94(3) EPC received for European Patent Application Serial No. 19765954.3 dated Feb. 23, 2022, 8 pages.
Notice of Allowance received for U.S. Appl. No. 17/684,337, dated Apr. 13, 2023, 50 pages.
"Sotiropoulos et al., Enhancing the Performance of Tiled Loop Execution on to Clusters using Memory Mapped NetworkInterfaces and Pipelined Schedules, 2002, citation 1 page."
Notice of Allowance received for U.S. Appl. No. 17/697,201 dated Feb. 23, 2023, 37 pages.
Notice of Allowance received for U.S. Appl. No. 17/697,201 dated Mar. 7, 2023, 4 pages.
Non Final Office Action received for U.S. Appl. No. 16/132,243 dated Dec. 31, 2019, 28 pages.
Notice of Allowance received for U.S. Appl. No. 16/132,243 dated Jun. 22, 2021, 47 pages.
Notice of Allowance received for U.S. Appl. No. 16/132,243 dated Sep. 30, 2021, 42 pages.
Notice of Allowance received for U.S. Appl. No. 16/132,243 dated Dec. 15, 2021, 19 pages.
Notice of Allowance received for U.S. Appl. No. 16/526,966 dated Feb. 8, 2021, 45 pages.
Notice of Allowance received for U.S. Appl. No. 16/526,966 dated Jun. 21, 2021, 28 pages.
Notice of Allowance received for U.S. Appl. No. 16/526,966 dated Oct. 15, 2021, 30 pages.
Notice of Allowance received for U.S. Appl. No. 16/526,966 dated Jan. 5, 2022, 18 pages.
Communication Pursuant to Article 94(3) EPC received for European Patent Application Serial No. 19827878.0 dated May 22, 2023, 5 pages.
Decision to Grant received for Japanese Patent Application Serial No. 2021-527941 dated Mar. 28, 2023, 5 pages (Including English Translation).
Written Decision on Registration received for Korean Patent Application Serial No. KR20217012323 dated Apr. 24, 2023, 12 pages (Including English Translation).
Anindya Deyet al; "Fast Integer Multiplication Using Modular Arithmetic"; The proceedings of the 40th ACM Symposium on Theory of Computing, 2008.
Antonio Lopes et al; "A fused hybrid floating point and fixed point dot-ptoduct for FPGAs"; International symposium on Applied reconfigurable computing, ARC 2010, pp. 157-168.
Azzam Haidar et al;"Harnessing GPU Tensor Cores for Fast FP16 Arithmetic to Speed up Mixed-Precision Iterative Refinement Solvers"; SC18, Nov. 11-16, 2018, Dallas, USA.
Notice of Allowance received for U.S. Appl. No. 17/519,425 dated Jun. 20, 2023, 60 pages.
Non- Final office action received for U.S. Appl. No. 18/083,388 dated Jul. 14, 2023, 50 pages.
Notice of Allowance received for U.S. Appl. No. 17/684,337 dated Jul. 3, 2023, 91 pages.
Notice of Allowance received for U.S. Appl. No. 17/397,158 dated Aug. 23, 2023, 78 pages.
Notice of Allowance received for U.S. Appl. No. 16/951,938 dated Sep. 5, 2023, 81 pages.
Notice of Allowance received for U.S. Appl. No. 18/083,388 dated Aug. 31, 2023, 25 pages.
Notice of Allowance received for U.S. Appl. No. 17/582,895 dated Oct. 4, 2023, 12 pages.
Notice of Allowance received for U.S. Appl. No. 17/397,158 dated Oct. 2, 2023, 10 pages.
Notice of Allowance received for U.S. Appl. No. 16/951,938 dated Sep. 27, 2023, 102 pages.
Notice of Allowance received for U.S. Appl. No. 18/083,388 dated Oct. 4, 2023, 10 pages.
First Office Action received for Chinese Patent Application Serial No. 201980074328.9 dated Aug. 14, 2023, 6 pages (Including English Translation).
Decision to Grant a Patent received for European Patent Application Serial No. 19765954.3 dated Jun. 29, 2023, 2 pages.
Office Action received for Taiwan Patent Application Serial No. 11220743060 dated Aug. 1, 2023, 4 pages.
Office Action received for Chinese Patent Application Serial No. 201880006508.9 dated Jul. 19, 2023, 7 pages.
Second Office Action received for Chinese Patent Application Serial No. 201980074328.9 dated Mar. 23, 2024, 7 pages(Including English Translation).
Notice of Allowance received for Taiwanese Patent Application Serial No. 108142041 dated Jan. 12, 2024, 4 pages (Original Copy Only).
Notice of Allowance received for U.S. Appl. No. 17/397,158 dated Dec. 1, 2023, 10 pages.
Notice of Allowance received for U.S. Appl. No. 16/951,938 dated Nov. 22, 2023, 15 pages.
Notice of Allowance received for U.S. Appl. No. 16/951,938 dated Dec. 11, 2023, 10 pages.
Notice of Allowance received for U.S. Appl. No. 18/083,388 dated Nov. 24, 2023, 10 pages.
Notice of Allowance received for U.S. Appl. No. 17/582,895 dated Dec. 1, 2023, 6 pages.
Office Action received for Taiwan Patent Application Serial No. 108142038 dated Mar. 31, 2023, 11 pages(Including English Translation).
Request for the Submission of an Opinion received for Korean Patent Application Serial No. 10-2023-7025325 dated Feb. 28, 2024, 6 pages (Including English Translation).
Kye et al., "CPU-based Real-time Maximum Intensity Projection Via Fast Matrix Transposition Using Parallelization Operations with AVX Instruction Set", Multimedia Tools and Applications, vol. 77, 2018 , pp. 15971-15994.
Non Final Office Action received for U.S. Appl. No. 18/482,558 dated May 9, 2024, 67 pages.
Non Final Office Action received for U.S. Appl. No. 18/351,916 dated Jun. 20, 2024, 96 pages.
Non Final Office Action received for U.S. Appl. No. 18/405,203 dated Jul. 12, 2024, 75 pages.
Notification to Grant Patent Right for Invention received for Chinese Patent Application Serial No. 201980074328 dated Jun. 17, 2024, 4 pages(Including English Translation).
Office Action received for Taiwan Patent Application Serial No. 108142040 dated May 28, 2024, 12 pages(Including English Translation).
Notice of allowance received for U.S. Appl. No. 18/351,916 dated Sep. 30, 2024, 33 pages.
Notice of allowance received for U.S. Appl. No. 18/389,984 dated Aug. 28, 2024, 249 pages.
Notice of allowance received for U.S. Appl. No. 18/389,984 dated Sep. 11, 2024, 10 pages.
Non-Final office action received for U.S. Appl. No. 18/394,442 dated Sep. 20, 2024, 72 pages.
"RISC-V Assembler: Load Store—Project F", URL: https://projectf.io/posts/riscv-load-store/, Feb. 15, 2024, 7 pages.

(56) References Cited

OTHER PUBLICATIONS

Notice of allowance received for U.S. Appl. No. 18/405,203 dated Oct. 1, 2024, 39 pages.

* cited by examiner

*Note: l is the number of layers of the neural network*

For counter = 1 upto Niter

Choose an integer k uniformly at random from $\{1, 2, 3, \ldots, N\}$ $x^{(k)}$ is current training data point $a^{[1]} = x^{(k)}$ For l = 2 upto L $z^{[l]} = W^{[l]} a^{[l-1]} + b^{[l]}$ $a^{[l]} = \sigma(z^{[l]})$ $D^{[l]} = \text{diag } \sigma'(z^{[l]})$ end $\delta^{[L]} = D^{[L]} (a^{[L]} - y(x^{(k)}))$ For l = L − 1 downto 2

$\delta^{[l]} = D^{[l]}(W^{[l+1]})^T \delta^{[l+1]}$ end

For l = L downto 2

$W^{[l]} \rightarrow W^{[l]} - \eta \, \delta^{[l]} a^{[l-1]T}$ $b^{[l]} \rightarrow b^{[l]} - \eta \, \delta^{[l]}$ end end

FIG. 2
*(PRIOR ART)*

| Function | Instruction | Description |
|---|---|---|
| ICU | Nop N | No-operation, can be repeated N times to delay by N cycles |
| | Ifetch | Fetch instructions from streams or local memory |
| | Sync | Parks at the head of the instruction dispatch queue to await barrier notification |
| | Notify | Releases the pending barrier operations causing instruction flow to resume |
| | Config | Configure low-power mode |
| | Repeat n,d | Repeat the previous instruction n times, with d cycles between iterations |
| MEM | Read a,s | Load vector at address a onto stream s |
| | Write a,s | Store stream s register contents into main memory address a |
| | Gather s, map | Indirectly read addresses pointed to by map putting onto stream s |
| | Scatter s, map | Indirectly store stream s into address in the map stream |
| VXM | Unary operation | z = op x point-wise operation on 1 operand, x, producing 1 result, z (eg. mask, negate) |
| | Binary operation | z = x op y point-wise operations with 2 operands x and y producing 1 result, z (e.g. add, mul, sub) |
| | Type conversions | Converting fixed point to floating point, and vice versa |
| | ReLU | Rectified linear unit activation function max(0,x) |
| | TanH | Hyperbolic tangent - activation function |
| | Exp | exponentiation $e^x$ |
| | RSqrt | Reciprocal square root |
| MXM | LW | Load weights (LW) from streams to weight buffer |
| | IW | Install weights (IW) from streams or LW buffer into the 320x320 array |
| | ABC | Activation buffer control (ABC) to initiate and coordinate arriving activations |
| | ACC | Accumulate (ACC) either INT32 or FP32 result from MXM |
| SXM | Shift up/down N | Lane-shift streams up/down by N lanes, and Select between North/South shifted vectors |
| | Permute map | Bijective permute 320 inputs $\xrightarrow{map}$ outputs |
| | Distribute map | Rearrange or replicate data within a superlane (16 lanes) |
| | Rotate stream | Rotate n x n input data to generate $n^2$ output streams with all possible rotations (n= 3 or n=4) |
| | Transpose sg16 | Transpose 16 x 16 elements producing 16 output streams with rows and columns interchanged |
| C2C | Deskew | Manage skew across plesiochronous links |
| | Send | Send a 320-byte vector |
| | Receive | Receive a 320-byte vector, emplacing it in main memory |

*FIG. 16*

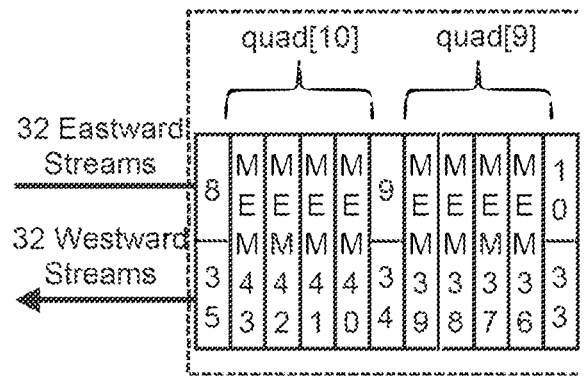
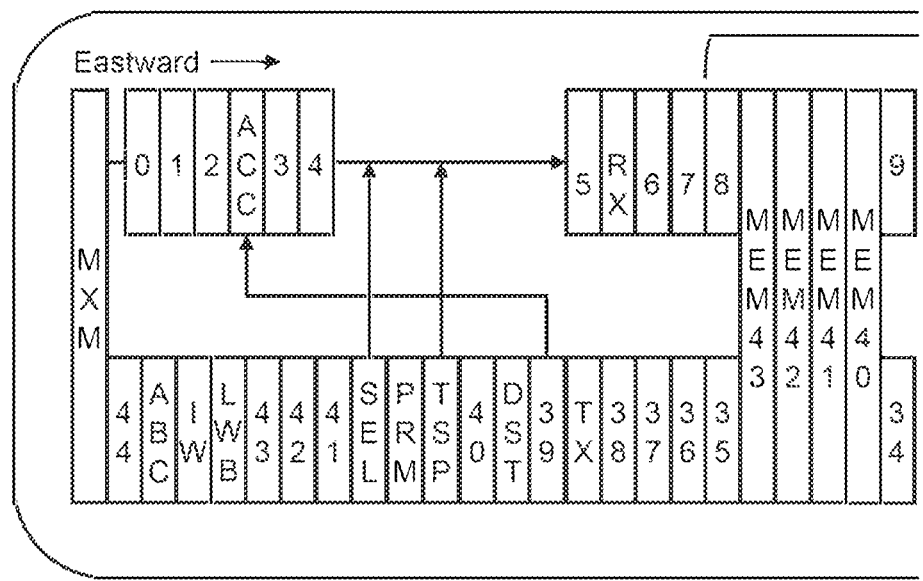
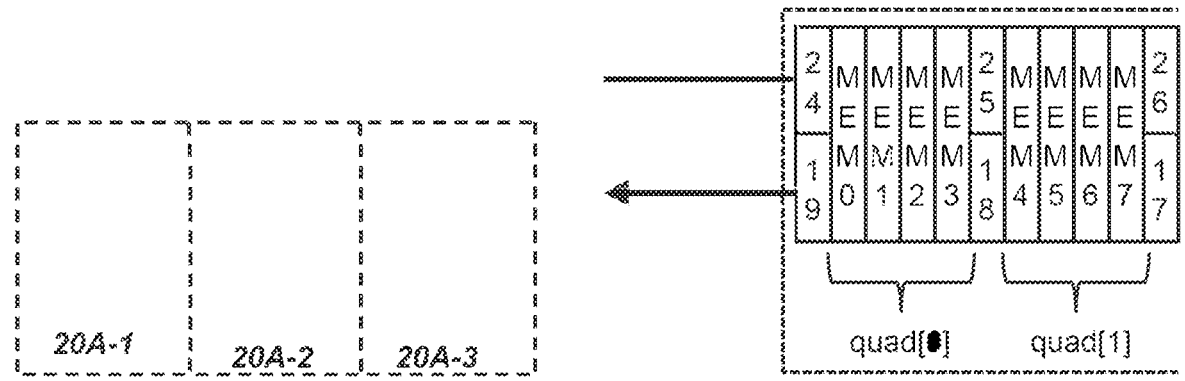
FIG. 20A
FIG. 20A-1

STREAMING PROCESSOR ARCHITECTURE

RELATED APPLICATIONS

This application is a continuation of the U.S. application Ser. No. 17/103,910, filed Nov. 24, 2020, which is a continuation-in-part of U.S. Application Ser. No. 16/277,817, filed Feb. 15, 2019, now U.S. Pat. No. 10,908,900, issued Feb. 2, 2021. This application is a continuation-in-part of U.S. application Ser. No. 16/928,958, filed Jul. 14, 2020, now U.S. Pat. No. 11,307,827, issued Apr. 19, 2022. This application is a continuation-in-part of U.S. application Ser. No. 16/132,196, filed Sep. 14, 2018, now U.S. Pat. No. 11,114,138, issued Sep. 7, 2021. This application is a continuation-in-part of U.S. application Ser. No. 16/932,632, filed Jul. 17, 2020, now U.S. Pat. No. 11,165,428, issued Nov. 2, 2021. This application is a continuation-in-part of U.S. application Ser. No. 16/951,938, filed Nov. 18, 2020, now U.S. Pat. No. 11,868,804, issued Jan. 9, 2024. This application is a continuation-in-part of U.S. application Ser. No. 16/526,916, filed Jul. 30, 2019, now U.S. Pat. No. 11,210,594, issued Dec. 28, 2021. This application is a continuation-in-part of U.S. application Ser. No. 16/526,936, filed Jul. 30, 2019, now U.S. Pat. No. 11,568,275, issued Jan. 31, 2023. This application is a continuation-in-part of U.S. application Ser. No. 16/686,858, filed Nov. 18, 2019, now U.S. Pat. No. 11,455,370, issued Sep. 27, 2022. This application is a continuation-in-part of U.S. application Ser. No. 16/686,864, filed Nov. 18, 2019, now U.S. Pat. No. 11,204,976, issued Dec. 21, 2021. This application is a continuation-in-part of U.S. application Ser. No. 16/686,866, filed Nov. 18, 2019, now U.S. Pat. No. 11,301,546, issued Apr. 12, 2022. This application is a continuation-in-part of U.S. application Ser. No. 16/686,870, filed Nov. 18, 2019, now U.S. Pat. No. 11,537,687, issued Dec. 27, 2022. All of which are incorporated by reference in their entirety.

COPYRIGHT NOTICE

This patent document can be exactly reproduced as it appears in the files of the United States Patent and Trademark Office, but the assignee(s) otherwise reserves all rights in any subsets of included original works of authorship in this document protected by 35 USC 102(a) of the U.S. copyright law.

SPECIFICATION—DISCLAIMERS

In the following Background, Summary, and Detailed Description, paragraph headings are signifiers that do not limit the scope of an embodiment of a claimed invention Extended Care Information Network (ECIN). The citation or identification of any publication signifies neither relevance nor use as prior art. A paragraph for which the font is all italicized signifies text that exists in one or more patent specifications filed by the assignee(s). The italicized paragraphs herein are version November 2020.

A writing enclosed in double quotes (" ") signifies an exact copy of a writing that has been expressed as a work of authorship. Signifiers, such as a word or a phrase enclosed in single quotes (' '), signify a term that as of yet has not been defined and that has no meaning to be evaluated for, or has no meaning in that specific use (for example, when the quoted term 'module' is first used) until defined.

TECHNICAL FIELD

The present disclosure generally relates to a tensor streaming processor architecture.

BACKGROUND

Over the last decade, data center operators have installed many-core processor systems in warehouse-scale computers. These systems have dozens to thousands of processing cores that vary widely in form and function, are used in powerful graphical processing units (GPUs), tensor processing units (TPUs), field programmable gate arrays (FPGAs), with many using data network controllers for efficient remote memory access. Such systems are often used for accelerating deep neural network training and inference (application of the trained neural network) performance for a wide range of uses in commerce, for example, convolutional neural networks (CNNs) for recommendation algorithms, computer vision and image classification for product searching; and recurrent neural networks (RNNs) for natural language processing in user interfaces. The heightened computational requirements of these models, may of which involve very large numbers of vector and matrix calculations, when used for millions of consumers and billions of transactions, have been the catalyst for a resurgence of architectural innovation.

In a conventional chip multiprocessor (CMP), processing cores are interconnected using an on-chip network to exchange data between all of the processing cores. In this simple load-store model, a set of general-purpose data registers are used as intermediate storage between the main memory systems and the processor cores, which can include arithmetic logic units (ALUs), that operate on data. Instructions are dispatched to each core and executed by the local integer or floating-point processing modules, while intermediate results are stored in the general-purpose registers. This load-store architecture moves data (also referred to as 'operands') and computed results between the registers and main memory. Instruction execution is often carried out over several stages: 1) instruction fetch, 2) instruction decode, 3) execution on ALUs, 4) memory read, and 5) memory write to update the results in the registers.

However, workloads for CMPs continue to grow both in size and complexity, presenting serious scalability, performance, and usability demands for traditional CMP architectures. Efficiently managing this demand requires abundant on-chip ALUs for the vector and matrix calculations, used at near-peak performance levels throughout program execution. Unfortunately, hardware complexity and scheduling of many of these architectures makes it difficult to prevent runtime stalls. Furthermore, while architectural enhancements such as caches, branch predictors, and prefetchers help tremendously in improving performance, they do not bound worst-case performance.

One of the most important early vector-matrix algorithms of the $20^{th}$ century was the Fast Fourier Transform (FFT), an algorithm that converts a vector of data signal values into another vector of frequency values. The straightforward implementation of a numerical Fourier transform is to multiply a signal vector S with N members by a N-by-N two dimensional matrix W that represents the numerical coefficients of the Fourier Transforms (typically imaginary powers of the exponential function, $e^{ix}$) to produce a frequency vector F with N members. However, James Cooley and John Tukey invented in 1965 the Fast Fourier Transform for any N (earlier versions were restricted to N being a power of two) that performed the transform more quickly by breaking up the calculations into a smaller set of calculations. FIG. 1A shows an FFT algorithm for an 8 signal-value FFT broken up into two 4 signal-value FFTs which are broken up into four 2 signal-value FFTs, the computational mathematics of which is easy. FIG. 1B shows a matrix for performing the quantum Fourier transform (a very important function in quantum computing) with similar decomposition of the calculations.

FIGS. 1A and 1B also hints at some of the problems when using the FFT (and similar vector-matrix algorithms) for tremendous amounts of data. The first problem is memory access, that is reading and writing calculation results in and out of main memory. The second problem is rearrangement of data by the FFT algorithm, a cost to enable the benefit of a faster Fourier transform calculation (in FIG. 1A, the input values x[0] to x[7] are rearranged so that the output values are in the correct order). With modern day computers, with gigabytes of memory and gigahertz clock speeds, moving calculation results in and out of main memory, to be transferred to the algorithm processor, is not a burden. Nor is there much of a burden to rearrange/permute the data, either at input or output—indeed, a variety of algorithms have been written over the decades to do this more efficiently. However, when the size of the signal vector is in the billions of members, then the amount of time and energy used in performing the calculations is a small fraction of just moving data in and out of the processor.

In the $21^{st}$ century, especially due to the demands of processing marketing and commerce transactions using the Internet, with needs for classifying and learning the shopping needs of consumers to offer them targeted advertisements and product descriptions, there arose a tremendous amount of large-scale multivariate statistical analysis known with many descriptors, including machine learning and intelligent artificial neural network classifiers. The huge search engines of Google, Amazon, Microsoft, Alibaba and others are processing each day consumer browsing and shopping data for hundreds of millions of people. In their systems, the online behavior of these consumers can be represented in lengthy vectors that characterize the consumer's behavior. These vectors are then used to 'train' (adjust the coefficients of) two-dimensional matrices that numerically encode decision boundaries for different types of behavior, such as people who like to buy Dunkin Donut chocolate donuts on Tuesday.

FIG. 2 is an example of the type of vector-matrix algorithms that arise in determining the coefficients of these two-dimensional matrices, in this case, a back-propagation neural network algorithm using stochastic gradient convergence techniques for the coefficients. A key constraint is seen in the $6^{th}$ line of the algorithm, $z^{[l]}=W^{[l]}a^{[l-1]}+b^{[l]}$, where W is a matrix of coefficients of one layer of the neural network, and a is a vector of various transformed values of the input training vectors. Much like with the FFT, modern day (super)computers can handle large dimensions of vectors and matrices with large numbers of sample points (one type of sample point being the behavior of a consumer). But when the number of sample points is in the billions, and the dimensions of the vectors and matrices representing consumers is in the hundreds, then again, the amount of time and energy used in performing the calculations can be a small fraction of moving data in and out of the processor.

Not surprisingly, some of these large Internet companies for commercial reasons, and university groups for research and training reasons, in the last ten years or so, have developed specialized processors to deal with this memory management problem.

For example, FIG. 3 depicts a processor architecture for solving large-scale partial differential equations (PDEs) such as for heat flow. Typically, these equations are solved by mapping the PDEs into a two-dimensional matrix representing the geometry of the problem, and the PDEs are solved with calculations that involve each element of the matrix and one or more of its neighbors. For small matrices, it is easy to create a matrix data structure in memory, load the matrix with initial conditions, and then move groups of data (a matrix element and its neighbors) into a processor for the calculations, and then moving the results back to memory. But when the size of the matrix is huge (corresponding to a high-resolution discretization of the problem), a tremendous amount of time and energy are used to move data in and out of memory. FIG. 3 depicts a Smart Memory Integrated Circuit (SMIC) architecture where dedicated register files (Reg File 0 to Ref File R) are in close proximity on the processor chip to the parallel processors (Execution Unit 1 to Execution Unit 4). The dedicated register files are each fed data from a dedicated memory block, and calculated upon by the parallel processors (which receive instructions from an instruction controller 25), but instead of returning to the respective memory block, the results are returned to the register files. And to shuffle data depending on the PDE algorithm being solved, there are cross-bar switches at the input and output sides of the processors. The architecture maps user space into SMICs 18-0, 18-1, respectively. The blocks 18-0 and 18-1 in FIG. 3 are simplified versions of block diagrams to show the mapping between the user space and SMICs only. SMIC 18-0 has four Data Memory Blocks DMB1 through DMB4 (29-1 through 29-4), and one Left Data Memory Block DMB0 (29-0), one Right Data Memory Blocks DMBR (29-5), to store data overlapped between two adjacent SMICs 18-0 and 18-1.

FIG. 4 depicts a similar memory buffering structure, with memory buffers between main memory and the parallel processors ("compute engine"). Instead of creating a loop pathway for the data, as in FIG. 3, the architecture of FIG. 4 passes data back and forward between the memory buffers, and the memory buffers can pass data between them.

FIG. 5 depicts an architecture that is a variant of those of FIGS. 3 and 4. In FIG. 5, each processing lane has the memory and switching circuits all appearing before the data flows in the processors (FPU, MUL, ALU), though again the output results are fed back into the memory and switching circuits. Each lane receives instructions from a controlling processor that transfers the instructions into the lane sequencer (this figure appears as FIG. 3b in a 2019 paper, "Ara: a 1 Ghz+ scalable and energy-efficient RISC-V vector processor with multi-precision floating point support in 22 nm FD-SOI").

We now turn to architectures more specific to neural networks and deep learning. One of the most well-known is Google's Tensor Processing Unit (TPU) architecture, which is a neural network-oriented variant of the architecture of FIG. 3. With Google's TPU, there are memories ("Unified Buffer") and switching units ("Systolic Data Setup") that feed data into a parallel matrix multiply structure ("Matrix Multiple Unit"), the output of which, after some post-processing ("Activation", "Normalize/Pool") is fed back into the memory and switching units. This structure is depicted in FIG. 6, from a 2017 paper, "In-datacenter performance analysis of a Tensor Processing Unit".

Tilera Corporation's architecture, depicted in FIG. 7, is a grid of cores, where each core comprises a processor, memory and switching circuitry. Here, the switching circuitry is used to transmit data amongst all the architecture's cores, similar to that of a local area network of computers.

FIG. 8 depicts a hybrid of FIGS. 5 and 6, where the loop processing of FIG. 6 is nearby the positioning of memory buffers and switching circuits of FIG. 5. Here the switching circuits are surrounded by the processing cores (SFU, Mult), instead of the switching circuits surrounding the processing cores as in FIG. 3. FIG. 8 is from a December 2019 thesis, "Energy efficient processing in memory architecture for deep learning computing acceleration".

FIG. 9 depicts a hybrid of FIGS. 7 and 8, where a gridded architecture (where each core has an array of processing elements for mathematical operations), has memory buffers between the cores. This eliminates the need to move data into and out of memory as it is being processed during training for deep learning applications. FIG. 9 is from December 2019 paper, "Gemmini: an agile systolic array generator enabling systematic evaluations of deep learning architectures".

FIG. 10 depicts an architecture that is more directed toward a channel architecture for deep learning, as opposed to the grid structure of FIG. 9. FIG. 10 is from a November 2018 paper, "TPGA: tile-grained pipeline architecture for low latency CNN inference".

FIG. 11 depicts an architecture from Huawei for deep learning that breaks looping structures into channels. Here a layered neural network has a processing array (interestingly, analog) for each layer of the neural network, where the data flows from one layer to another through memory buffers. This structure at least eliminates the need to move data from/to main memory.

FIG. 12A depicts a purely digital version of the architecture like that of FIG. 11. Here, in FIG. 12A, there are layers of the neural network with each layer being assigned a processing core in a channel architecture. Each core comprises an input buffer, an input data reordering circuit (SWU—sliding window unit) which reorders the values between layers, a matrix/vector arithmetic unit (MVAU) which does the vector-matrix multiplications at the heart of deep learning algorithms, an output data reordering circuit (MPU max-pooling sorting) with sorts output values into low-precision and high-precision values for more efficient processing, and then an output buffer. FIG. 12B shows how FIG. 12A is used to address one of the major problems of large-scale deep learning systems, the movement of intermediate data values in and out of main memory. FIGS. 12A and 12B are seen in a 17 Jan. 2019 paper, "CodeX: bit flexible encoding for streaming FPGA acceleration of DNNs".

FIG. 13A depicts yet another custom architecture for deep learning systems. FIG. 13B depicts an aspect of using deep learning systems as important as the architecture-compiling deep learning algorithms into generating the instruction flows and data flows for the circuitry. FIGS. 13A and 13B are from a December 2017 paper, "Compiling deep learning models for custom hardware accelerators".

For architectures processing tensors, the tensors typically have a preferred data structure enablement as multidimensional arrays. A 'shape' of the tensors for each layer is known, i.e., the vector length (inner dimension) and streaming time (outer dimension) are known. For example, a 2×224×224×3 tensor can be reduced to a rank-2 tensor [outer, inner], i.e., with the vector length of 256 as [1176, 256] rank-2 tensor or with the vector length of 128 as [2352, 128] rank-2 tensor. Thus, the vector length is a preferred tool for controlling use of tensors in tensor processors and thus an amount of consumed power.

SUMMARY

This Summary, together with any Claims, is a brief set of signifiers for at least one Extended Care Information Network (ECIN) (which can be a discovery, see 35 USC 100(a); and see 35 USC 100(j)), for use in commerce for which the Specification and Drawings satisfy 35 USC 112.

Embodiments of the claimed inventions disclose a new tiled architecture, referred to as a Tensor Streaming Processor (TSP). Tensor computations (typically computations on vectors and matrices) are performed using a streaming process model where computational tiles, and data storage and switching tiles, are interconnected for data transfers between tiles in a Superlane structure, to take advantage of dataflow locality as elements of tensors flowing through the architecture to be calculated upon. This novel approach enables significantly higher levels of performance while using less energy than traditional CMP core architectures, with, for example, initial Resnet50 image classification results of 20.4K sample images per second (IPS) using a batch-size of one.

The Tensor Streaming Processor (TSP) is based on two key optimizations: (1) machine learning algorithms exhibit abundant data parallelism, which are directly mapped to a mostly fixed architecture, and (2) a mostly fixed architecture enables precise planning for and control of the architecture by compilers, thus greatly increasing performance and power efficiency.

This Summary does not completely signify any ECIN. While this Summary can signify at least one essential element of an ECIN enabled by the Specification and Figures, the Summary does not signify any limitation in the scope of any ECIN.

BRIEF DESCRIPTION OF THE DRAWINGS

The following Detailed Description, Figures, and Claims signify the uses of and progress enabled by one or more ECINs. All of the Figures are used only to provide knowledge and understanding and do not limit the scope of any ECIN. Such Figures are not necessarily drawn to scale.

The Figures can have the same, or similar, reference signifiers in the form of labels (such as alphanumeric symbols, e.g., reference numerals), and can signify a similar or equivalent function or use. Further, reference signifiers of the same type can be distinguished by appending to the reference label a dash and a second label that distinguishes among the similar signifiers. If only the first label is used in the Specification, its use applies to any similar component having the same label irrespective of any other reference labels. A brief list of the Figures is below.

FIG. 16 depicts a table of instructions that can be performed by the functional tiles that comprise each Superlane.

Figures 1A, 1B:
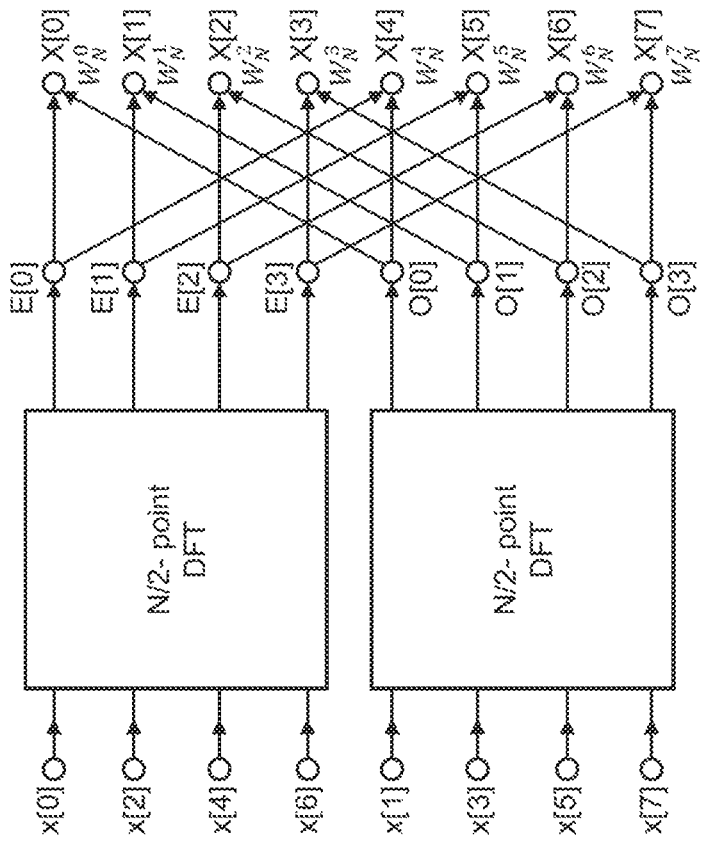
FIGS. 1A and 1B depict the matrix multiplications of the Fast Fourier and Quantum Fourier transforms.
Figure 3:
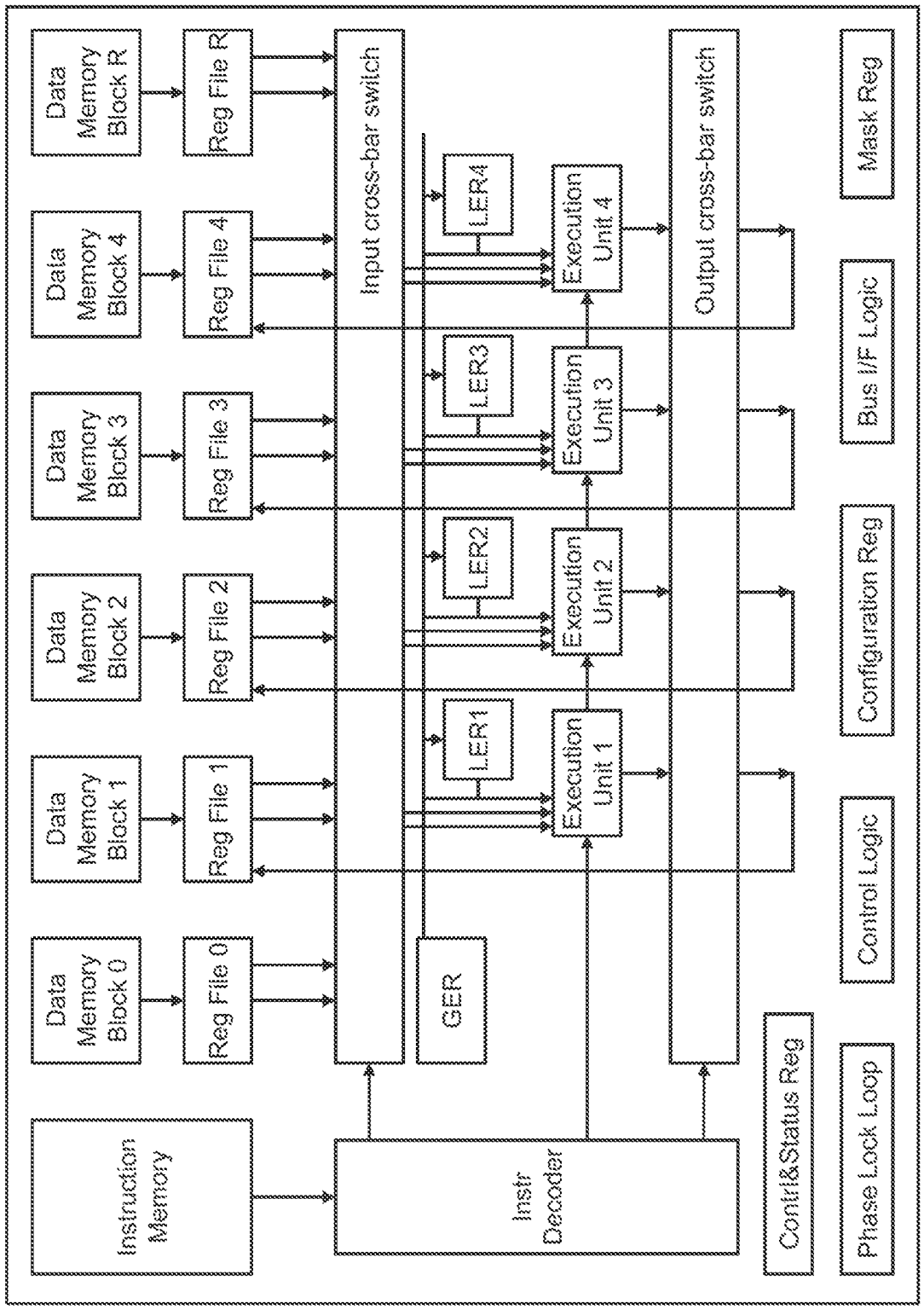
FIGS. 3 to 10 depict conventional multi-core processing architectures.

In the Figures, reference signs can be omitted as is consistent with accepted engineering practice; however, a skilled person will understand that the illustrated components are understood in the context of the Figures as a whole, of the accompanying writings about such Figures, and of the embodiments of the claimed inventions.

DETAILED DESCRIPTION

The Figures and Detailed Description, only to provide knowledge and understanding, signify at least one ECIN. To minimize the length of the Detailed Description, while various features, structures or characteristics can be described together in a single embodiment, they also can be used in other embodiments without being written about. Variations of any of these elements, and modules, processes, machines, systems, manufactures or compositions disclosed by such embodiments and/or examples are easily used in commerce. The Figures and Detailed Description signify, implicitly or explicitly, advantages and improvements of at least one ECIN for use in commerce.

In the Figures and Detailed Description, numerous specific details can be described to enable at least one ECIN. Any embodiment disclosed herein signifies a tangible form of a claimed invention. To not diminish the significance of the embodiments and/or examples in this Detailed Description, some elements that are known to a skilled person can be combined together for presentation and for illustration purposes and not be specified in detail. To not diminish the significance of these embodiments and/or examples, some well-known processes, machines, systems, manufactures or compositions are not written about in detail. However, a skilled person can use these embodiments and/or examples in commerce without these specific details or their equivalents. Thus, the Detailed Description focuses on enabling the inventive elements of any ECIN. Where this Detailed Description refers to some elements in the singular tense, more than one element can be depicted in the Figures and like elements are labeled with like numerals.

The following are brief definitions of important terms for one or more ECINS that are further described in subsequent paragraphs.

The fundamental modules of a TSP are herein referred to as 'tiles'. For example, one tile is depicted as element 1501 in FIG. 15A. The tiles perform different functions such as vector-matrix multiplication, switching of data along different circuit pathways, and local data storage and retrieval. Typically, tiles share a common system clock. A set of interconnected tiles processing the same set of data is referred to herein as a 'Superlane'. Each tile in a Superlane is subdivided into 16 sub-tiles, referred to herein as 'lanes'. A set of tiles with the same functionality executing the same instructions, located in similar positions in different Superlanes, is referred to herein as a 'slice', where the instructions are supplied from buffers that comprise an Instruction Control Unit (ICU). A set of directly connected slices of the same functional modules, encompassing all the Superlanes, is referred to herein as a 'partition'. A set of data that is processed by one Superlane is referred to herein as a 'stream'.

Superlanes

Figure 14A:
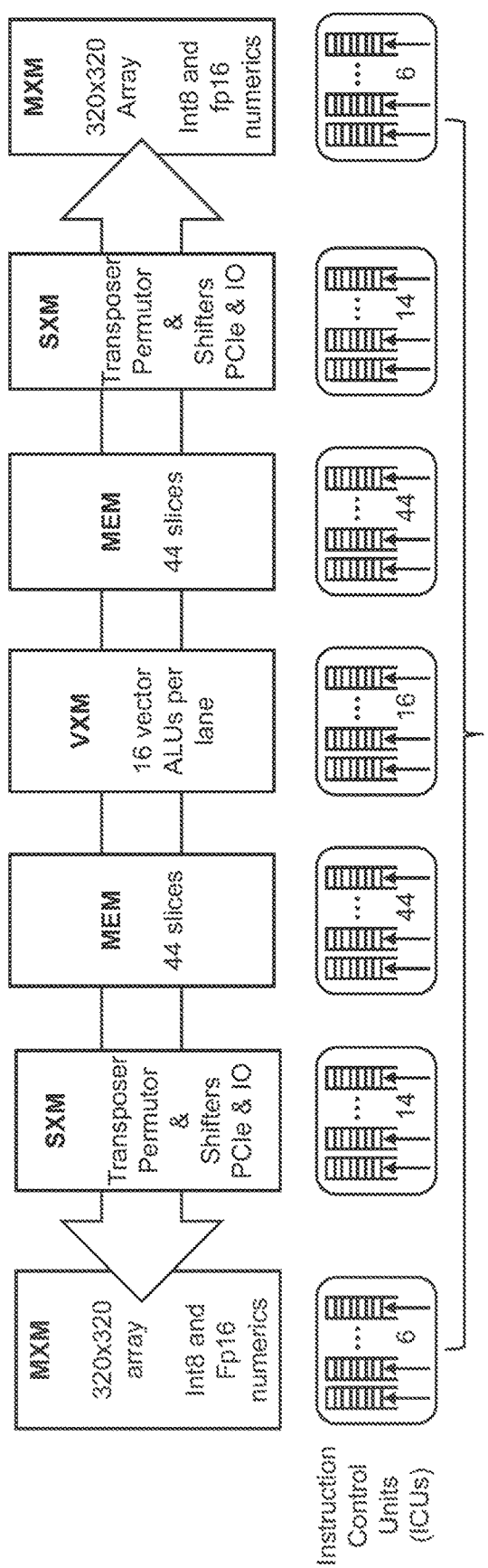
FIG. 14A depicts a Superlane of the TSP comprised of multiple tiles.

FIG. 14A depicts one ECIN with a Superlane of a TSP comprising multiple tiles. These tiles include modules for matrix and vector multiplication (MXM, VXM), data path switching between tiles (SXM), and memory storage and retrieval (MEM). Each tile (and all tiles in a slice) receives instructions from the ICUs, the instructions in the ICUs being the result of hand-coding or the output of a compiler that are transferred to the TSP. This architecture decouples flows of data from flows of instructions in the TSP. Each lane in a tile of a Superlane processes one byte.

Figure 14B:
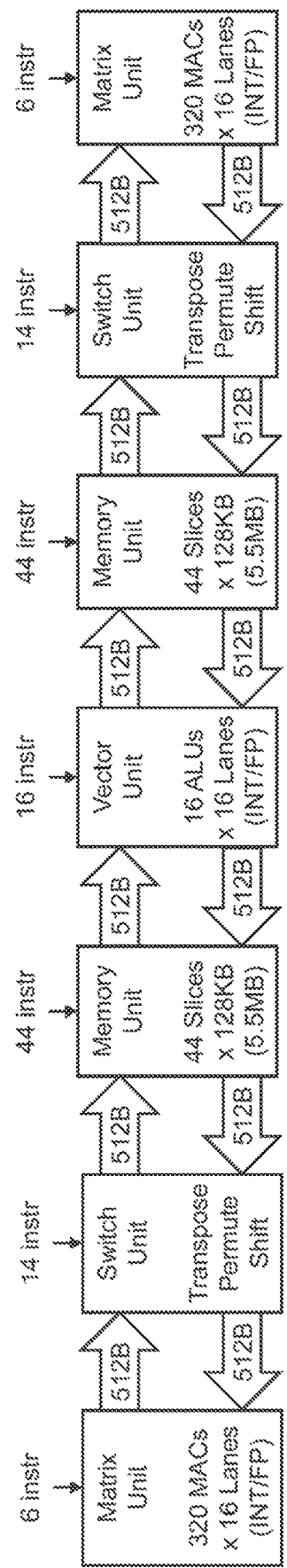
FIG. 14B depicts data flow in a Superlane.

FIG. 14B depicts one ECIN for data flow in a Superlane. Data between two adjacent tiles, such as in the MXM or the SXM, flows bidirectionally, though typically moves along one direction in a Superlane, and data is transferred on every clock cycle. When the processing of data is complete in one Superlane, the data is either returned to the host computer or transferred by tiles in the SXM to another Superlane for additional processing.

A Superlane processes streams of data in 16 lanes. Each instruction is performed on all 16 lanes at once, and then, if required by the instructions being executed, in the next Superlane in a subsequent cycle, and so forth. Thus, over 20 cycles, each instruction can execute on all 320 lanes across the 20 Superlanes. Because the architecture lacks register files, the compiler must schedule the streaming data to be available to the functional module at the designated time to execute the designated instruction.

Figure 15A:
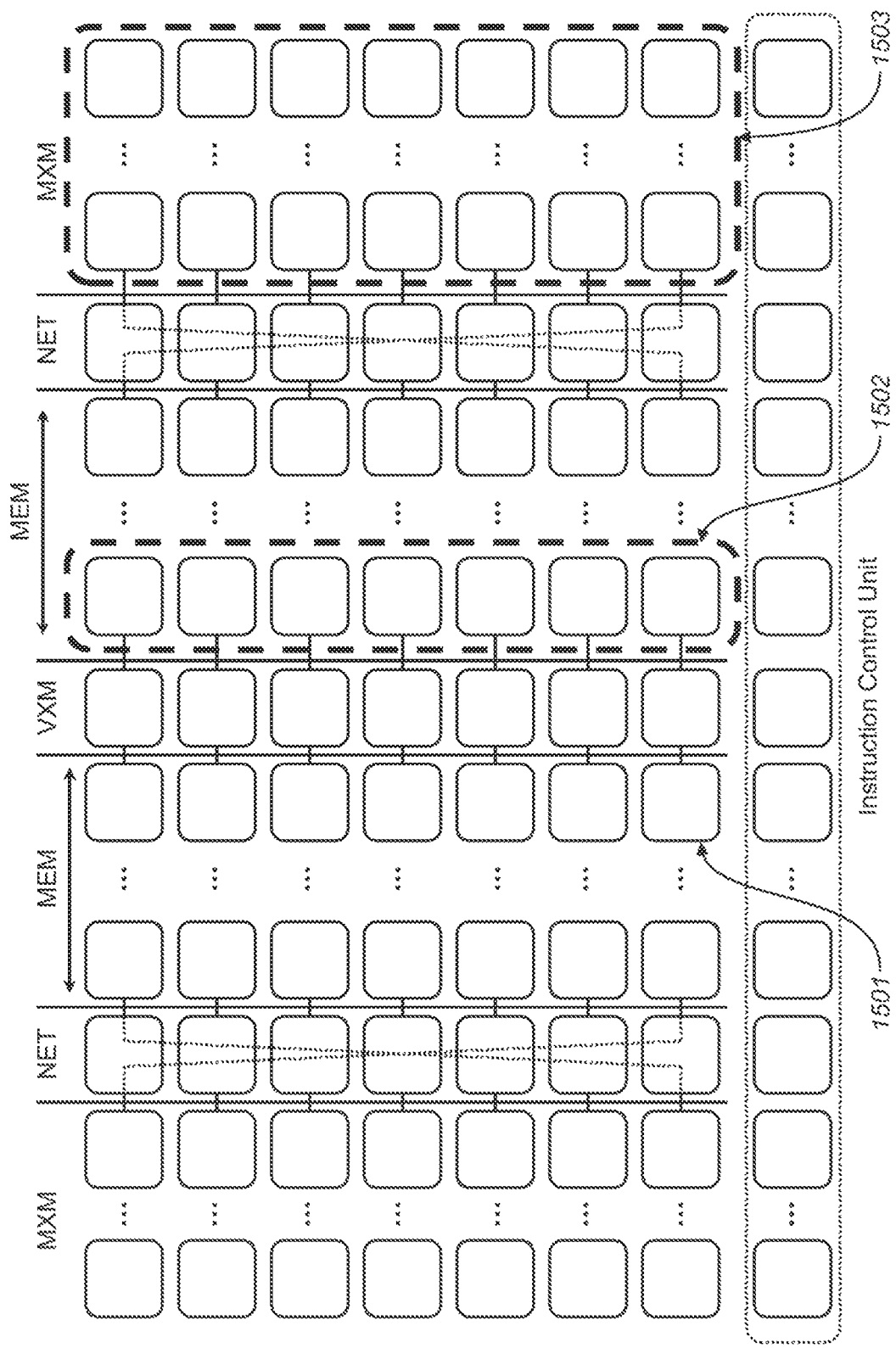
FIG. 15A depicts multiple Superlanes partitioned into slices.

FIG. 15A depicts one ECIN with multiple Superlanes partitioned into slices of tiles (for example, tile 1501). Each slice (for example, slice 1502) in a TSP performs any of a variety of functions under the control of instructions transferred from buffers in the Instruction Control Unit. These functions include memory storage and retrieval for data in a Superlane (MEM), integer (INT) arithmetic, floating point (FPU) arithmetic, and transferring data between Superlanes (NET or SXM). In some embodiments, each of the slices operates independently and are coordinated using barrier-like synchronization instructions. Element 1503 in FIG. 15A depicts a partition, in this case, of one set of matrix multiplication tiles.

For example, the MEM slices perform Read and Write operations but not Add or Mul, which are only performed in VXM and MXM slices. All of the tiles in a slice execute the same set of instructions, so it is possible to locate all of the common instruction decode and dispatch logic into the ICU, and partition the normal instruction execution pipeline into two sets of instructions: (i) instruction fetch, decode, and parceling and (ii) operand read, execute, and writeback. Functional tiles can operate without having to receive explicit instructions, or only receiving intermittent or limited instructions, from the ICU when the tiles are dedicated to a specific function, potentially simplifying operation of the processor.

In at least one ECIN, the tiles in the same slice (but not necessarily the same Superlane) execute instructions in a "staggered" fashion where instructions are issued tile-by-tile within the slice over a period of N cycles. For example, the ICU for a given slice may, during a first clock cycle, issue an instruction to a first tile of the slice (e.g., the tile directly connected to the ICU of the slice, as illustrated in FIG. 15A), which is passed to subsequent tiles of the slice over subsequent cycles.

In at least one ECIN, each Superlane comprises a first set and second set of matrix multiplication tiles (MXM1 and MXM2), a first and second set of data path switching tiles (SXM1 and SXM2), a first and second set of memory tiles (MEM1 and MEM2), and a first set of vector calculation tiles (VXM1), wherein just one tile in MXM1 transfers data with one tile in SXM1, wherein just one tile in SXM1 transfers said data with just one tile in MEM1, wherein just one tile in MEM1 transfers said data with just one tile in VXM1, wherein just one tile in VXM1 transfers said data with just one tile in MEM2, wherein just one tile in MEM2 transfers said data with just one tile in SXM2, and wherein just one tile in SXM2 transfers said data with just one tile in MXM2.

In this embodiment, data transfers are entirely in one direction, for example MXM1 to SXM1 to MEM1 to VXM1 to MEM2 to SXM2 to MXM2. In other embodiments, data transfers occur in two directions, for example, one set of data transfers from VXM1 to MEM1 to SXM1 to MXM1, and another set of data transfers from VXM1 to MEM2 to SXM2 to MXM2.

Figure 19:
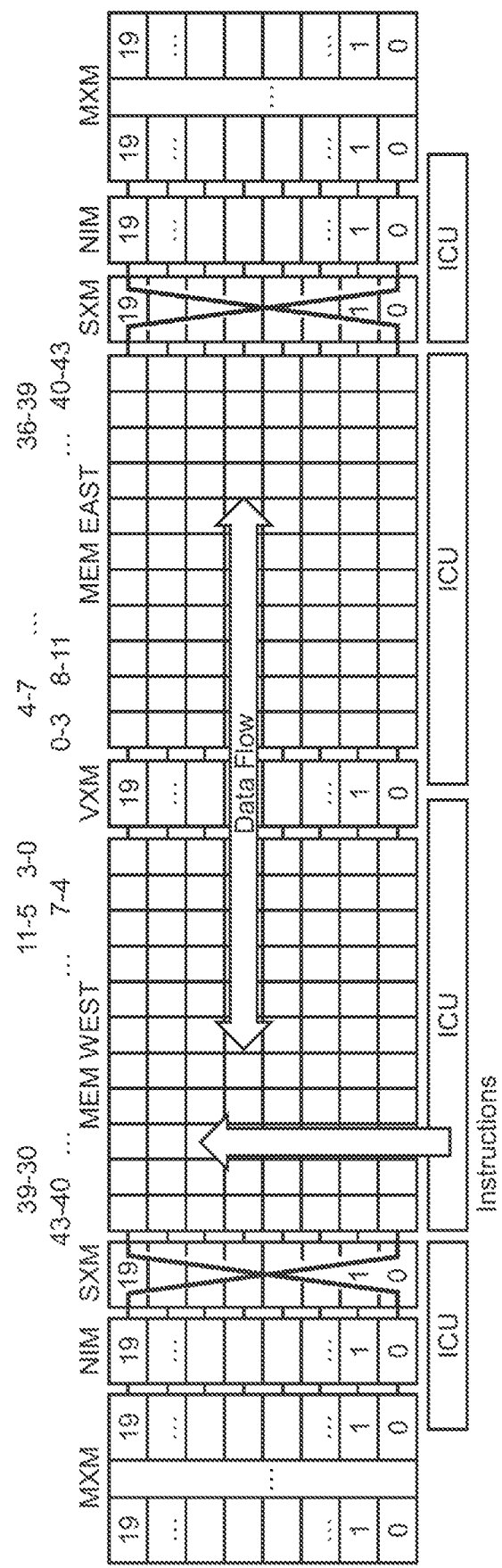
FIG. 19 depicts a TSP partitioned into two processing halves.

In at least one ECIN, each Superlane, and indeed the entire TSP, executes a single set of instructions, so it may be considered as a single processor core. However, as depicted in FIG. 19, in another ECIN, the TSP Superlanes are partitioned into two sets of functional modules. In the split architecture, the central vector multiplication tile that contains 16 ALUs can allocate the ALUs to either set. In other ECINs, additional slices of VXMs (not shown) may be allocated to a set. The additional VXM slices may be physically or logically located next to one of the MXM slices.

Figure 15B:
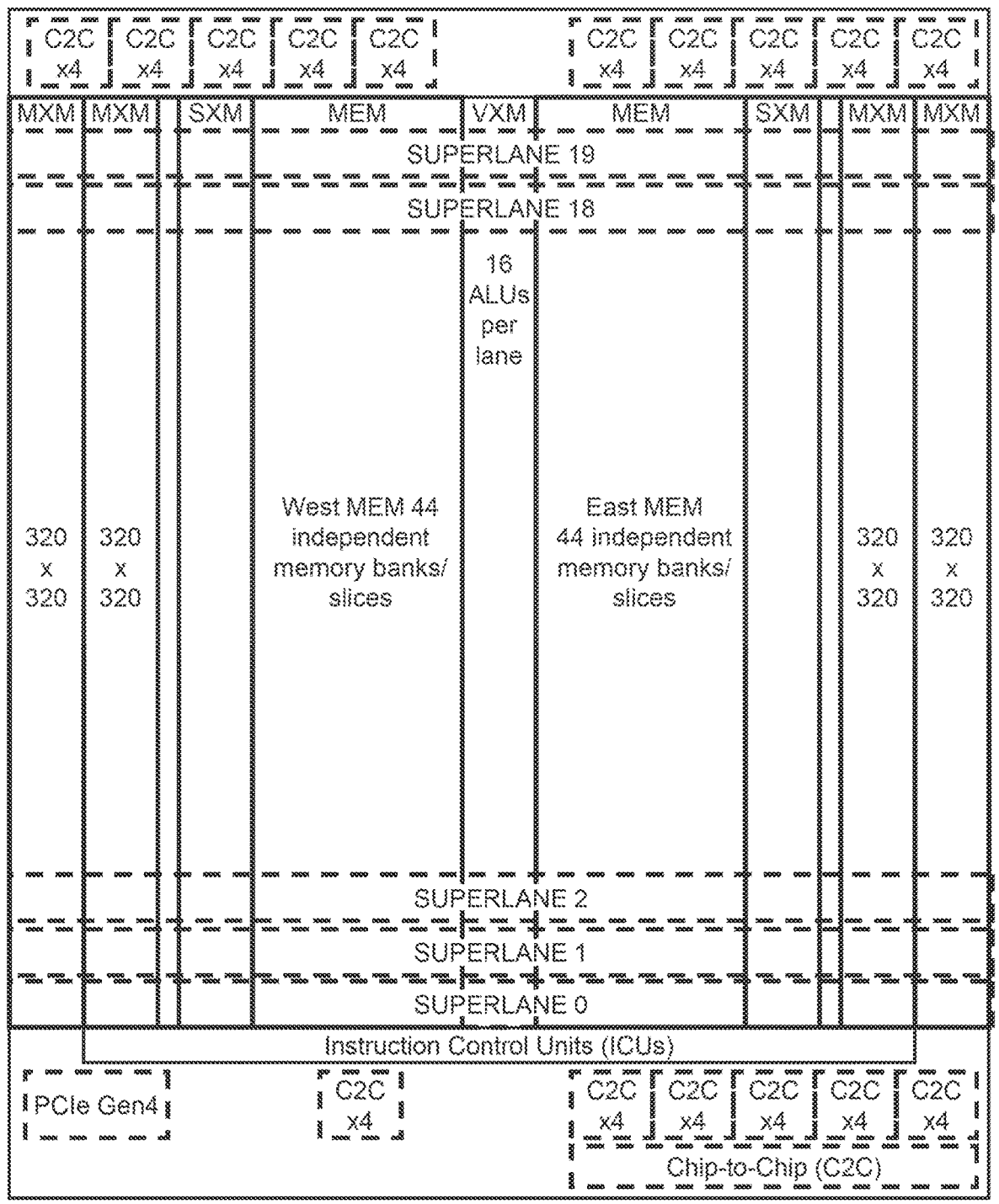
FIG. 15B depicts the silicon layout of a TSP with multiple Superlanes, as well as chip to chip interfaces and instruction control units.

For at least one ECIN, FIG. 15B depicts the silicon layout of a TSP with multiple Superlanes, as well as processor chip to processor chip (C2C) interface modules and the ICUs. In this exemplary embodiment, there are 20 Superlanes forming the majority of the floorplan of the laid-out silicon circuitry. Surrounding the Superlane partitions is circuitry for the ICUs, modules for processor-to-processor communication, and modules for host-to-processor communication. In one embodiment, the host-to-processor modules comprises a PCIe (Peripheral Component Interconnect Express) circuit. In at least one ECIN, a host-to-processor communication module bidirectionally transfers data from the host computer through an SXM to and from a MEM. In some embodiments, a processor-to-processor communication C2C module directly transfers data to an SXM.

One ECIN of a TSP chip contains 26.8 billion transistors on a 725 mm² die built in 14 nm ASIC technology, and is designed using standard EDA tools from circuit design through tape-out before fabrication. The die area splits about evenly between memory and compute units (not counting I/O). Instruction control requires only 3% of the die area. One Superlane in the TSP can be initially unused, so it can be connected to the rest of the architecture to replace any Superlane that is defective; this redundant feature adds only about 4% to the die area. In this embodiment, each MEM partition has 44 slices of 20 tiles.

The TSP's large on-chip Static Random Access Memory (SRAM) avoids the need for external memory, so it does not need to include DRAM controllers and interfaces. The chip includes a ×16 PCI Express (PCIe) Gen4 interface to connect to the host processor. Compilers that execute on the host computer download the machine learning algorithm instructions and data to the TSP, typically from the host computer through the PCIe interface through the SXM tiles adjacent to the PCI3e interface into the MEM partitions. The TSP can then autonomously execute the model by transferring the instructions and data in the MEM partitions into the functional partitions (MXM, VXM, SXM). After processing, results to the host computer, in one embodiment, the results transferred from the VXM through the SXMs through the PCIe modules back to the host computer.

Figure 17:
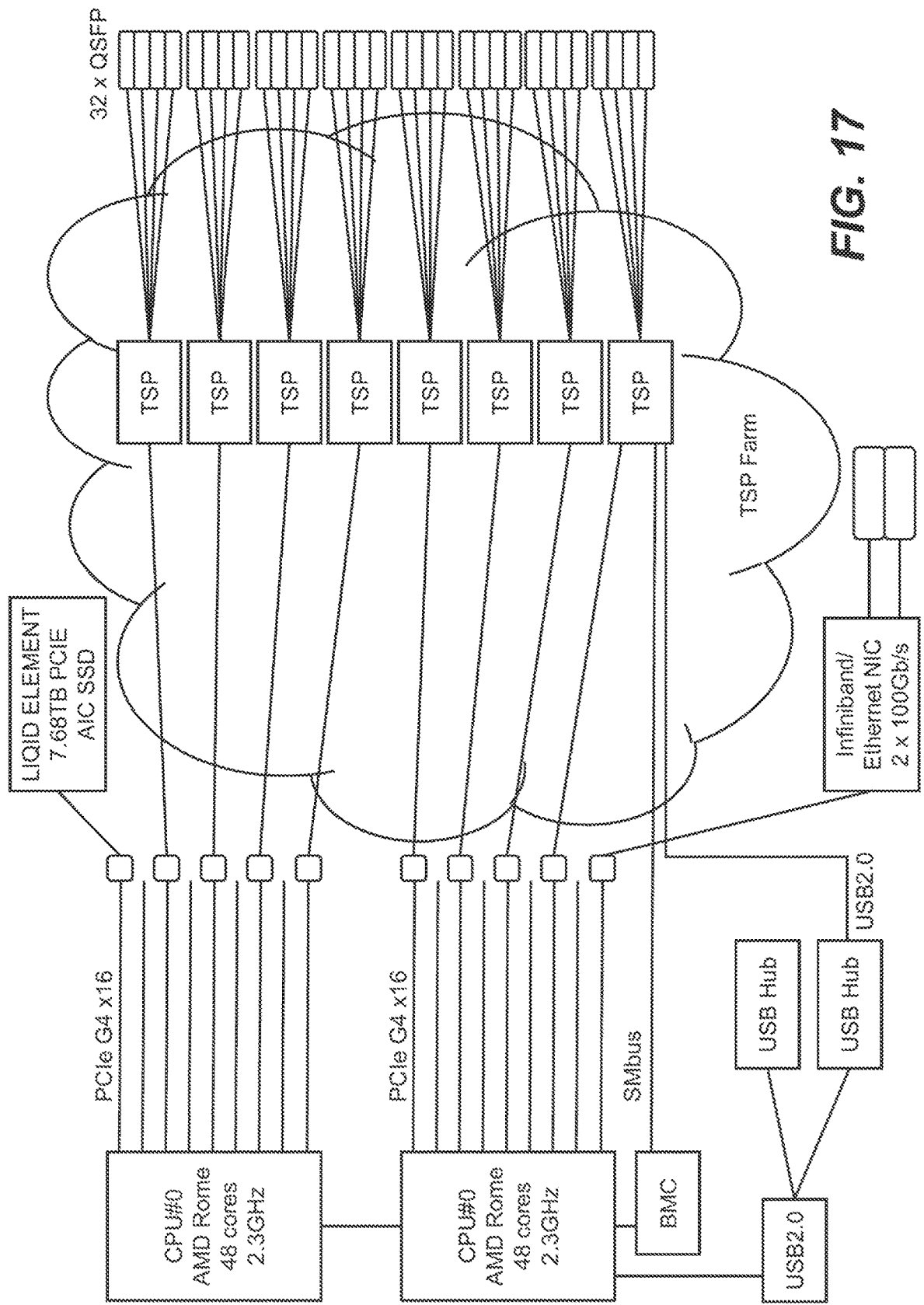
FIG. 17 depicts a system of controlling host computers and a set of TSPs, with multiple communication links.

For at least one ECIN, FIG. 17 depicts a system of controlling host computers and a set of TSPs, with multiple communication links. Host CPUs communicate with the TSP using PCIe interfaces based on Ethernet. USB communication links are also used between the host CPUs and the TSPs.

Streams

Machine learning algorithms typically operate on vectors with scalar coefficients of a specified data type (e.g., INT8, FP16, etc.). The Superlanes operate on data representing vectors, sometimes organized into rank-2 tensors, and relies on the compiler to transform higher rank tensors into rank-2 tensors. FIG. 16 depicts a table of instructions that can be performed by the functional tiles that comprise each Superlane. The TSP's programming model is a producer-consumer model where each slice in a partition acts as a consumer and a producer of one or more streams.

Figures 2, 20A:
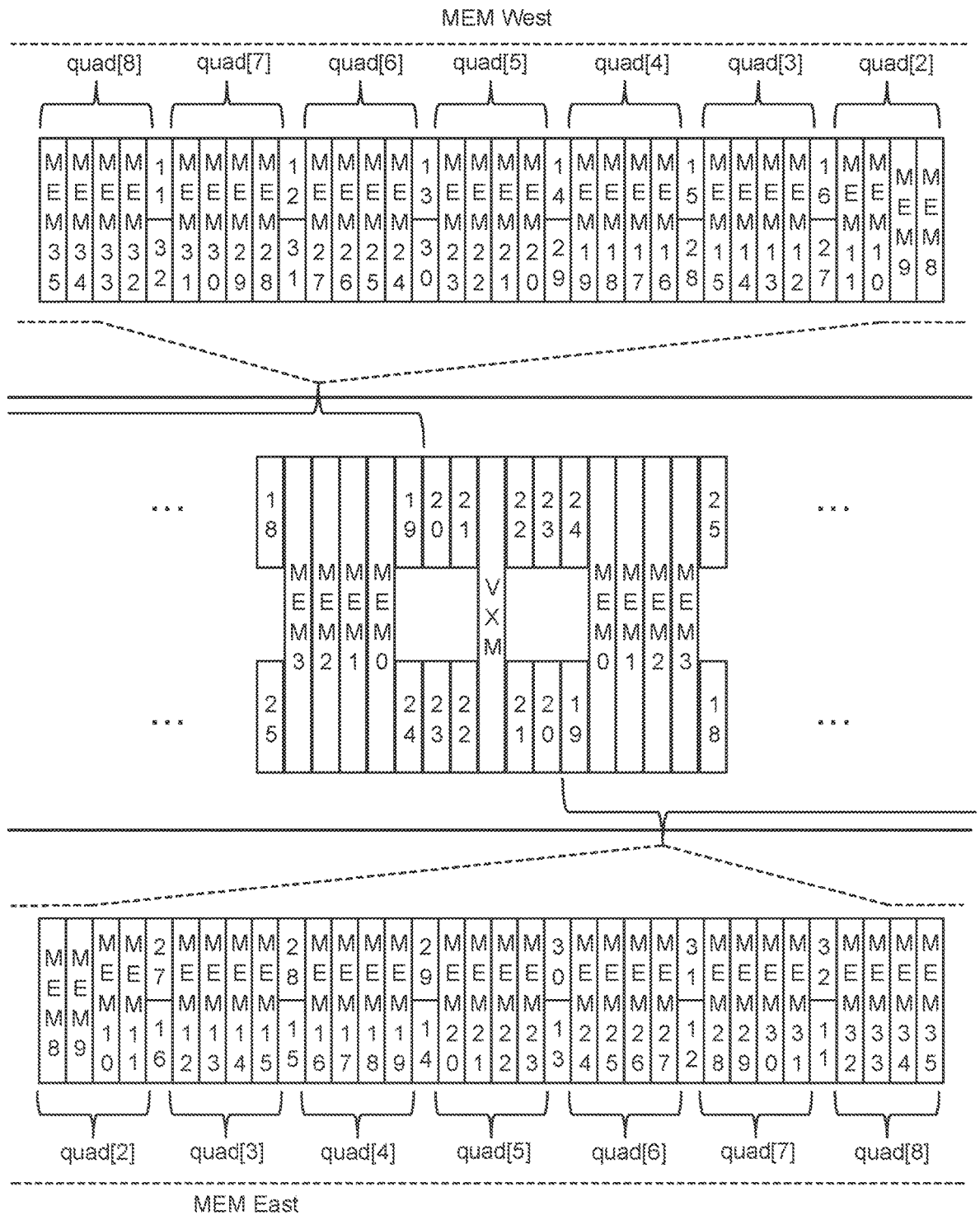
FIG. 2 depicts the pseudocode for an algorithm for neural network training.
FIG. 20A depicts a Superlane with embedded stream registers.
Figures 3, 20A:
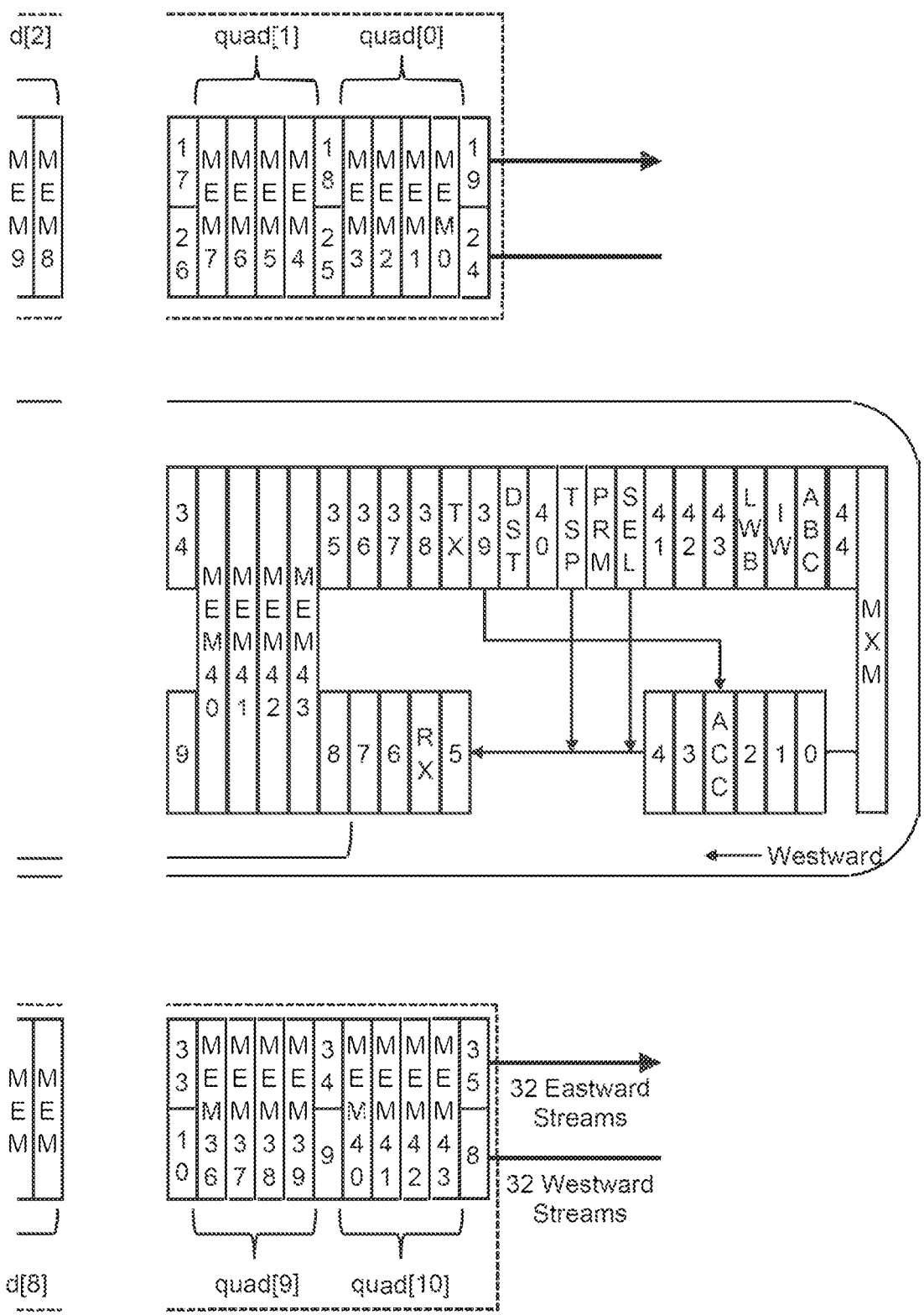

The partitioned architecture can support up to 32 streams in each set of tiles in two directions (the number of streams is dependent on the availability of wiring of the inputs and outputs for the stream registers). The stream registers are depicted in FIG. 20A as the integer-numbered grey boxes between the memory slices, such as stream registers 29 and 14 (element 201 in FIG. 20A) between memory slices MEM19 and MEM20. Each stream automatically progresses in its designated direction on every cycle, moving 32 bytes. Any inter-lane data movement within a vector uses the SXM slice.

Figure 20B:
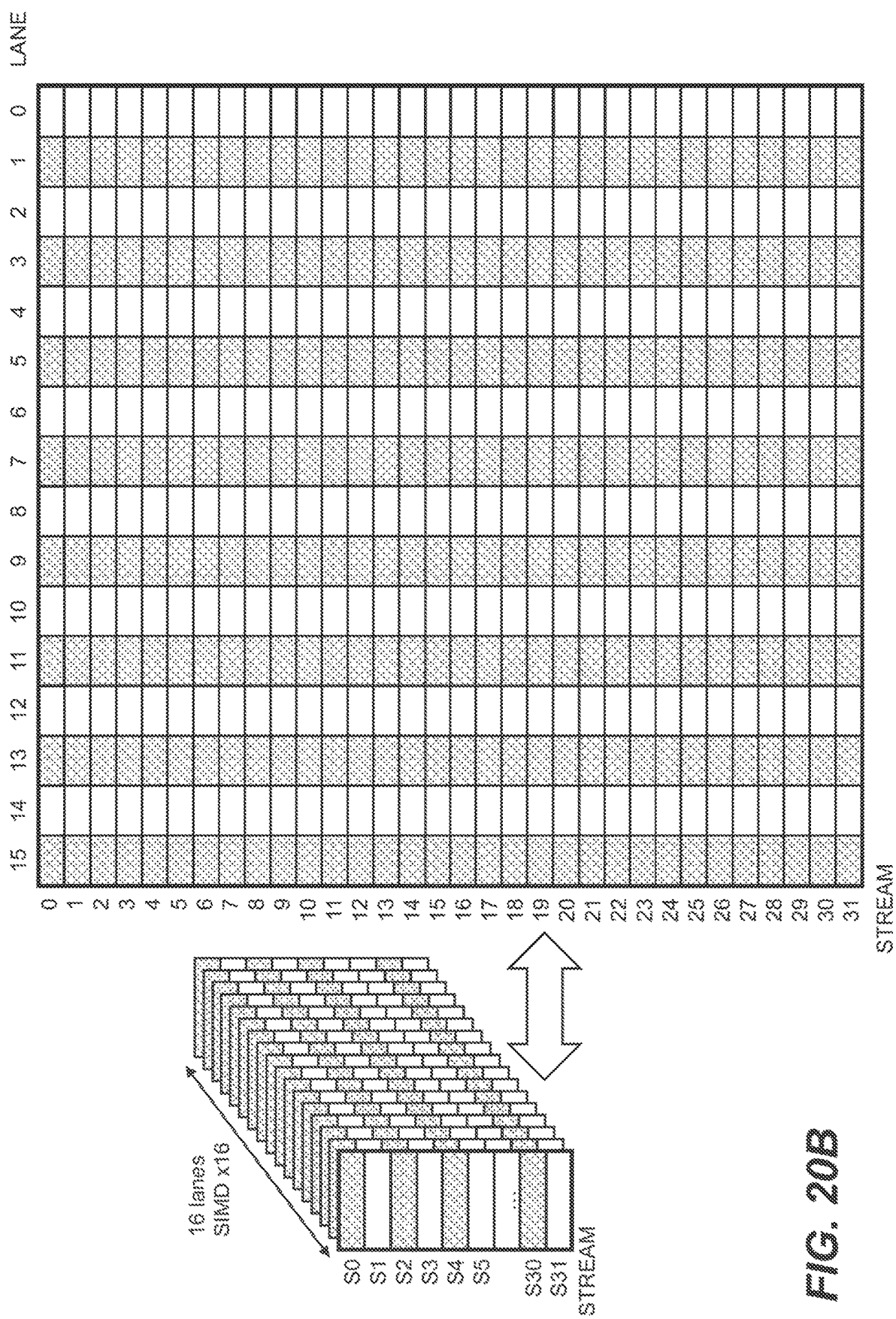
FIG. 20B depicts streams organized by lanes.
Figures 1, 20C:
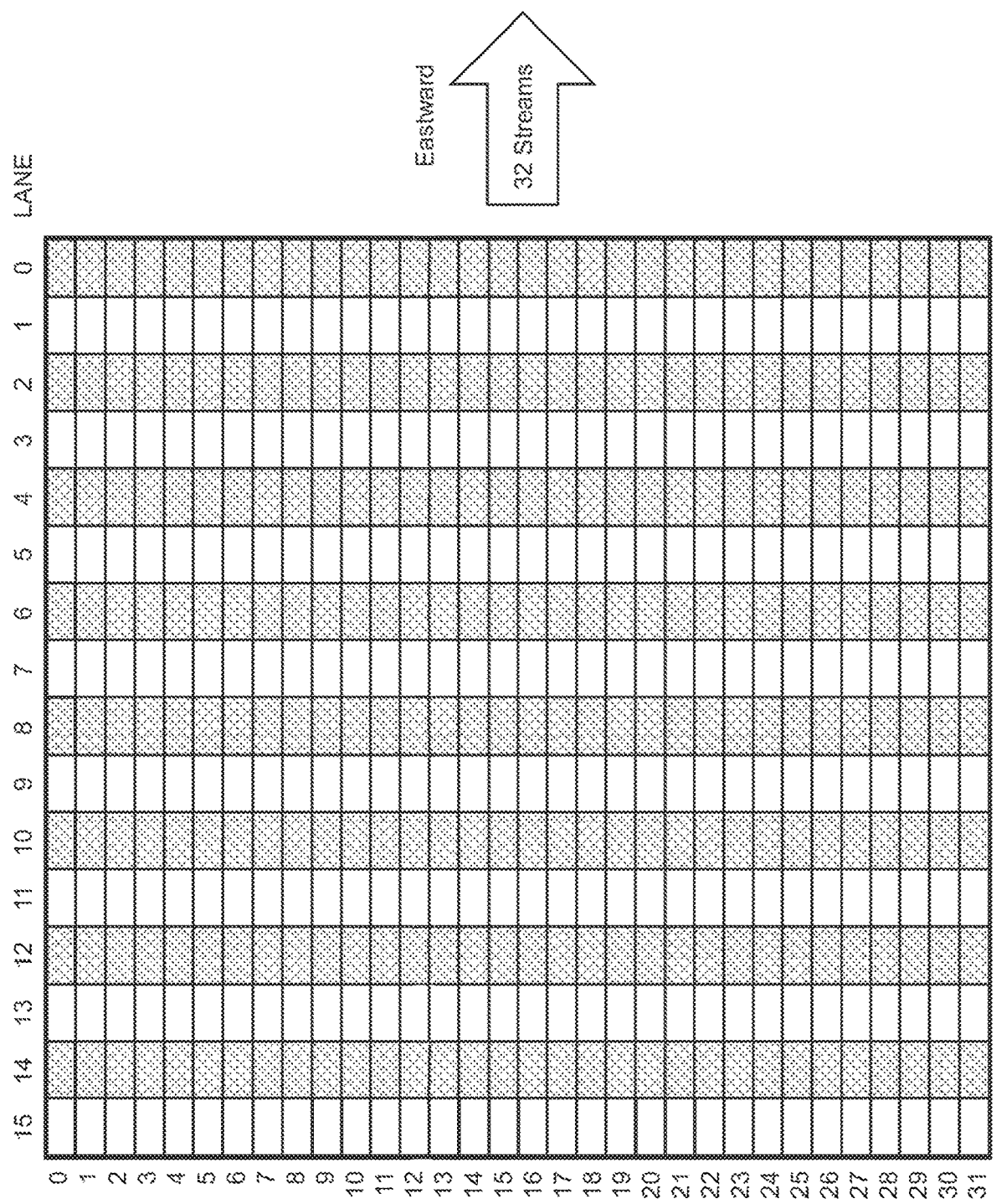
FIG. 20C depicts two sets of streams flowing in different directions.
Figure 20C:
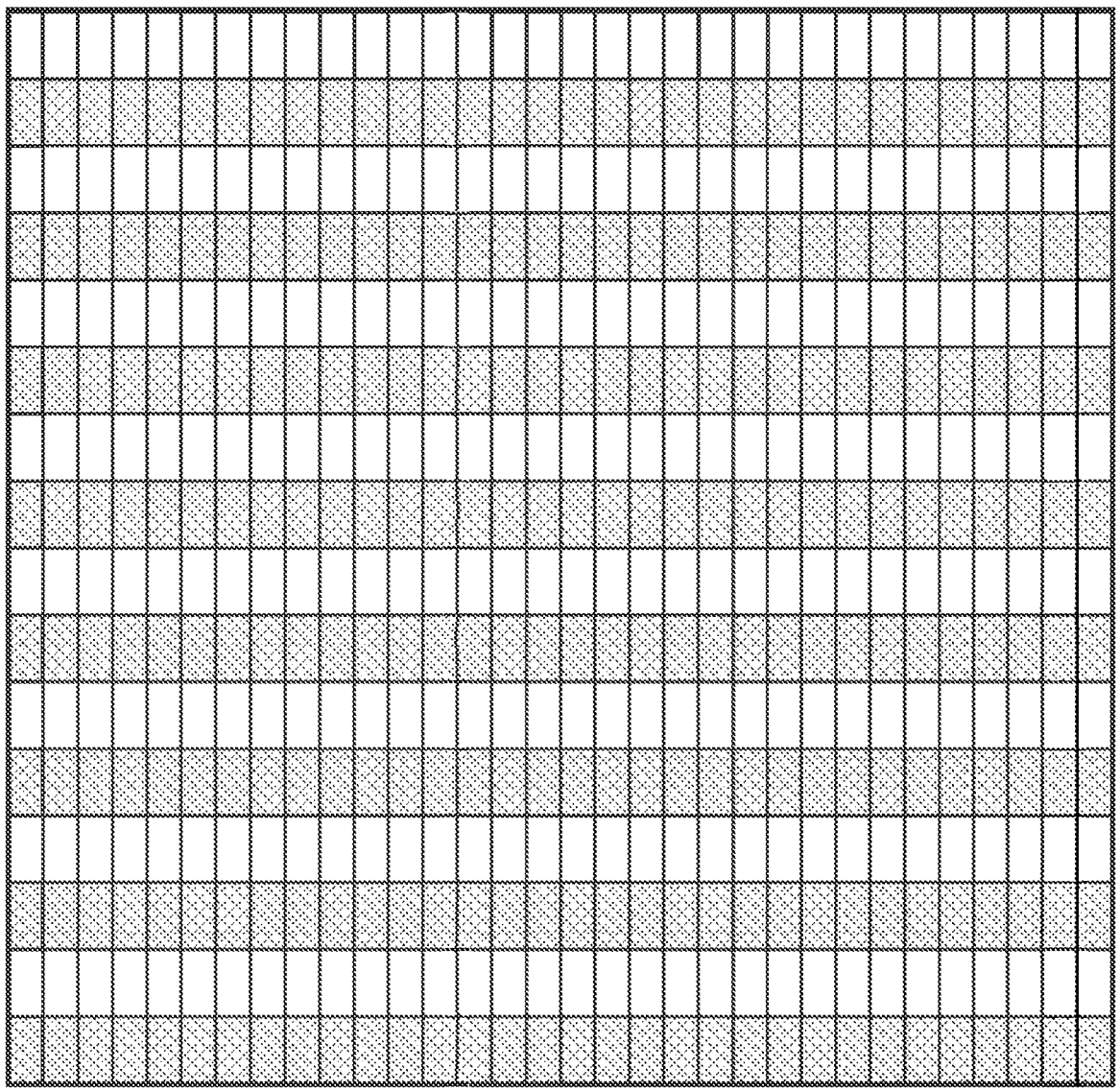
Figure 2:
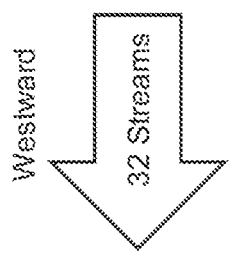

When a set of data representing a vector is read from main memory, it is given a stream identifier (0 . . . 31) and direction of flow in a Superlane (see FIG. 20B and FIG. 20C). Once a vector is read into one or more stream registers in a lane (stream registers as depicted, for example, in FIG. 20A), it becomes a stream and flows towards the slice that is processing it, which produces a result stream. As data in a stream flows through a slice, each functional module can intercept the data and perform a calculation (if the module is calculational), or move data between lanes (in the switching modules).

The stream registers are used to transfer operands and results between slices. A common software pattern involves reading operand data from one or more MEM slices that is then subsequently consumed and operated on by a downstream arithmetic slice. The results of the operation are then transferred to another stream such that they can be written back to memory. For example, a Z=X+Y operation might require four instructions: Read S1,X and Read S2,Y are executed on two MEM slices and directed toward an VXM slice to perform the Add S1,S2,S3. Then the result is stored back to memory via a Write S3,Z.

An instruction can operate on data from different streams. For example, ADD S1, S2, S3 adds each value in stream 1 to the corresponding value in stream 2 and stores the results in stream 3.

The lane structure is optimized for INT8 data, but larger operands (INT16, INT32, FP16, or FP32) can be formed by combining streams. This approach enables the compiler to operate on 320-element vectors for all data types. Wider data types are assigned to adjacent streams (e.g., S0, S1, S2, S3) along aligned boundaries. For increased reliability, the Superlane applies a 9-bit error-correction code (ECC) across all 16 lanes, correcting nearly all errors. The TSP logs these errors and reports them to host computer. In one embodiment, the ECC protocol is SECDED (single-error correction with double error detection). Before a functional slice operates on a stream of data, it checks the ECC bits to ensure data integrity before operating on the data.

Each element of a stream is 1-byte, with larger data types (e.g. INT16, INT32, and FP32) constructed from several streams (2, 4, and 4 respectively). Multi-byte data types are always stream-aligned based on the size of the data type. For instance, INT16 is aligned on a stream pair, bi-stream, and INT32 is aligned on a quad-stream (e.g. stream 0, 4, 8, . . . ). Data alignment is accomplished by the compiler or through the API.

Each stream has "valid/empty" bit precisely tracking the stream's load-to-use time beyond which the stream is considered logically dead and no longer propagated, which achieves a reduction in power consumption of the TSP.

The Instruction Control Unit

Some instructions in the ICUs are common to all functional slices. As such, the instructions contain common instructions like NOP and Repeat, and synchronization instructions Sync and Notify to allow the functional slices to be initially synchronized, so the compiler can accurately determine instruction execution times and allow cooperative parallelism among the functional slices. ICUs retrieve pages of instructions in the MEM partitions, sending Ifetch instructions across side channels in the memory slices, and receiving the instructions from memory back along the same side channel.

The ICUs can provide explicit instruction fetching for the slices with the Ifetch instruction, and inter-slice synchronization using the Sync and Notify instructions to perform a chip-wide barrier synchronization among participating functional slices. A repeated-NOP (no-op) instruction allows for precise cycle-by-cycle control of inter-instruction delay. For example, the compiler has cycle-accurate control when scheduling two operations A and B using an intervening NOP so that N clock cycles separate the operations A and B, i.e., Operation A then NOP(N) then Operation B.

The compiler uses explicit NOPs to provide temporal separation between two instructions in the program order. A NOP has a repeat count 16-bit field which allows one NOP to wait between 1 ns and 65 µs for a 1 GHz clock frequency. The compiler uses NOP instructions to control relative timing of the functional slices and data on which the functional slices operate. The repeated NOP is implemented in the ICU's tile and is common to all functional slices. While the NOP instruction can be the most common instruction, the NOP instruction is not typically included in the specification for a machine learning model, but rather is inserted into the instructions generated from the model by the compiler.

The Vector Processing Tiles

The central vector unit VXM contains 16 Arithmetic Logic Units (ALU) per lane. Each ALU can perform a 32-bit calculation using aligned groups of four stream bytes as operands. In addition to the usual arithmetic and logical operations, these ALUs can convert between integer and floating-point formats. The VXM also performs common normalization functions such as ReLU and the hyberbolic tangent (tan h) as well as exponentiation and reciprocal square roots, allowing programmers to build their own normalization functions.

In at least one ECIN, each Superlane implements a 4×4 mesh of vector ALUs using the 16 vector ALUs per lane (in this example configuration). Each of the ALU's 32-bit input operands are organized along an aligned quad-stream group.

The vector ALUs do not produce condition codes or status flags from the last instruction; they are stateless. Instead, the VXM provides both saturating and modulo variants (add_sat, add_mod and mul_sat, mul_mod) for addition and multiplication, which allows differing semantics for handling arithmetic exceptions. The TSP supports chaining together two or more vector ALUs within each lane, allowing multiple ALU operations to be performed without transferring the intermediate results to main memory, saving a write and subsequent read of each intermediate result. This allows for efficient parallel implementations of algorithms for batch normalization, quantization, or more complex activation functions like the leaky ReLU activation function, for example.

The Matrix Processing Tiles

Figure 18:
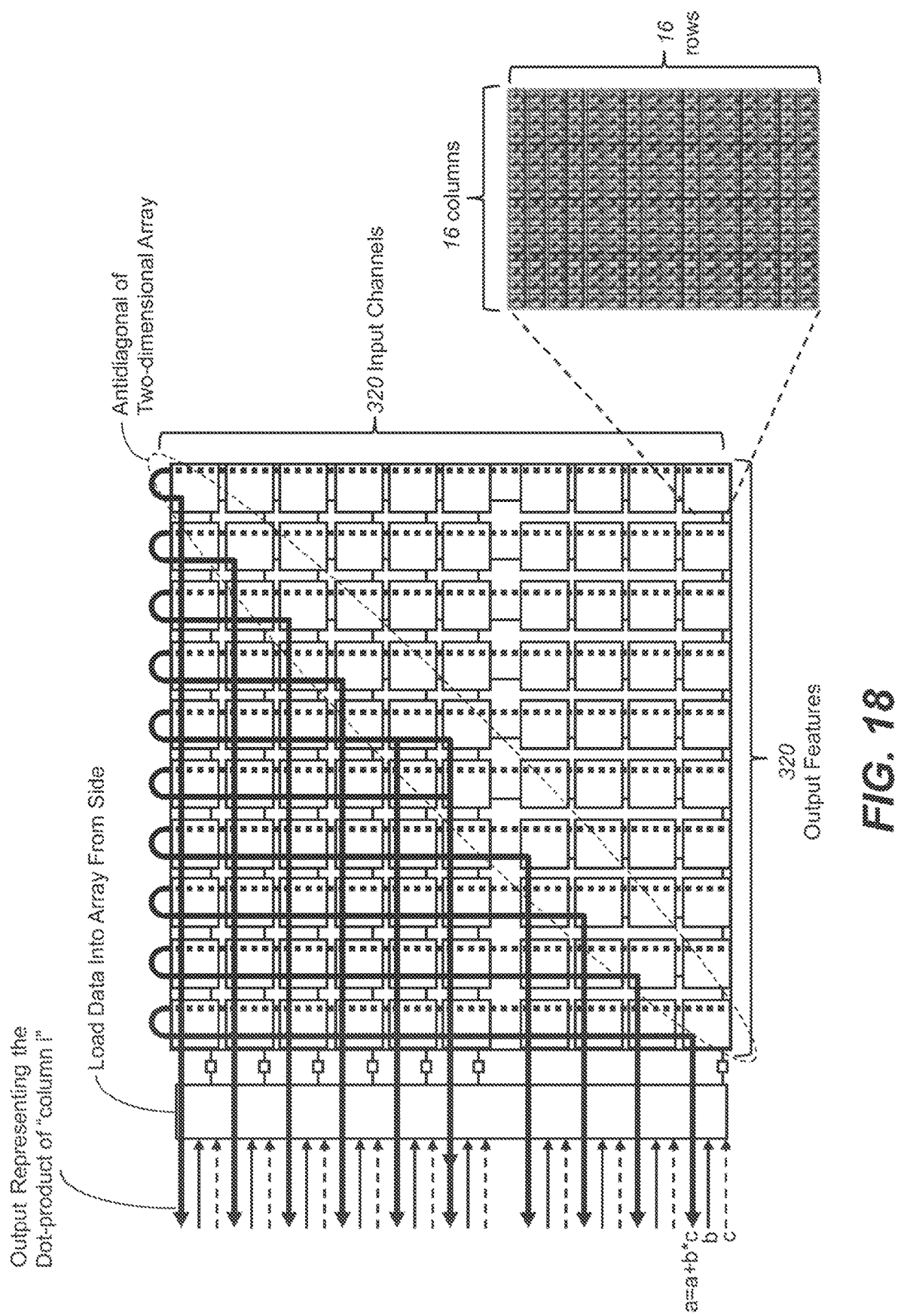
FIG. 18 depicts the architecture and data flow of an MXM multiplication tile.

FIG. 18 depicts the architecture and data flow of an MXM multiplication tile for at least one ECIN. The matrix execution module (MXM) comprises four independent 320-by-320 grids of multiply-accumulate (MACC) modules. Each 320 by 320 grid comprises 20 16 by 16 sub-grids that produce a partial-sum/dot product result each cycle and pass the result to an adjacent tile for use in its computations. It uses 16 streams each with 16 bytes to install 256 8-bit weights (IW) in each gird on every cycle. Using all 32 streams in each direction allows weights to be placed in simultaneously in both MXM partitions, loading all 409,600 weights on-chip in less than 40 cycles. With weights installed, every cycle the MXM can generate a new INT32 dot-product of input activations with installed weights. The features output from the MXM can be accumulated using the accumulators on each INT32 or FP32 output stream.

The MXM supports calculations for both 8-bit integer (INT8), and 16-bit floating point (FP16), by using two 320×320 byte-planes in tandem for the 16-bit floating point results. The 320-element sum is produced for each output with only a single rounding step at the end to convert to INT32 or FP32 results. MXM processing includes the following operations (instructions): LW—load weights from data flows (streams) to weight buffer; IW—install weights from data flows (streams) or LW buffer into the 320×320 array; ABC—activation buffer control to initiate and coordinate arriving activations; ACC—accumulate either INT32 or FP32 result from MXM.

Each MACC unit has two 8-bit weight registers and two 32-bit accumulators. On each cycle, each MACC unit multiplies the stored weight values by a pair of activation values from the streaming data. Each 16×16 sub-grid can compute an integer partial sum in one cycle and a complete 320-element fused dot-product in 20 cycles. The MAC unit can instead operate as a single FP16 MACC, but these operations require two cycles, reducing throughput by 75% relative to INT8 operations. Each MXM partition has 320×320

MACC units producing 409,600 INT8 operations or 102,400 FP16 operations per cycle. Using all 32 streams in each direction, the TSP can load all 409,600 weight registers in less than 40 cycles.

The Switching Processing Tiles

The switch units (referred to as 'SXM' or 'NET') execute functions for the transposition, permutation, shifting and rotation of data elements. Collectively, these operations are used for performing tensor reshape operations common to machine learning algorithms. For example, the SXM can rotate or transpose a stream of data across the lanes. The switch unit can duplicate bytes to fill a vector or zero any of the vector elements to pad values. The switch units are the only tiles that communicate between Superlanes. Detailed enablements of the SXM switch tiles are disclosed in U.S. Pat. No. 10,754,621, incorporated herein by reference.

Data movement on-chip is carried out by routing data along pathways: where data is transferred between SRAM and functional modules within each Superlane, and where the SXM transfers data across lanes using two sets of lane shifters. The lane-shifters are usually allocated in pairs since typically a vector is shifted between a lane and its two adjacent lanes in a Superlane. In addition, the SXM provides a permute instruction that uses a programmed bijection to remap the 320 lanes onto a set of similarly indexed streams, one per Superlane.

The distributor slice within the SXM can be used to arbitrarily remap the 16 lanes within each Superlane. As streams pass through the SXM's distributor, they can be remapped at full bandwidth, or zero-fill any or all of the 16 elements. This provides an efficient mechanism for common tensor operations like zero padding or rearranging elements of a 4×4 filter.

Figure 5:
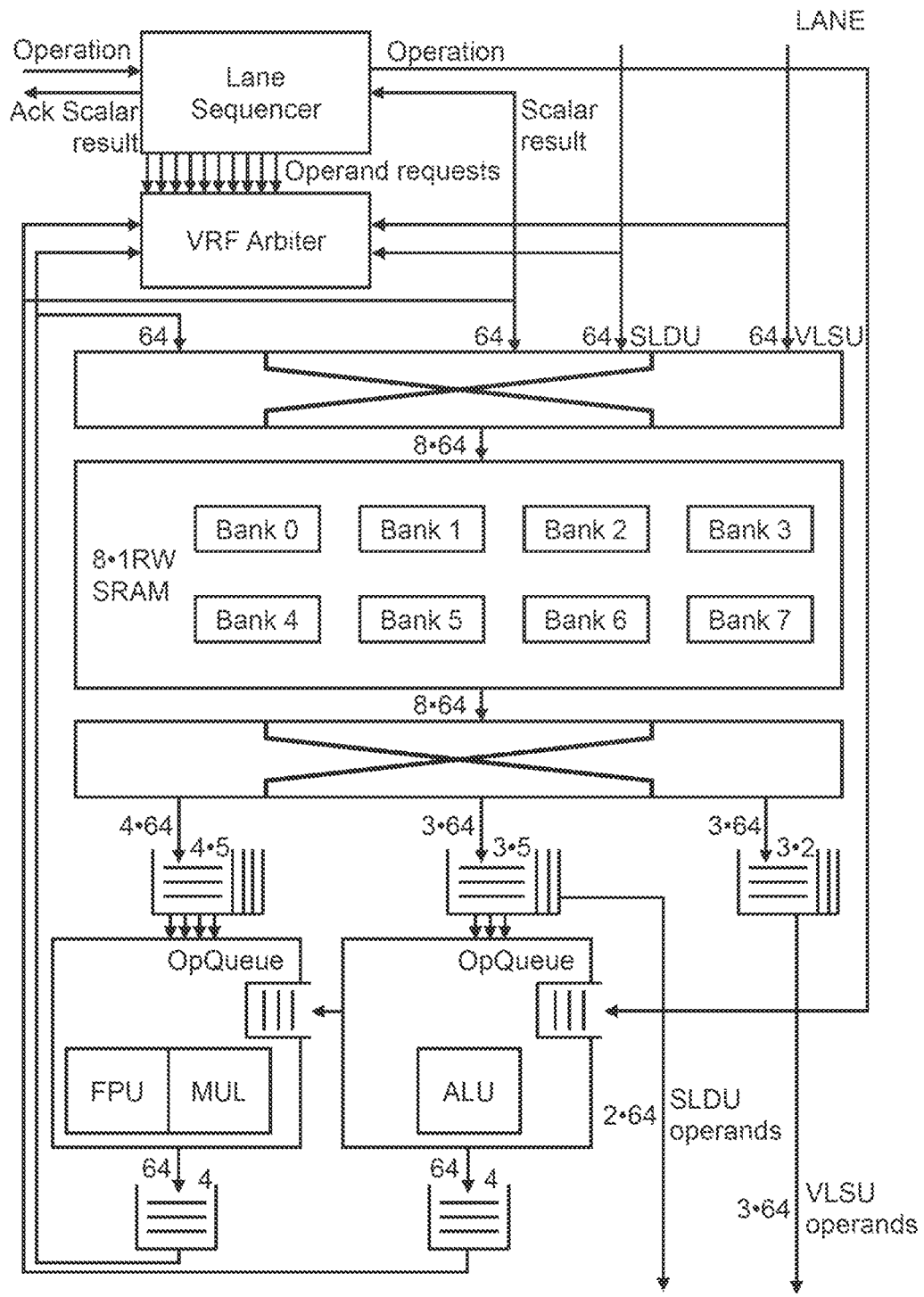
Figure 6:
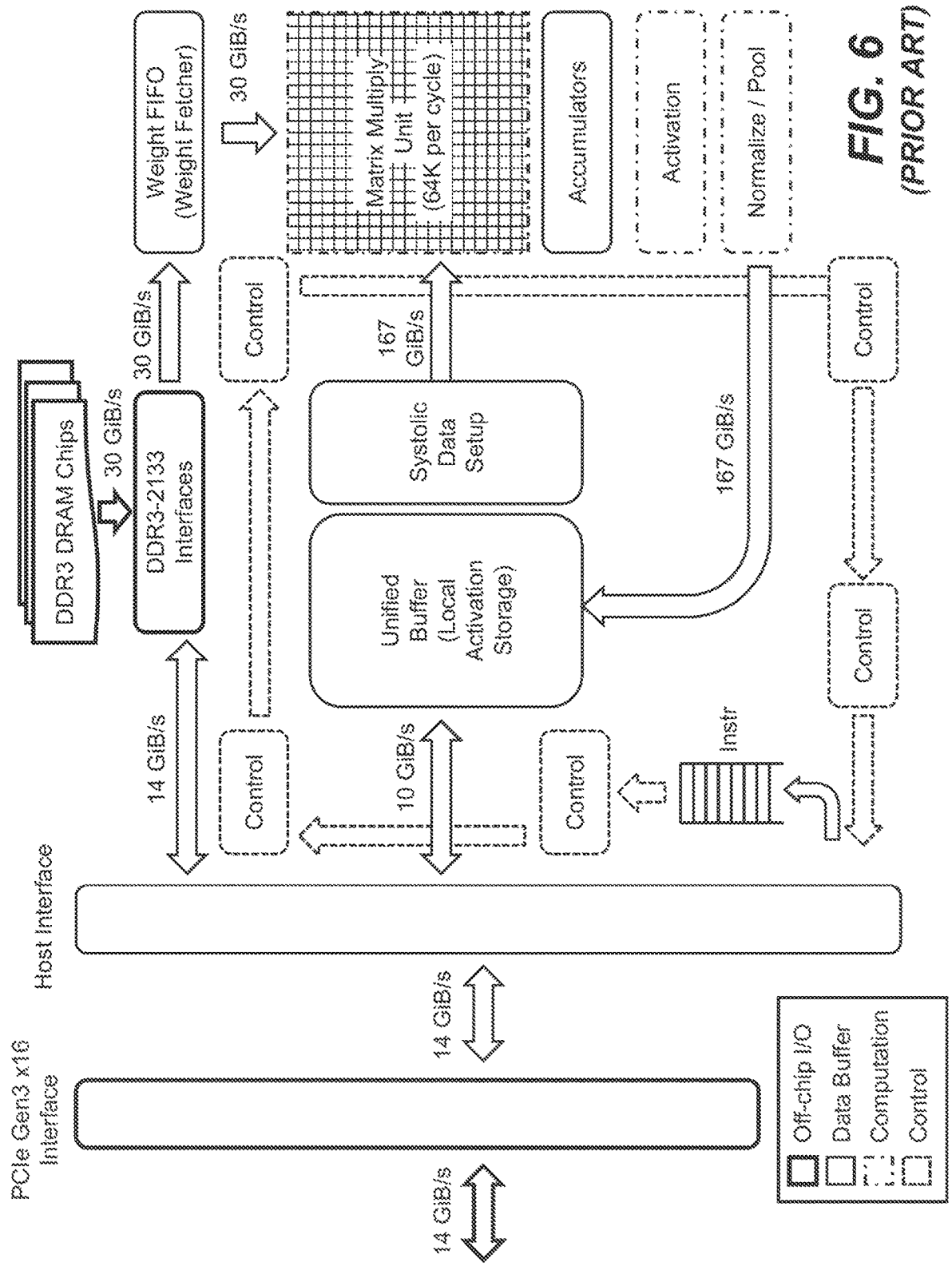
Figure 7:
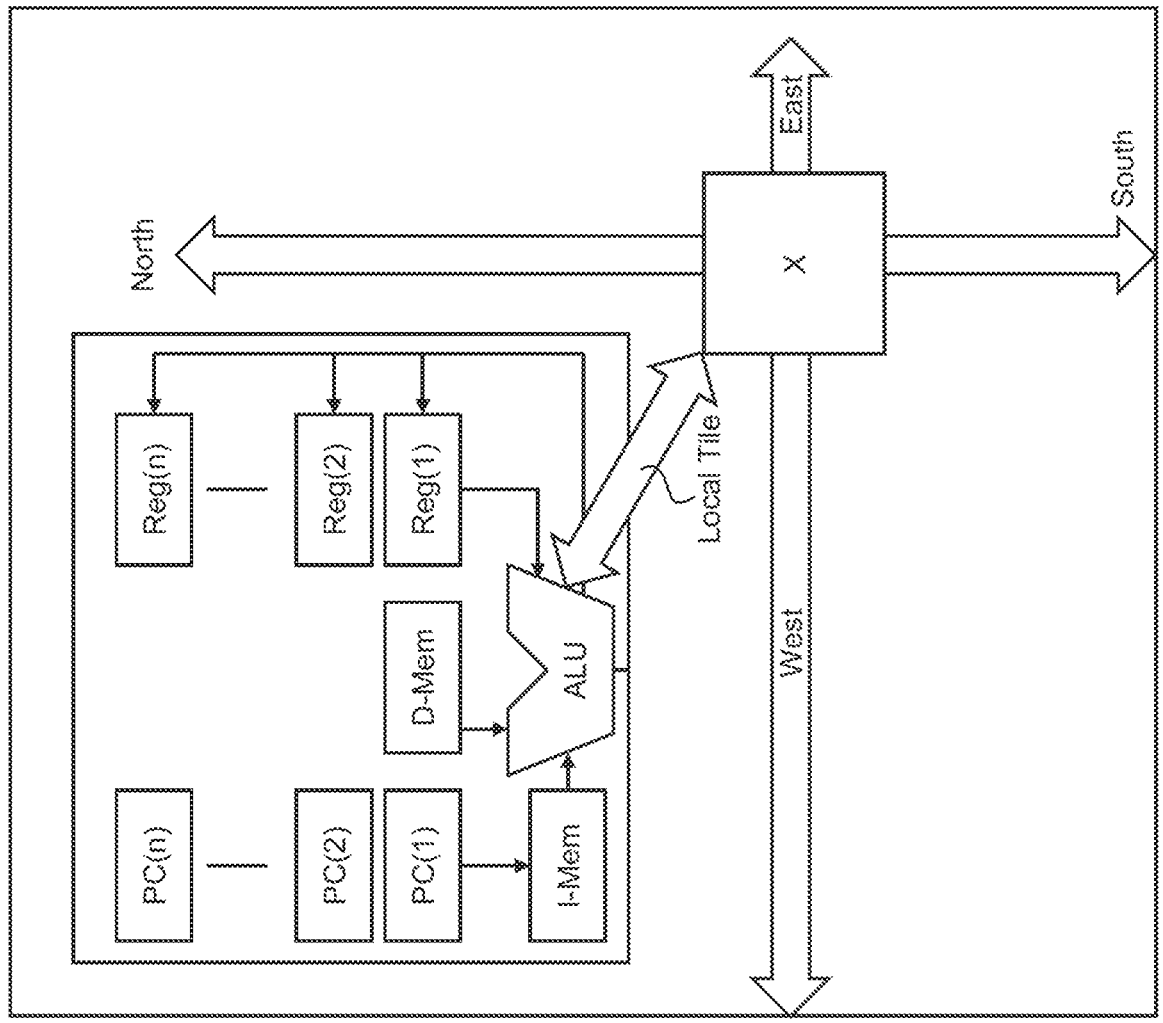
Figure 8:
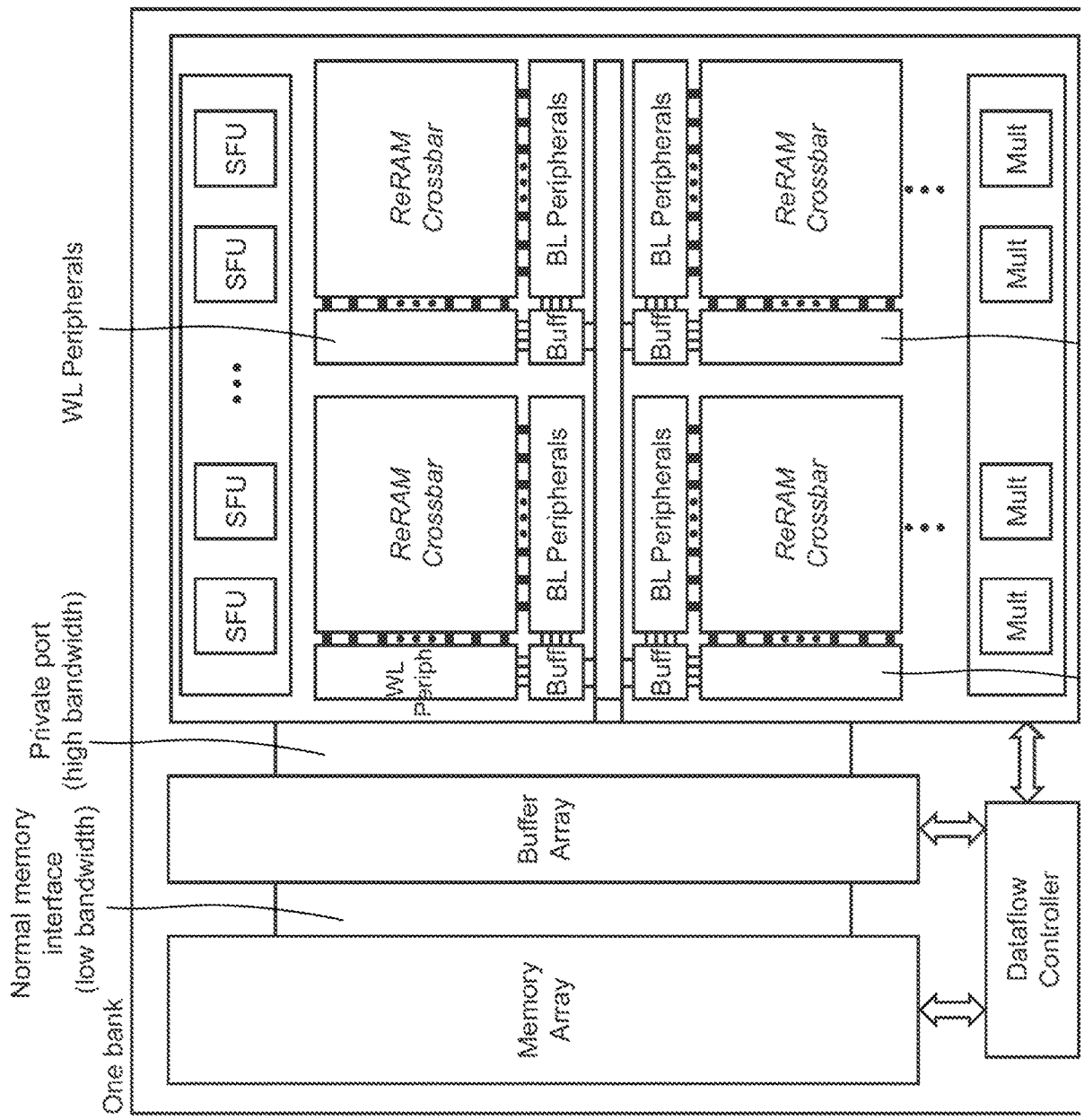
Figure 9:
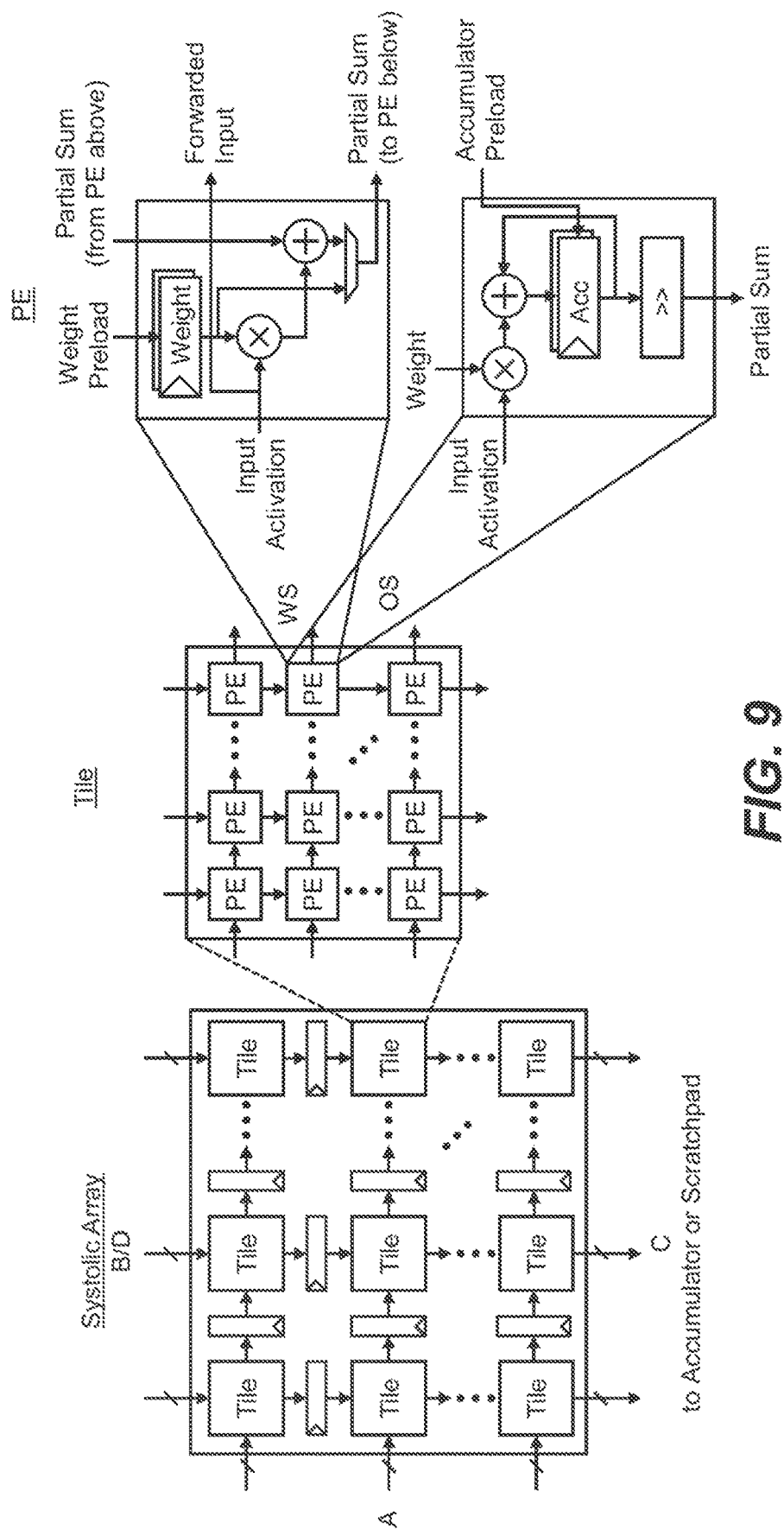
Figure 10A:
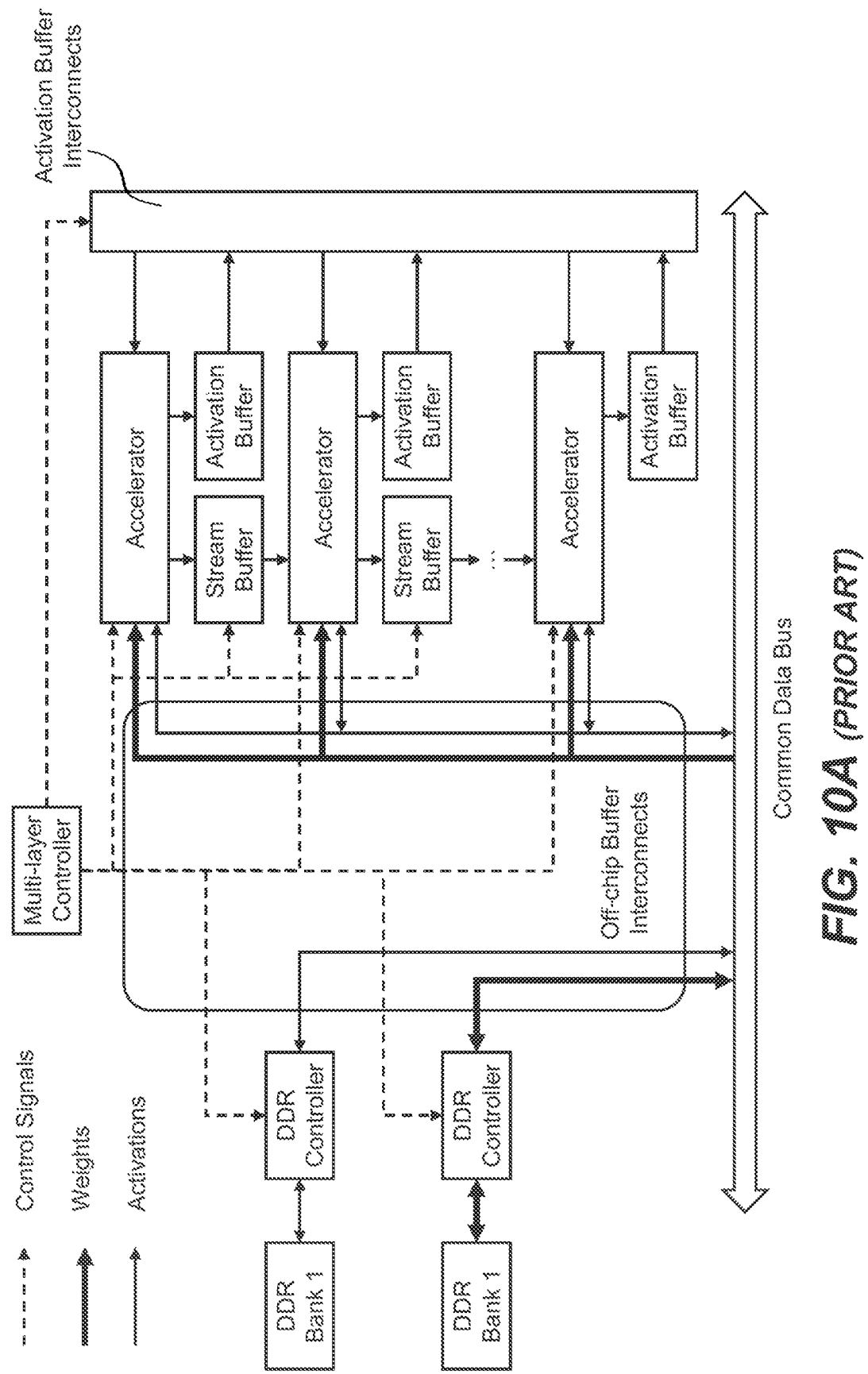
Figure 10B:
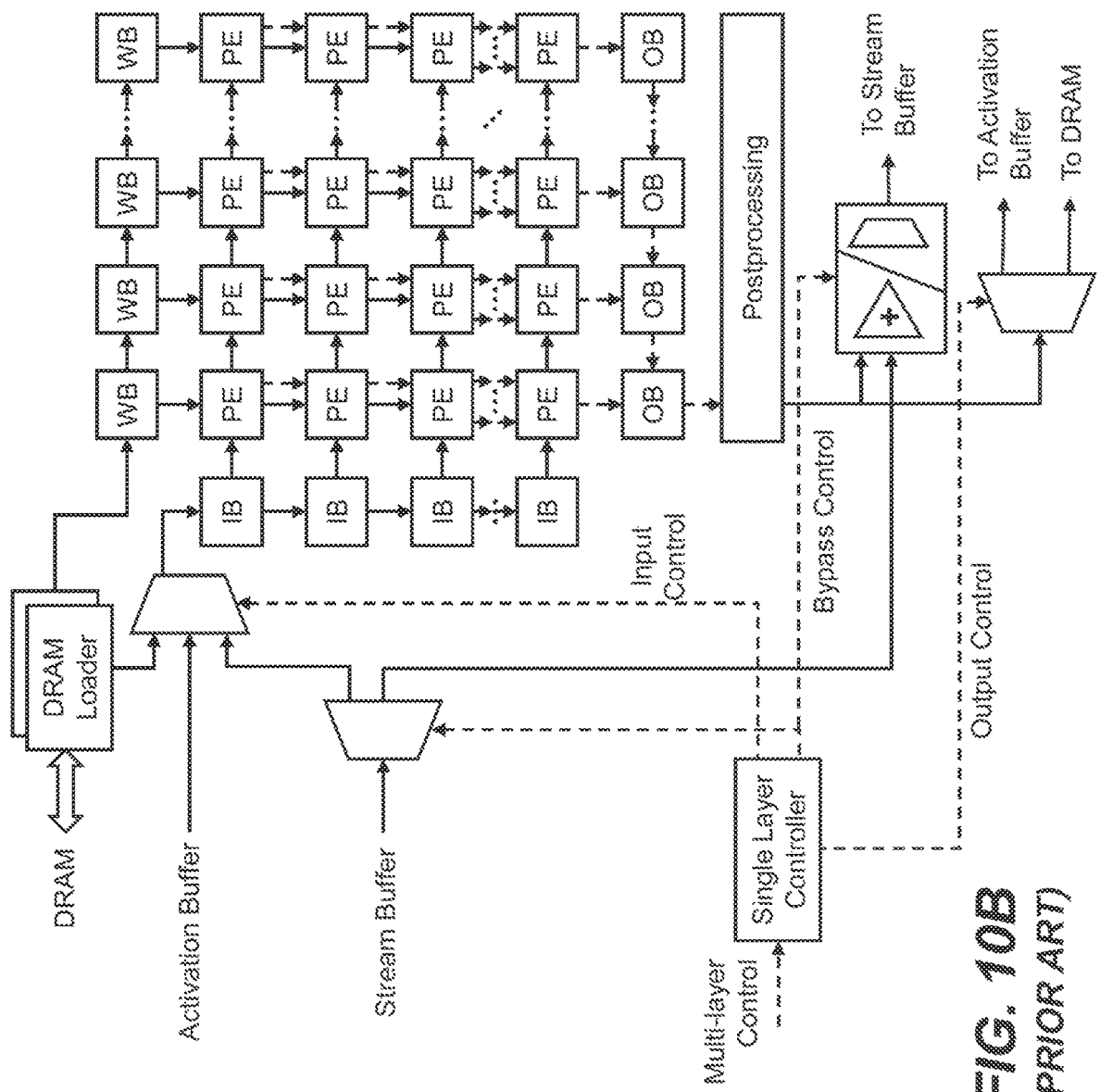
Figure 11:
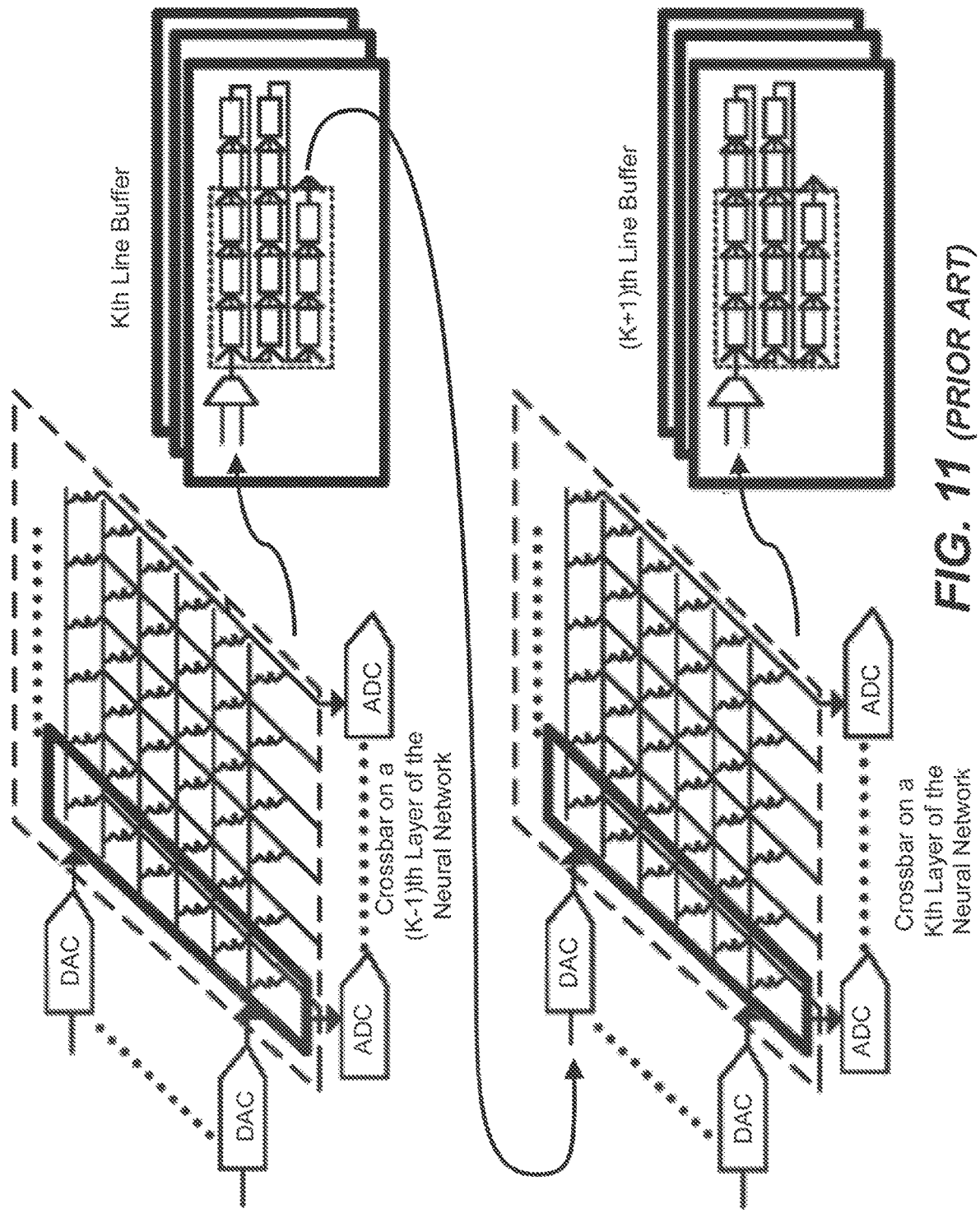
FIGS. 11, 12A, 12B, 13A and 13B depict some multi-core architectures for artificial intelligence applications.
Figure 12A:
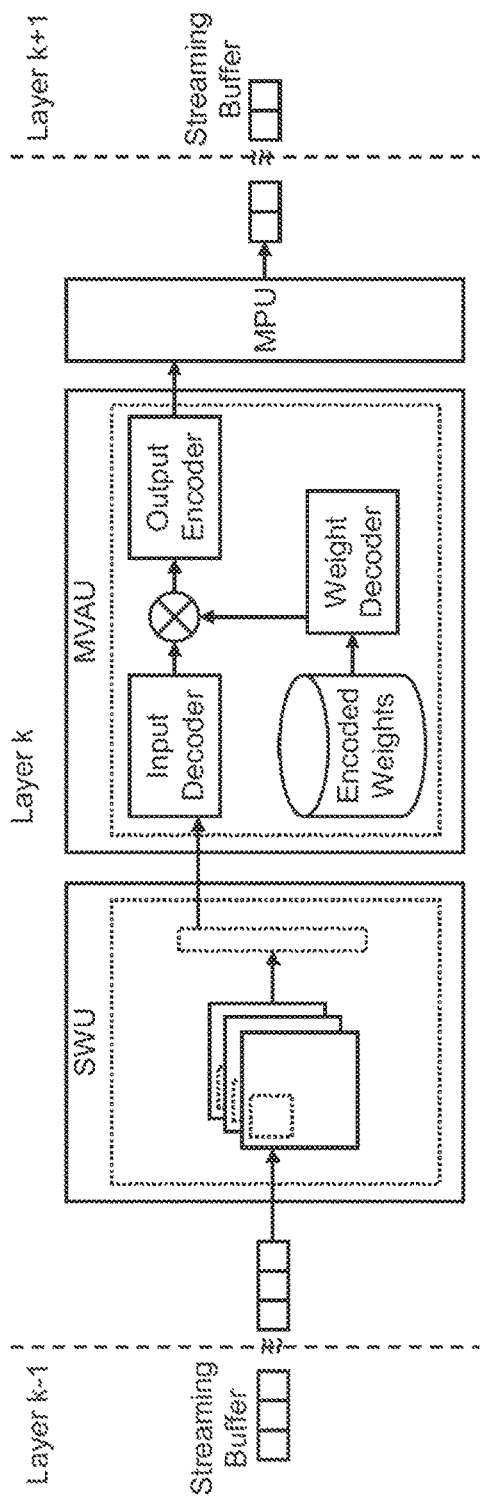
Figure 12B:
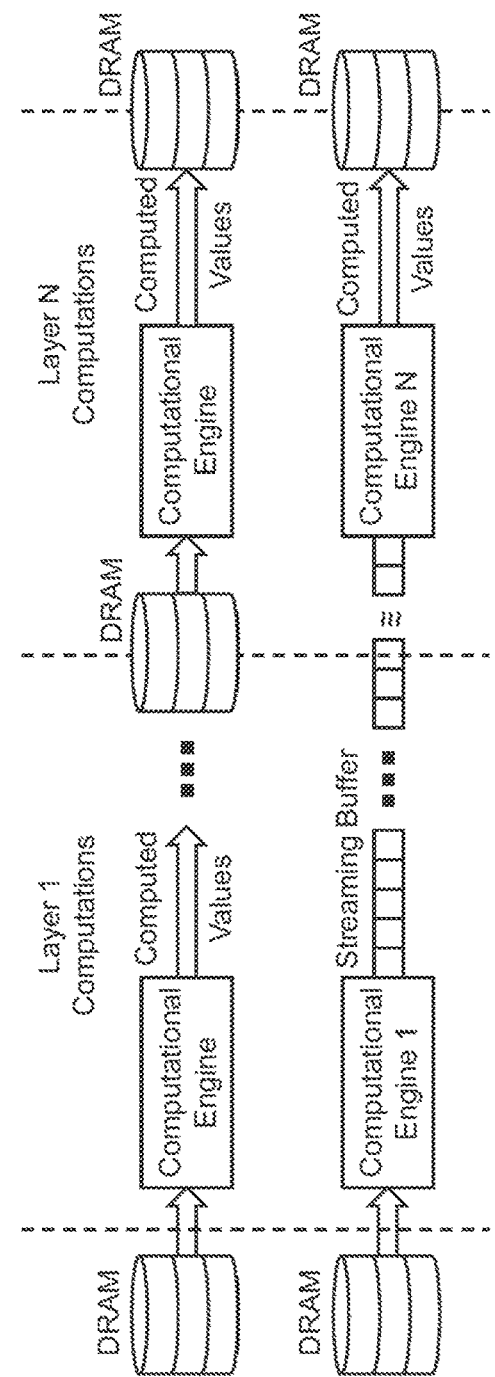
Figure 13A:
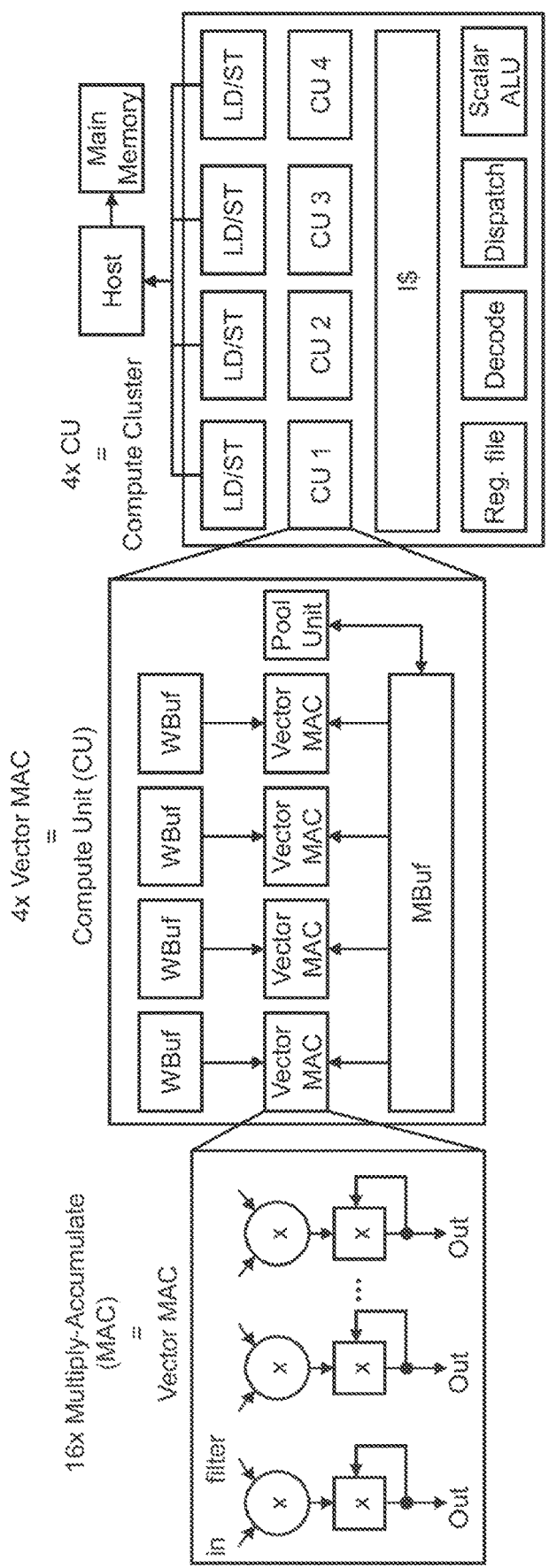
Figure 13B:
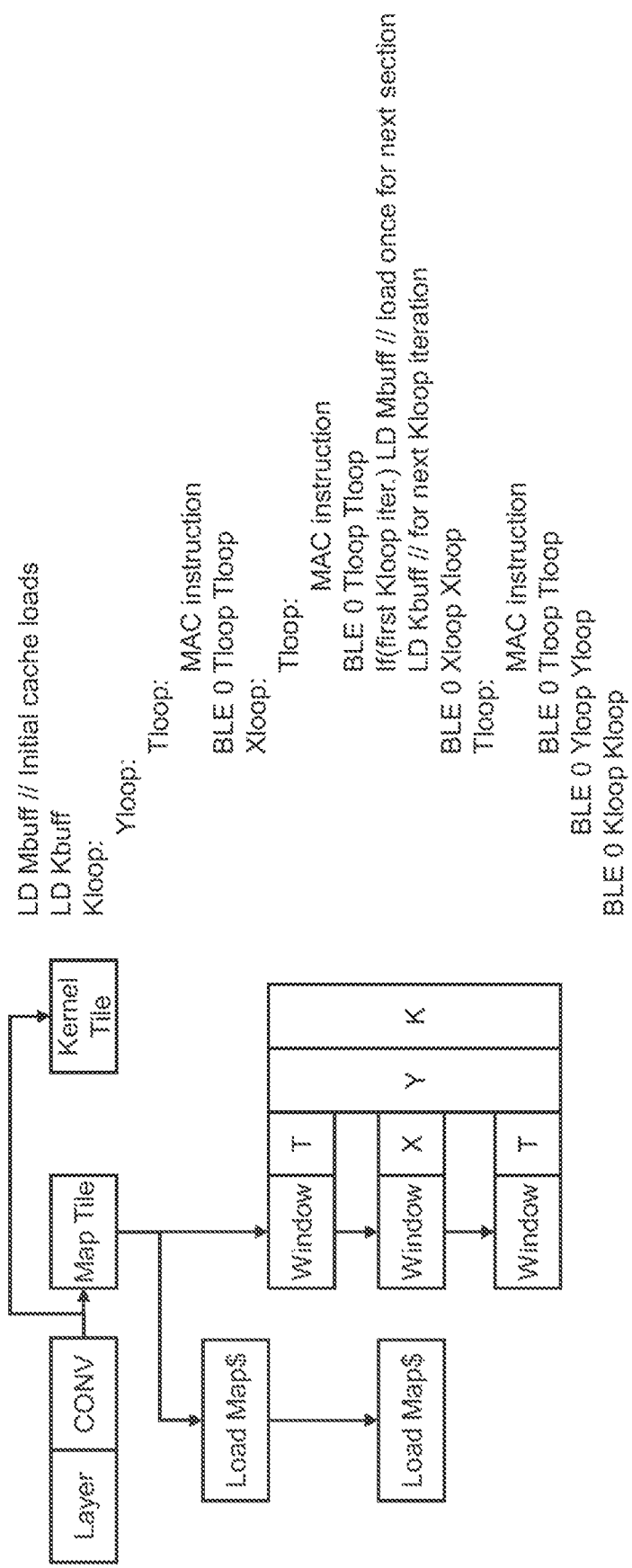

A very common operation on tensor data types is transposition. The TSP supports a two-dimension transpose of 256 elements organized as 16 streams each with 16 elements. A transpose operation takes 16 incoming streams and produces 16 output streams with the rows and columns exchanged. This allows the efficient movement of data from the atomic 16-byte MEM word into 16 different MEM slices where they are now addressable. There are two instances of the SXM on-chip, one in each hemisphere (FIG. 5). Each can issue two (2) transpose instructions, yielding a maximum of four (4) simultaneous transpose 16×16 operations.

The Memory Storage Tiles

In at least one ECIN, each memory partitions (MEM) has 44 slices of ECC-protected SRAM, with each slice comprising 20 tiles that provide a total capacity of 2.5 MiBytes (a Mibyte is 1048576 bytes) per slice, giving the two MEM partitions a total capacity of 220 MiBytes. Each slice includes at least two sets of memory cells referred to as 'banks'. Each MEM slice contains pseudo-dual-port SRAMs that can service a pair of read and write requests simultaneously, assuming they are not targeting the same bank. The 88 slices, each with 2 banks, enables up to 176-way memory concurrency to read operands to or store results from streams. Banks of memory not being used can have their power reduced to reduce energy usage.

The 88 slices provide the needed memory concurrency to supply 32 operands per lane, every cycle. Slices of memory are partitioned into 16-word bytes, each word distributed across a Superlane, and each byte of each word processed by one lane of the Superlane. The memory unit can perform two 16-byte reads and two 16-byte writes per cycle, as long as they access different banks, allowing it to both source and sink data in two directions across all lanes in a Superlane.

The on-chip memory supplies operands for each functional slice by reading an address from a memory (MEM) slice, denoted MEMi. In some embodiments, slices in each memory are numbered 0 to 43, with $MEM_0$ closest to the VXM and $MEM_{43}$ nearest to the SXM.

The memory partitions enable the programming abstraction of a partitioned global shared address space with the address space laid out uniformly across the slices. Each MEM slice supports both direct and stream-indirect addressing modes. Read and Write operations use direct addressing, since the address is fully specified in the instruction itself. Indirect addressing uses the contents of a stream, s, to specify an address map for a Gather or Scatter. With indirect addressing, the physical address comes from the stream value, providing a layer of indirection in the memory referencing.

Each MEM slice has two dedicated dispatch paths, one for each port of the pseudo-dual-ported SRAM. Each memory instruction undergoes an additional address generation stage for strided references by computing the address $a_i$ from the previous address $a_{i-1}$ and strides so that $a_i = a_{i-1} + s$ between locations. Strided memory references are accomplished using a sequence of countdown, step, and iters MEM instructions. In the following example assembly-language snippet, it explicitly scheduled the read and write instructions at program time t=10 to iterate starting at address 0x1000, striding by 24 on each iteration, for 112 total vectors, as shown in the example below for MEM West slice 43.

.MEM West 43
.read
10: read 0x1000, S_0_e
step 24
iters 111
.write
10: write 0x00ff, s_16_w
step 1
iters 111

This iteration mechanism in the address generation circuitry supports up to four-levels of nested iteration allowing for multi-dimensional arrays to efficiently encode tensors as a short sequence of read or write, or gather or scatter, operations followed by countdown, step, and iter instructions to control the loop bounds. The countdown instruction specifies the inter-loop delay in cycles.

For example, assume a 1 GHz operating frequency of the TSP clock. The stream register bandwidth, B, exported by each MEM interface on the East and West edge of each MEM partition keeps the functional modules adequately fed with data operands in order to saturate the peak arithmetic capacity of the functional modules. The stream registers provide a combined capacity of 20 TiB/s of read (operand) and write (result) bandwidth (a Tib is a Mibyte of Mibytes).

To maximize stream concurrency, the compiler allocates memory for tensors concurrent stream operands into separate MEM slices. As the streams propagate through the MEM system they "pick up" the arguments from the MEM slices enroute to the MXM. The compiler explicitly schedules individual banks of each MEM slice to achieve fine-grain memory management. This enables design patterns and use-cases where simultaneous reading of operands from one bank and writing of results to the other bank in the same slice. As an example, the transpose instruction takes 16 input streams and produces 16 output streams with the rows and columns transposed. By using the bank concurrency available within each MEM slice, it is possible to use the pseudodual-ported SRAM for dual read/write accesses per slice.

Figure 21:
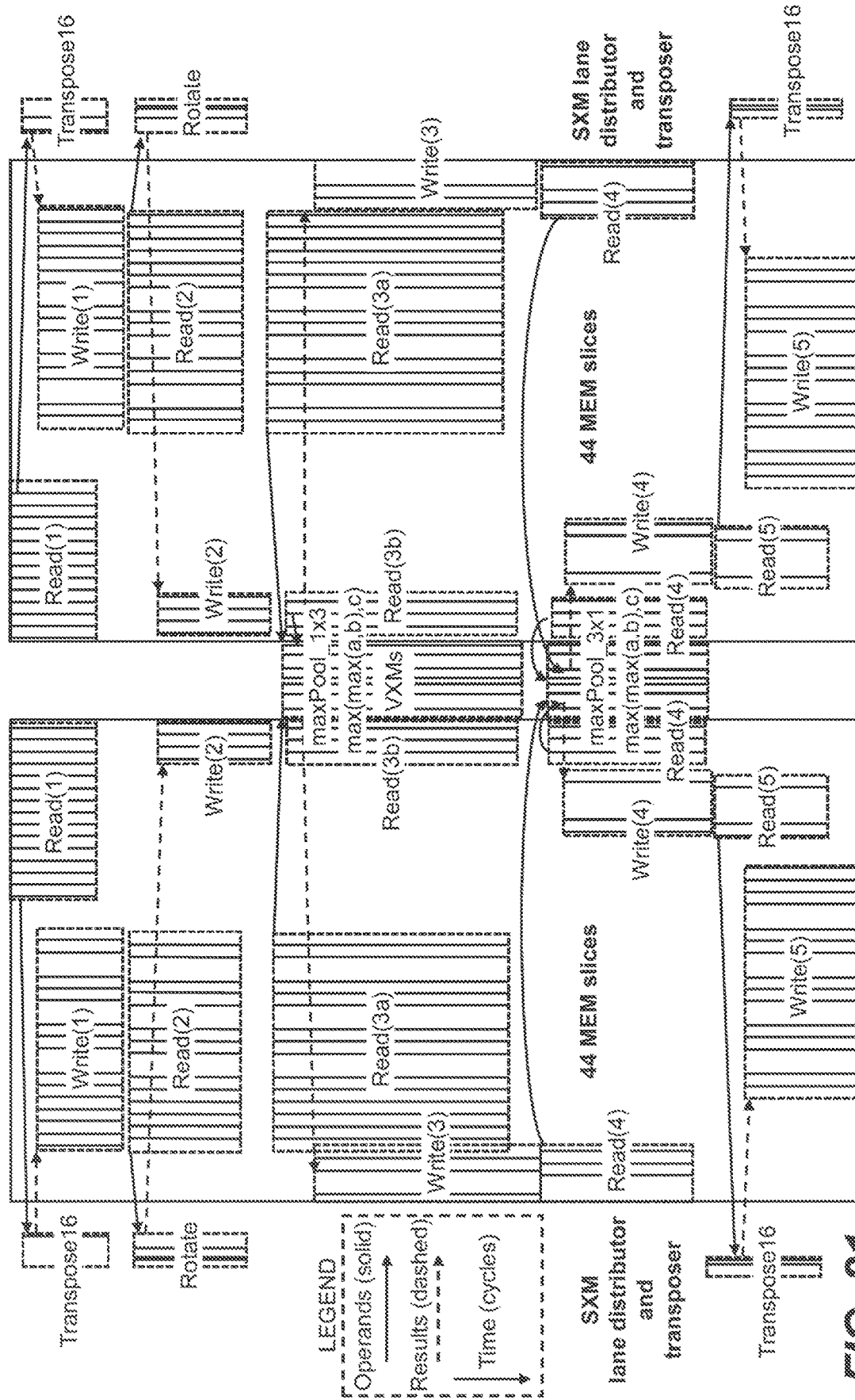
FIG. 21 depicts the different operations (read, write, transpose, rotate, etc.) in a max pooling operation.

An example of this concurrency is shown in FIG. 21, which shows the different operations (read, write, transpose, rotate, etc.) in a max pooling operation. In FIG. 21, the solid lines show operand flow and dotted-line shows result data flow. The 16 concurrent streams are read from memory by Read(1) and sent to the SXM where they undergo a transposition of their elements, and 16 stream results flow back to MEM where they are committed to SRAM by Write(1). In this figure, each operation is preceded by read instructions to provide the stream operands and followed by a write to commit the results back to MEM.

Conventional CPUs rely on a memory hierarchy to implicitly move data between caches to service load/store operations. Cache hierarchies introduce a reactive agent in the data path and the undesired unpredictability, or non-determinism, in the data path to provide the illusion of sequentially consistent memory transactions within the memory hierarchy. The TSP's MEM system is unlike a conventional CPU. Instead, a thin layer of memory management is provided that identifies the memory concurrency on an operation by operation basis. As an example, the Python code below shows the memory management for a transpose operation; an instruction that take 16 streams as input and creates 16 streams of output. The g.malloc function returns a tensor of addresses allocated across 16 memory slices, one for each concurrent stream:

Read from 16 slices onto 16 slices
Transpose data
Write from 16 slices into 16 slices
Import groq as g
tensor=g.random_tensor(shape=[1024, 320],
   dtype=g.Int8, layout=[64, 16])
streams_16=tensor.read(streams=range(16))
streams_16_t=g.transpose16(streams_16)
out_addres=g.malloc(shape=[1024, 320],
   layout=[64, 16])
streams_16_t.write(out_addrs)

The memory units also store VLIW-like instructions, which are 2,304 (144×16) bytes wide. The program fetches instructions when the memory units are otherwise idle; instruction fetches require less than 10% of the total MEM bandwidth. Instructions are decoded and loaded into queues, allowing the program to prefetch. To reduce code size, the REPEAT N instruction repeats the previous instruction N times. Since NOP is the most common instruction, the program can specify it to last for N cycles.

Microprograms

Each functional slice has a predefined set of instructions (e.g., Read, Write, Add, Mul, etc.) that define its supported operations. Furthermore, functional slices consume operands from, and produce results to, streams. A more complex sequence of operations, a microprogram, is composed of one or more slices coordinating in a producer-consumer manner to create one or more output streams. This is accomplished by logically chaining multiple slices together to consume input data from up-stream slices, operate on that data to produce a new result stream, where it later can be consumed by a down-stream slice in a similar manner. In general, each functional slice can choose the direction of its result stream. With this cooperative producer-consumer model operating on data streams, more elaborate operations can chain together different functional slices, for example, where a composite function, $F(x, y, z)=MEM(x) \rightarrow SXM(y) \rightarrow MXM(z)$, is an amalgam of several functional slices chained together.

This dataflow composition exploits 'data flow locality' by passing the same data across multiple functional slices which can operate on the data to produce some output stream. The output from one functional slice can be transferred to the input of another slice allowing for chaining of operations through a common stream register.

The underlying data type supported by the TSP is a vector. The number of elements in each vector can vary from 16 elements, one Superlane, all the way to 320 elements using all 20 Superlanes on-chip. That is, the minimum vector length, or minVL, is 16 bytes and the maximum vector length, or maxVL is a 320 byte-sized element array. Because the vector length can vary from 16 to 320 elements, instructions configure each tile for a low-power mode to effectively power down any unused Superlane (row of the mesh) and reduce the power consumed. This scalable vector approach allows the vector length to grow from 16 to 320 bytes in 16-lane steps, powering-down the unused tiles, yielding a more energy-proportional system.

The TSP's instruction set architecture provides temporal information about each instruction to allow the compiler precise control of each instruction's dispatch time. Each instruction is augmented with the following temporal parameters:

dfunc functional delay—each instruction requires 1 or more cycles to produce its stream output. The dfunc timing parameter allows the compiler to reason about when the output of an instruction will be available on the architecturally-visible stream registers.

dskew instruction-operand skew—the timing relationship between the instruction dispatch time relative to when its stream operands are required. The dskew parameter on each instruction informs the compiler how to schedule the operand arrival times with the instruction dispatch time in order to get them to properly intersect in time and space.

The parameters are necessary to track the exact spatial relationship between instructions and operands.

The execution time of an instruction includes the instruction functional delay, and stream propagation (transit) delay to get from stream register location i (SRi) to j (SRj).

$$T=N+d\text{func}+\square(j,i) \quad (4)$$

Figure 4:
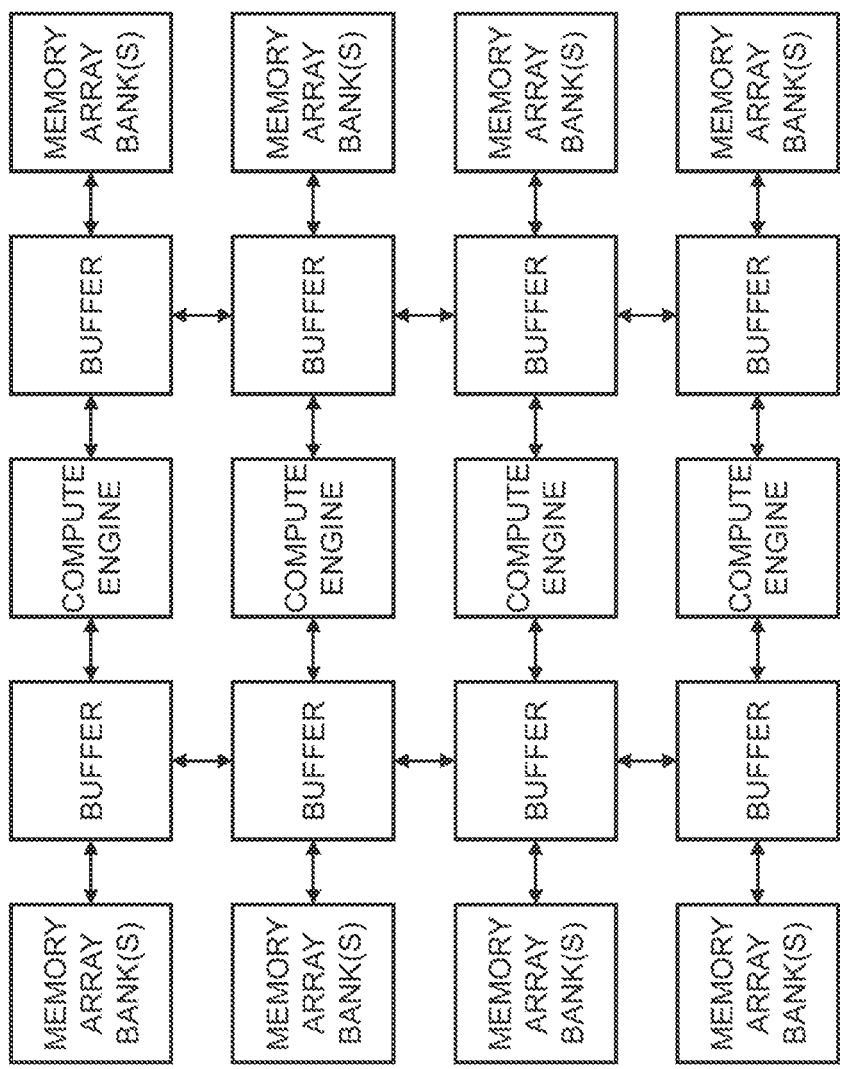

In Equation 4 the time, T, executing an instruction where N is the number of tiles in the functional slice, and dfunc is the functional delay of the instruction being executed (cycles) for the output stream to appear on the SRi (stream register at location i in Figure 4) en route to the consumer at SRj. The transit delay, $\square(j,i)$ is the distance (in cycles) between SRj and SRi.

The TSP programming model relies on two critical elements: (1) scheduling specific data paths in hardware, and (2) exposing temporal information about an instruction's execution latency through the Instruction Set Architecture (ISA), so that the compiler's back-end can precisely track the position and time-of-use of any stream on-chip.

The compiler uses NOP instructions to control the relative timing of the functional slices and the data on which they operate. A NOP has a repeat count 16-bit field which allows one NOP to wait from 1 ns up to 65 μs for a 1 GHz clock. The NOP instruction is implemented in the ICU's tile and common to all functional slices. The NOP allows the slice to turn off the clock enables when performing no operations for anything longer than a few cycles (i.e., n>4 cycles).

Each functional slice is independent; however, the compiler keeps track of a logical program time. Conceptually it is similar to a program counter in a conventional CPU, except the compiler tracks the state of 144 independent program queues on a cycle-by-cycle basis. So, at logical time t the compiler knows the state of each Instruction Queue (IQ) inside each Instruction Control Unit. NOP instructions coordinate the temporal relationship between instructions in the same IQ, or between instructions in different IQs. In addition to repeated-NOPs, a higher-level synchronization across all functional slices on the chip is enabled in order to reason about program correctness is provided, which is the role of the Sync and Notify instructions. They provide a barrier synchronization mechanism across all 144 independent queues on the chip. One IQ is designated as the notifier and it issues a Notify instruction while all other IQs are parked on a Sync instruction. The receipt of the Notify is broadcast to all the IQs to satisfy the pending Sync and begin processing instructions again.

This barrier synchronization is only required once after the TSP resets. However, in practice, each program may start with a set of "preamble" instructions which configure each tile. After that a Sync instruction is performed to ensure that all functional slices are aligned to the same logical time. A chip-wide barrier synchronization can be accomplished in 35 clock cycles, from the time the Notify is issued to the time the Sync is satisfied and retired to allow subsequent instructions to flow. After this compulsory barrier synchronization, the functional slices can compute and communicate results in a synchronization-free manner through the stream registers.

Repeat (n, d) is an ICU instruction issued to repeat a previous instruction n times, with d cycles between each iteration.

.VXM 0
  10: max int8 SG4_0_w, SG4_1_w, SG4_0_w
  rep 54, 1

In the above example, a max arithmetic function is performed in VXM 0 at (cycle) time 10, and repeating that instruction 54 times, with 1 cycle of delay between each iteration. Allowing variable amounts of delay between iterations allows the compiler to temporally align the repeated instruction with its operands in-flight. This simple but flexible iteration mechanism allows the arithmetic slices, which are often highly iterative, to encode their instructions more efficiently by making better use of main memory and reducing the number of Ifetch instructions compared to if the loop were unrolled.

The Ifetch instruction has a single stream operand which carries the instructions in their program order, filling the IQ with 640-bytes (a pair of 320-byte vectors) of instructions. All functional slices can fetch instructions simultaneously with normal instruction execution. The compiler performs omniscient prefetching of the program's instructions to keep all 144 IQs busy on each cycle by inserting Ifetch instructions into every slices' instruction stream. It is imperative that IQs never are empty so that a precise notion of 'logical time' is maintained across the processor.

Data Transfers Between Processor Chips

In at least one ECIN, an on-chip network is used to interconnect cores, or tiles, providing a communication substrate for exchanging data between the tiles. This communication is typically carried out by routing packets among adjacent cores. Typically, packets in the network undergo routing, arbitration, and output port scheduling, and as such often incur conflicts that require arbiters to provide fair access to this shared substrate. Arbiters introduce nondeterminism into the data path and require flow control to avoid overflowing buffer resources. Instead, on each tick of the core clock, the TSP propagates stream values by one stream register hop. The TSP hardware does not track the origin or destination slice, instead streams simply propagate until they fall off the edge of the chip or are overwritten by a functional slice. The TSP uses stream registers within each MEM to move data along a Superlane, and uses the SXM to move data between Superlanes. Each instruction specifies one or more source streams-direction pairs, and a target stream and output direction for the result, effectively providing the direction routing of the stream data.

Figure 22:
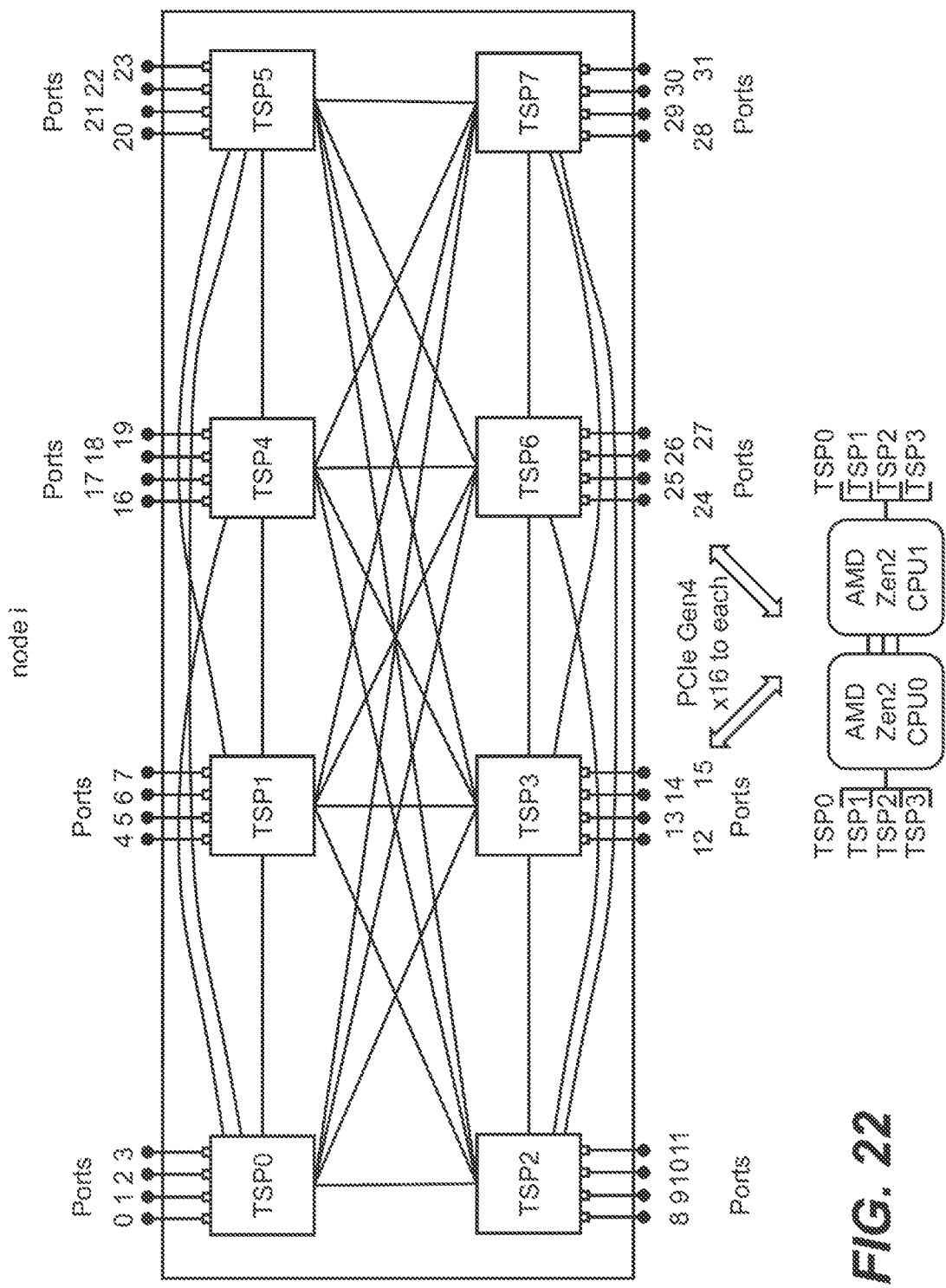
FIG. 22 depicts a network of TSP processors connected via Chip-to-Chip modules.

FIG. 22 depicts a network of TSP processors connected via Chip-to-Chip (C2C) modules for at least one ECIN. The processors logically behave as if all chips share a common clock and are connected via time multiplexed wires. TSP chips connected via C2C do not need to share a clock; reasonable alignment of the frequency of the clocks (measured in PPM) will suffice. The receive buffers in the communications modules must be large enough so that the expected PPMs of clocks don't require a realignment more than once per millisecond. If realignments are required more often, then it can become difficult to schedule between model executions.

C2C modules either provide sufficient Forward Error Correction for data transfer between chips such that unrecoverable errors will occur <1 week per chip when using all C2C links, or provide software with a mechanism to add additional redundancy so that errors will occur <1 week per chip when using all C2C links. If error rates are lower at a lower transfer rate (e.g. 16 Gb/s), then SerDes should be able to run at a lower rate for improved precision.

Transfers of data between TSP chips during the compute phase of a program are supported, e.g. while COMPUTE[i].CHIP[A] is running on chip A, it may send data to COMPUTE[i].CHIP[B] on chip B, which may result in data being returned to COMPUTE[i].CHIP[B] and used before the computation completes. This differs from PCIe (Peripheral Component Interconnect express), which only allows data to be transferred before and after a COMPUTE phase.

Alignment of the C2Cs happens once after the system is bootstrapped, therefore it may involve CSRs if this simplifies the process. Realignment for the C2Cs occurs more often, therefore it may not involve CSRs and must execute quickly and in bounded time. C2C communication can be used to send INITs to neighboring TSP chips, or to receive INITs from neighboring TSP chips. C2C links can be used to bootstrap a chip.

Each C2C SerDes is an independent link, e.g. each link may be the only connection to another device or may be one of multiple connections to another device.

Multi-chip systems can be implemented in a variety of topologies for flexible packaging and deployment in rack-scale and cluster scale systems. Communication occurs in a pair-wise manner between a sender port and a receiver port. The sender performs a MEM read to read the address a onto a stream heading toward the SXM. The SXM will perform a Send on the C2C slice representing the physical port where the data is transmitted. On the other side of the link, after a fixed delay for time-of-flight on the wire, the TSP performing the Receive instruction will pull a 320-byte vector off the channel for every Receive issued.

Performance Issues

The number of signals internal to a functional module, and between functional modules is limited by the 'pitch' (distance between a pair of wires) which determines the wire density (wire/mm) that can be exploited. For example, a 50 nm pitch, implies a maximum of 20K wires per mm. Obviously, that is using every single available wire, which is never possible, so let's assume 50% utilization of those wires, or 10K per mm. A single Superlane has: (2 directions)×(138 bits per stream)×32 streams=8,832 wires which is <10K/mm as computed above. Across the bisection of the chip, there are (20 Superlanes)×(8,832 wires)=176,640 wires, for an on-chip network capacity of 160 TB/s operating at 900 MHz.

Although the TSP provides 205 teraflop/s for FP16 data (with FP32 accumulators) at 1.0 GHz, it provides four times more INT8 operations than FP16 operations. Some users prefer INT16 or FP16 for inferencing certain models, so the TSP can handle these data types as well. The 220 MB of on-chip memory can hold models as big as Bertbase (110 million parameters); larger models must be divided across multiple TSP chips.

To illustrate operation of the TSP, it is possible to process 20,400 images per second (IPS) for ResNet-50 inference while running the TSP at 900 MHz. If faster inference is required, such as 1,000 TOPS, a higher system clock is required, for example, a 1.25 GHz clock speed.

One advantage of the TSP architecture is that it doesn't require large batches for optimal performance. A single TSP can achieve peak throughput while processing one image at a time. By contrast, other inference devices using prior art architectures, require, by way of example, a 128-image batch size.

The Compiler

In at least one ECIN, the TSP uses a compiler on a host computer that analyzes a model (e.g., a machine learning model such as a TensorFlow model) and generates an instruction stream targeting the processor TSP architecture. The compiler coordinates the control and data flow of the program and specifies any instruction-level parallelism by explicitly bundling instructions that can and should execute concurrently so that they are dispatched together. Preferably, synchronization occurs at the start of every program and all data is processed asynchronously because use of the TSP architecture is precisely scheduled over the course of running an entire program, routines or tasks. In some ECINs, the compiler schedules data movement along and among the Superlines, and schedules instructions for the tiles in each slice. In other ECINs, programmers use an application programming interface to explicitly control the scheduling.

The architecture of the TSP relies on the compiler to handle the complexities associated with instruction scheduling. The scheduling of instructions by the compiler may involve selecting one of several means by which an algorithm is enabled on the functional slices of the processor. Removing the control complexity of dynamic instruction scheduling for multi-issue execution units allows the ICUs to be relatively small, e.g., accounting for less 3% of an area of the processor.

The compiler has access to several architecturally-visible functionalities, i.e., (i) the 320-lane programming abstraction, (ii) 144 independent instruction queues (IQs) on-chip, (iii) 64 logical streams per lane, and (iv) 220 MB of globally shared SRAM. Each of the 144 independent on-chip ICUs can issue one or more instructions per clock cycle. The compiler has explicit control of the program order in each instruction queue. The 220 MB of globally shared SRAM may deliver 32 bytes per lane of stream bandwidth and low-latency access to model parameters. For example, MEM can read and MXM can install more than e.g., 100,000 weights into a 320×320 array in less than 30 clock cycles including SRAM and on-chip network transit delays. It should be noted that the values provided herein represent one possible embodiment, and in other embodiments some of these values may differ.

The compiler performs resource allocation in both time and space across the processor, i.e., the compiler solves a two-dimensional (time-space) scheduling of the data flows and the instruction and control flows. The compiler is responsible for exact matching (intersection) in time and space of the data flows with corresponding instruction and control flows.

An instruction set architecture of the processor includes temporal information about each instruction to allow the compiler precise control of each instruction's dispatch time. Each instruction can be augmented with the following temporal parameters: a functional delay ($d_{func}$) and an instruction-operand skew ($d_{skew}$). Each instruction requires one or more clock cycles to produce its stream output, which represents a functional delay timing parameter. The functional delay timing parameter allows the compiler to determine when an output of an instruction will be available on the architecturally-visible STREAMs. The instruction-operand skew parameter can be defined as a timing relationship between the instruction dispatch time relative to when its stream operands are required. An instruction-operand skew parameter for an instruction informs the compiler how to schedule operand arrival times with an instruction dispatch time in order to get them to properly intersect in time and space. The functional delay timing parameter and the instruction-operand skew parameter are necessary to track the exact spatial relationship between instructions and operands in the processor.

An execution time T of an instruction includes a functional delay of the instruction and a stream propagation (transit) delay to flow from STREAM i ($SR_i$) to STREAM j ($SR_j$), i.e., $T=N+d_{func}+\delta(j,i)$, where N is a number of tiles in a functional slice, $d_{func}$ is a functional delay of the instruction being executed (e.g., in clock cycles) for an output stream to appear on the $SR_i$, and $\delta(j,i)$ is a transit delay distance (e.g., in clock cycles) between the $SR_j$ and the $SR_i$.

Detailed Description—Technology Support from Data/Instructions to Processors/Programs Data and Information. While 'data' and 'information' often are used interchangeably (e.g., 'data processing' and 'information processing'), the term 'datum' (plural 'data') typically signifies a representation of the value of a fact (e.g., the measurement of a physical quantity such as the current in a wire, or the price of gold), or the answer to a question (e.g., "yes" or "no"), while the term 'information' typically signifies a set of data with structure (often signified by 'data structure'). A data structure is used in commerce to transform an electronic device for use as a specific machine as an article of manufacture (see In re Lowry, 32 F.3d 1579 [CAFC, 1994]). Data and information are physical objects, for example binary data (a 'bit', usually signified with '0' and '1') enabled with two levels of voltage in a digital circuit or electronic component. For example, data can be enabled as an electrical, magnetic, optical or acoustical signal or state; a quantum state such as a particle spin that enables a 'qubit'; or a physical state of an atom or molecule. All such data and information, when enabled, are stored, accessed, transferred, combined, compared, or otherwise acted upon, actions that require and dissipate energy.

As used herein, the term 'process' signifies an artificial finite ordered set of physical actions ('action' also signified by 'operation' or 'step') to produce at least one result. Some types of actions include transformation and transportation. An action is a technical application of one or more natural laws of science or artificial laws of technology. An action often changes the physical state of a machine, of structures of data and information, or of a composition of matter. Two or more actions can occur at about the same time, or one action can occur before or after another action, if the process produces the same result. A description of the physical actions and/or transformations that comprise a process are often signified with a set of gerund phrases (or their semantic equivalents) that are typically preceded with the signifier 'the steps of' (e.g., "a process comprising the steps of measuring, transforming, partitioning and then distributing . . . "). The signifiers 'algorithm', 'method', 'procedure', '(sub)routine', 'protocol', 'recipe', and 'technique' often are used interchangeably with 'process', and 35 U.S.C. 100 defines a "method" as one type of process that is, by statutory law, always patentable under 35 U.S.C. 101. As used herein, the term 'thread' signifies a subset of an entire process. A process can be partitioned into multiple threads that can be used at or about at the same time.

As used herein, the term 'rule' signifies a process with at least one logical test (signified, e.g., by 'IF test IS TRUE THEN DO process')). As used herein, a 'grammar' is a set of rules for determining the structure of information. Many forms of knowledge, learning, skills and styles are authored, structured, and enabled—objectively—as processes and/or rules—e.g., knowledge and learning as functions in knowledge programming languages.

As used herein, the term 'component' (also signified by 'part', and typically signified by 'element' when described in a patent text or diagram) signifies a physical object that is used to enable a process in combination with other components. For example, electronic components are used in processes that affect the physical state of one or more electromagnetic or quantum particles/waves (e.g., electrons, photons) or quasiparticles (e.g., electron holes, phonons, magnetic domains) and their associated fields or signals. Electronic components have at least two connection points which are attached to conductive components, typically a conductive wire or line, or an optical fiber, with one conductive component end attached to the component and the other end attached to another component, typically as part of a circuit with current or photon flows. There are at least three types of electrical components: passive, active and electromechanical. Passive electronic components typically do not introduce energy into a circuit—such components include resistors, memristors, capacitors, magnetic inductors, crystals, Josephson junctions, transducers, sensors, antennas, waveguides, etc. Active electronic components require a source of energy and can inject energy into a circuit—such components include semiconductors (e.g., diodes, transistors, optoelectronic devices), vacuum tubes, batteries, power supplies, displays (e.g., LEDs, LCDs, lamps, CRTs, plasma displays). Electromechanical components affect current flow using mechanical forces and structures—such components include switches, relays, protection devices (e.g., fuses, circuit breakers), heat sinks, fans, cables, wires, terminals, connectors and printed circuit boards.

As used herein, the term 'netlist' is a specification of components comprising an electric circuit, and electrical connections between the components. The programming language for the SPICE circuit simulation program is often used to specify a netlist. In the context of circuit design, the term 'instance' signifies each time a component is specified in a netlist.

One of the most important components as goods in commerce is the integrated circuit, and its res of abstractions. As used herein, the term 'integrated circuit' signifies a set of connected electronic components on a small substrate (thus the use of the signifier 'chip') of semiconductor material, such as silicon or gallium arsenide, with components fabricated on one or more layers. Other signifiers for 'integrated circuit' include 'monolithic integrated circuit', 'IC', 'chip', 'microchip' and 'System on Chip' ('SoC'). Examples of types of integrated circuits include gate/logic arrays, processors, memories, interface chips, power controllers, and operational amplifiers. The term 'cell' as used in electronic circuit design signifies a specification of one or more components, for example, a set of transistors that are connected to function as a logic gate. Cells are usually stored in a database, to be accessed by circuit designers and design processes.

As used herein, the term 'module' signifies a tangible structure for acting on data and information. For example, the term 'module' can signify a process that transforms data and information, for example, a process comprising a computer program (defined below). The term 'module' also can signify one or more interconnected electronic components, such as digital logic devices. A process comprising a module, if specified in a programming language (defined below), such as System C or Verilog, also can be transformed into a specification for a structure of electronic components that transform data and information that produce the same result as the process. This last sentence follows from a modified Church-Turing thesis, which is simply expressed as "Whatever can be transformed by a (patentable) process and a processor, can be transformed by a (patentable) equivalent set of modules.", as opposed to the doublethink of deleting only one of the "(patentable)".

A module is permanently structured (e.g., circuits with unalterable connections), temporarily structured (e.g., circuits or processes that are alterable with sets of data), or a combination of the two forms of structuring. Permanently structured modules can be manufactured, for example, using Application Specific Integrated Circuits ('ASICs') such as Arithmetic Logic Units ('ALUs'), Programmable Logic Arrays ('PLAs'), or Read Only Memories ('ROMs'), all of which are typically structured during manufacturing. For example, a permanently structured module can comprise an integrated circuit. Temporarily structured modules can be manufactured, for example, using Field Programmable Gate Arrays (FPGAs—for example, sold by Xilink or Intel's Altera), Random Access Memories (RAMs) or microprocessors. For example, data and information is transformed using data as an address in RAM or ROM memory that stores output data and information. One can embed temporarily structured modules in permanently structured modules (for example, a FPGA embedded into an ASIC).

Modules that are temporarily structured can be structured during multiple time periods. For example, a processor comprising one or more modules has its modules first structured by a manufacturer at a factory and then further structured by a user when used in commerce. The processor can comprise a set of one or more modules during a first time period, and then be restructured to comprise a different set of one or modules during a second time period. The decision to manufacture or implement a module in a permanently structured form, in a temporarily structured form, or in a combination of the two forms, depends on issues of commerce such as cost, time considerations, resource constraints, tariffs, maintenance needs, national intellectual property laws, and/or specific design goals. How a module is used, its function, is mostly independent of the physical form in which it is manufactured or enabled. This last sentence also follows from the modified Church-Turing thesis.

As used herein, the term 'processor' signifies a tangible data and information processing machine for use in commerce that physically transforms, transfers, and/or transmits data and information, using at least one process. A processor consists of one or more modules, e.g., a central processing unit ('CPU') module; an input/output ('I/O') module, a memory control module, a network control module, and/or other modules. The term 'processor' can also signify one or more processors, or one or more processors with multiple computational cores/CPUs, specialized processors (for example, graphics processors or signal processors), and their combinations. Where two or more processors interact, one or more of the processors can be remotely located relative to the position of the other processors. Where the term 'processor' is used in another context, such as a 'chemical processor', it will be signified and defined in that context.

The processor can comprise, for example, digital logic circuitry (for example, a binary logic gate), and/or analog circuitry (for example, an operational amplifier). The processor also can use optical signal processing, DNA transformations, quantum operations, microfluidic logic processing, or a combination of technologies, such as an optoelectronic processor. For data and information structured with binary data, any processor that can transform data and information using the AND, OR and NOT logical operations (and their derivatives, such as the NAND, NOR, and XOR operations) also can transform data and information using any function of Boolean logic. A processor such as an analog processor, such as an artificial neural network, also can transform data and information. No scientific evidence exists that any of these technological processors are processing, storing and retrieving data and information, using any process or structure equivalent to the bioelectric structures and processes of the human brain.

The one or more processors also can use a process in a 'cloud computing' or 'timesharing' environment, where time and resources of multiple remote computers are shared by multiple users or processors communicating with the computers. For example, a group of processors can use at least one process available at a distributed or remote system, these processors using a communications network (e.g., the Internet, or an Ethernet) and using one or more specified network interfaces ('interface' defined below) (e.g., an application program interface ('API') that signifies functions and data structures to communicate with the remote process).

As used herein, the term 'computer' and 'computer system' (further defined below) includes at least one processor that, for example, performs operations on data and information such as (but not limited to) the Boolean logical operations using electronic gates that can comprise transistors, with the addition of memory (for example, memory structured with flip-flops using the NOT-AND or NOT-OR operation). Any processor that can perform the logical AND, OR and NOT operations (or their equivalent) is Turing-complete and computationally universal [FACT]. A computer can comprise a simple structure, for example, comprising an I/O module, a CPU module, and a memory that performs, for example, the process of inputting a signal, transforming the signal, and outputting the signal with no human intervention.

As used herein, the term 'programming language' signifies a structured grammar for specifying sets of operations and data for use by modules, processors and computers. Programming languages include assembler instructions, instruction-set-architecture instructions, machine instructions, machine dependent instructions, microcode, firmware instructions, state-setting data, or either source code or object code written in any combination of one or more higher level languages, for example, the C programming language and similar general programming languages (such as Fortran, Basic, Javascript, PHP, Python, C++), knowledge programming languages (such as Lisp, Smalltalk, Prolog, or CycL), electronic structure programming languages (such as VHDL, Verilog, SPICE or SystemC), text programming languages (such as SGML, HTML, or XML), or audiovisual programming languages (such as SVG, MathML, X3D/VRML, or MIDI), and any future equivalent programming languages. As used herein, the term 'source code' signifies a set of instructions and data specified in text form using a programming language. A large amount of source code for use in enabling any of the claimed inventions is available on the Internet, such as from a source code library such as Github.

As used herein, the term 'program' (also referred to as an 'application program') signifies one or more processes and data structures that structure a module, processor or computer to be used as a "specific machine" (see In re Alappat, 33 F3d 1526 [CAFC, 1991]). One use of a program is to structure one or more computers, for example, standalone, client or server computers, or one or more modules, or systems of one or more such computers or modules. As used herein, the term 'computer application' signifies a program that enables a specific use, for example, to enable text processing operations, or to encrypt a set of data. As used herein, the term 'firmware' signifies a type of program that typically structures a processor or a computer, where the firmware is smaller in size than a typical application program, and is typically not very accessible to or modifiable by the user of a computer. Computer programs and firmware are often specified using source code written in a programming language, such as C. Modules, circuits, processors, programs and computers can be specified at multiple levels of abstraction, for example, using the SystemC programming language, and have value as products in commerce as taxable goods under the Uniform Commercial Code (see U.C.C. Article 2, Part 1).

A program is transferred into one or more memories of the computer or computer system from a data and information device or storage system. A computer system typically has a device for reading storage media that is used to transfer the program, and/or has an interface device that receives the program over a network. This transfer is discussed in the General Computer Explanation section.

Detailed Description—Technology Support General Computer Explanation

Figures A and B are abstract diagrams of a computer system suitable for enabling embodiments of the claimed inventions.

In Figure A, the structure of computer system 10 typically includes at least one computer 14 which communicates with peripheral devices via bus subsystem 12. Typically, the computer includes a processor (e.g., a microprocessor, graphics processing unit, or digital signal processor), or its electronic processing equivalents, such as an Application Specific Integrated Circuit ('ASIC') or Field Programmable Gate Array ('FPGA'). Typically, peripheral devices include a storage subsystem 24, comprising a memory subsystem 26 and a file storage subsystem 28, user interface input devices 22, user interface output devices 20, and/or a network interface subsystem 16. The input and output devices enable direct and remote user interaction with computer system 10. The computer system enables significant post-process activity using at least one output device and/or the network interface subsystem.

The computer system can be structured as a server, a client, a workstation, a mainframe, a personal computer (PC), a tablet PC, a set-top box (STB), a personal digital assistant (PDA), a cellular telephone, a smartphone, a web appliance, a rack-mounted 'blade', a kiosk, a television, a game station, a network router, switch or bridge, or any data processing machine with instructions that specify actions to be taken by that machine. The term 'server', as used herein, refers to a computer or processor that typically performs processes for, and sends data and information to, another computer or processor.

A computer system typically is structured, in part, with at least one operating system program, such as Microsoft's Windows, Sun Microsystems's Solaris, Apple Computer's MacOs and iOS, Google's Android, Linux and/or Unix. The computer system typically includes a Basic Input/Output System (BIOS) and processor firmware. The operating system, BIOS and firmware are used by the processor to structure and control any subsystems and interfaces connected to the processor. Typical processors that enable these operating systems include: the Pentium, Itanium and Xeon processors from Intel; the Opteron and Athlon processors from Advanced Micro Devices; the Graviton processor from Amazon; the POWER processor from IBM; the SPARC processor from Oracle; and the ARM processor from ARM Holdings.

Any ECIN is limited neither to an electronic digital logic computer structured with programs nor to an electronically programmable device. For example, the claimed inventions can use an optical computer, a quantum computer, an analog computer, or the like. Further, where only a single computer system or a single machine is signified, the use of a singular form of such terms also can signify any structure of computer systems or machines that individually or jointly use processes. Due to the ever-changing nature of computers and networks, the description of computer system 10 depicted in Figure A is intended only as an example. Many other structures of computer system 10 have more or less components than the computer system depicted in Figure A.

Network interface subsystem 16 provides an interface to outside networks, including an interface to communication network 18, and is coupled via communication network 18 to corresponding interface devices in other computer systems or machines. Communication network 18 can comprise many interconnected computer systems, machines and physical communication connections (signified by 'links'). These communication links can be wireline links, optical links, wireless links (e.g., using the WiFi or Bluetooth protocols), or any other physical devices for communication of information. Communication network 18 can be any suitable computer network, for example a wide area network such as the Internet, and/or a local-to-wide area network such as Ethernet. The communication network is wired and/or wireless, and many communication networks use encryption and decryption processes, such as is available with a virtual private network. The communication network uses one or more communications interfaces, which receive data from, and transmit data to, other systems. Embodiments of communications interfaces typically include an Ethernet card, a modem (e.g., telephone, satellite, cable, or ISDN), (asynchronous) digital subscriber line (DSL) unit, Firewire interface, USB interface, and the like. Communication algorithms ('protocols') can be specified using one or communication languages, such as HTTP, TCP/IP, RTP/RTSP, IPX and/or UDP.

User interface input devices 22 can include an alphanumeric keyboard, a keypad, pointing devices such as a mouse, trackball, toggle switch, touchpad, stylus, a graphics tablet, an optical scanner such as a bar code reader, touchscreen electronics for a display device, audio input devices such as voice recognition systems or microphones, eye-gaze recognition, brainwave pattern recognition, optical character recognition systems, and other types of input devices. Such devices are connected by wire or wirelessly to a computer system. Typically, the term 'input device' signifies all possible types of devices and processes to transfer data and information into computer system 10 or onto communication network 18. User interface input devices typically enable a user to select objects, icons, text and the like that appear on some types of user interface output devices, for example, a display subsystem.

User interface output devices 20 can include a display subsystem, a printer, a fax machine, or a non-visual communication device such as audio and haptic devices. The display subsystem can include a cathode ray tube (CRT), a flat-panel device such as a liquid crystal display (LCD), an image projection device, or some other device for creating visible stimuli such as a virtual reality system. The display subsystem also can provide non-visual stimuli such as via audio output, aroma generation, or tactile/haptic output (e.g., vibrations and forces) devices. Typically, the term 'output device' signifies all possible types of devices and processes to transfer data and information out of computer system 10 to the user or to another machine or computer system. Such devices are connected by wire or wirelessly to a computer system. Note: some devices transfer data and information both into and out of the computer, for example, haptic devices that generate vibrations and forces on the hand of a user while also incorporating sensors to measure the location and movement of the hand. Technical applications of the sciences of ergonomics and semiotics are used to improve the efficiency of user interactions with any processes and computers disclosed herein, such as any interactions with regards to the design and manufacture of circuits, that use any of the above input or output devices.

Memory subsystem 26 typically includes a number of memories including a main random-access memory ('RAM') 30 (or other volatile storage device) for storage of instructions and data during program execution and a read only memory ('ROM') 32 in which fixed instructions are stored. File storage subsystem 28 provides persistent storage for program and data files, and can include a hard disk drive, a floppy disk drive along with associated removable media, a CD-ROM drive, an optical drive, a flash memory such as a USB drive, or removable media cartridges. If computer system 10 includes an input device that performs optical character recognition, then text and symbols printed on a physical object (such as paper) that can be used as a device for storage of program and data files. The databases and modules used by some embodiments can be stored by file storage subsystem 28.

Bus subsystem 12 provides a device for transmitting data and information between the various components and subsystems of computer system 10. Although bus subsystem 12 is depicted as a single bus, alternative embodiments of the bus subsystem can use multiple busses. For example, a main memory using RAM can communicate directly with file storage systems using Direct Memory Access ('DMA') systems.

Figure B depicts a memory 40 such as a non-transitory, processor readable data and information storage medium associated with file storage subsystem 28, and/or with network interface subsystem 16, and can include a data structure specifying a circuit design. The memory 40 can be a hard disk, a floppy disk, a CD-ROM, an optical medium, removable media cartridge, or any other medium that stores computer readable data in a volatile or non-volatile form, such as text and symbols on a physical object (such as paper) that can be processed by an optical character recognition system. A program transferred into and out of a processor from such a memory can be transformed into a physical signal that is propagated through a medium (such as a network, connector, wire, or circuit trace as an electrical pulse); or through a medium such as space or an atmosphere as an acoustic signal, or as electromagnetic radiation with wavelengths in the electromagnetic spectrum longer than infrared light).

Detailed Description—Semantic Support

The signifier 'commercial solution' signifies, solely for the following paragraph, a technology domain-specific (and thus non-preemptive—see Bilski): electronic structure, process for a specified machine, manufacturable circuit (and its Church-Turing equivalents), or a composition of matter that applies science and/or technology for use in commerce to solve an unmet need of technology.

The signifier 'abstract' (when used in a patent claim for any enabled embodiments disclosed herein for a new commercial solution that is a scientific use of one or more laws of nature {see Benson}, and that solves a problem of technology {see Diehr} for use in commerce—or improves upon an existing solution used in commerce {see Diehr})—is precisely defined by the inventor(s) {see MPEP 2111.01 (9th edition, Rev. August 2017)} as follows:
- a) a new commercial solution is 'abstract' if it is not novel (e.g., it is so well known in equal prior art {see Alice} and/or the use of equivalent prior art solutions is long prevalent {see Bilski} in science, engineering or commerce), and thus unpatentable under 35 U.S.C. 102, for example, because it is 'difficult to understand' {see Merriam-Webster definition for 'abstract'} how the commercial solution differs from equivalent prior art solutions; or
- b) a new commercial solution is 'abstract' if the existing prior art includes at least one analogous prior art solution {see KSR}, or the existing prior art includes at least two prior art publications that can be combined {see Alice} by a skilled person {often referred to as a 'PHOSITA', see MPEP 2141-2144 (9th edition, Rev. August 2017)} to be equivalent to the new commercial solution, and is thus unpatentable under 35 U.S.C. 103, for example, because it is 'difficult to understand' how the new commercial solution differs from a PHOSITA-combination/-application of the existing prior art; or
- c) a new commercial solution is 'abstract' if it is not disclosed with a description that enables its praxis, either because insufficient guidance exists in the description, or because only a generic implementation is described {see Mayo} with unspecified components, parameters or functionality, so that a PHOSITA is unable to instantiate an embodiment of the new solution for use in commerce, without, for example, requiring special programming {see Katz} (or, e.g., circuit design) to be performed by the PHOSITA, and is thus unpatentable under 35 U.S.C. 112, for example, because it is 'difficult to understand' how to use in commerce any embodiment of the new commercial solution.

Detailed Description—Conclusion

The Detailed Description signifies in isolation the individual features, structures, functions, or characteristics described herein and any combination of two or more such features, structures, functions or characteristics, to the extent that such features, structures, functions or characteristics or combinations thereof are enabled by the Detailed Description as a whole in light of the knowledge and understanding of a skilled person, irrespective of whether such features, structures, functions or characteristics, or combinations thereof, solve any problems disclosed herein, and without limitation to the scope of the Claims of the patent. When an ECIN comprises a particular feature, structure, function or characteristic, it is within the knowledge and understanding of a skilled person to use such feature, structure, function, or characteristic in connection with another ECIN whether or not explicitly described, for example, as a substitute for another feature, structure, function or characteristic.

In view of the Detailed Description, a skilled person will understand that many variations of any ECIN can be enabled, such as function and structure of elements, described herein while being as useful as the ECIN. One or more elements of an ECIN can be substituted for one or more elements in another ECIN, as will be understood by a skilled person. Writings about any ECIN signify its use in commerce, thereby enabling other skilled people to similarly use this ECIN in commerce.

This Detailed Description is fitly written to provide knowledge and understanding. It is neither exhaustive nor limiting of the precise structures described, but is to be accorded the widest scope consistent with the disclosed principles and features. Without limitation, any and all equivalents described, signified or Incorporated By Reference (or explicitly incorporated) in this patent application are specifically incorporated into the Detailed Description. In addition, any and all variations described, signified or incorporated with respect to any one ECIN also can be included with any other ECIN. Any such variations include both currently known variations as well as future variations, for example any element used for enablement includes a future equivalent element that provides the same function, regardless of the structure of the future equivalent element.

It is intended that the domain of the set of claimed inventions and their embodiments be defined and judged by the following Claims and their equivalents. The Detailed Description includes the following Claims, with each Claim standing on its own as a separate claimed invention. Any ECIN can have more structure and features than are explicitly specified in the Claims.

The invention claimed is:

1. A Tensor Streaming Processor (TSP) that transforms streams of data representing arrays of numerical information with one or more dimensions, comprising:
   at least one host-to-processor communication module for transferring the data between a host computer and the processor; and
   a plurality of superlanes, each superlane of the plurality of superlanes being partitioned into slices, wherein each slice of the slices comprises a set of tiles with the same functionality executing the same instructions, located in similar positions in different superlanes of the plurality of superlanes, wherein the instructions are supplied from buffers that comprise an Instruction Control Unit (ICU), and wherein a set of data processed by one superlane of the plurality of superlanes comprises a stream of data, wherein each superlane of the plurality of superlanes comprises a plurality of functional tiles, wherein data output of a tile in a first set of functional tiles is bidirectionally transferred to data input of a tile in a second set of functional tiles, and wherein the data output of a tile in the second set of functional tiles is bidirectionally transferred to the data input of a tile in the first set of functional tiles.

2. The processor of claim 1, wherein each superlane of the plurality of superlanes comprises a first set of matrix multiplication tiles (MXM1) and a second set of matrix multiplication tiles (MXM2), a first set of data path switching tiles (SXM1) and a second set of data path switching tiles (SXM2), a first set of memory tiles (MEM1) and a second set of memory tiles (MEM2), and a first set of vector calculation modules (VXM1), wherein a single tile in the MXM1 transfers data with a single tile in the SXM1, wherein a single tile in the SXM1 transfers the data with a single tile in the MEM1, wherein a single tile in the MEM1 transfers the data with a single tile in the VXM1, wherein a single tile in the VXM1 transfers the data with a single tile in the MEM2, wherein a single tile in the MEM2 transfers the data with a single tile in the SXM2, and wherein a single tile in the SXM2 transfers the data with a single tile in the MXM2, and wherein the transfers are bidirectional.

3. The processor of claim 1, wherein data moves along one direction in a first superlane of the plurality of superlanes, and wherein the data is transferred on every clock cycle, and wherein after the processing of the data is complete in the first superlane, the data is either returned to the host computer or transferred by tiles in a set of data path switching tiles (SXM) to a second superlane of the plurality of superlanes for additional processing.

4. The processor of claim 2, wherein each tile in a superlane is subdivided into 16 sub-tiles, each sub-tile of the 16 sub-tiles comprising a lane.

5. The processor of claim 1 further comprising a compiler, wherein each superlane of the plurality of superlanes operates on a stream of data representing a plurality of vector, each vector being organized into a rank-2 tensor, and wherein the compiler is configured to transform a higher rank tensor into a rank-2 tensor.

6. The processor of claim 4, wherein the vector calculation module VXM comprises 16 Arithmetic Logic Units (ALU) per lane, wherein each ALU is configured to perform a 32-bit calculation using aligned groups of four stream bytes as operands, and wherein each ALU is configured to perform a set of operations selected from a group consisting of: an arithmetic operation, a logical operation, a conversion between integer and floating-point formats, a common normalization function, an exponentiation, and a reciprocal square root operation.

7. The processor of claim 5 further comprising a main memory and a plurality of stream registers, on each clock cycle a data stream is propagated through the processor by a stream register hop until the data stream either reaches an edge of a first Superlane or is switched to a second Superlane by a data path switching (SXM) module, wherein each instruction generated by the Instruction Control Unit (ICU) is configured to provide direction routing for the data stream.

8. A method of Tensor Streaming Processor programming comprising:
(A) scheduling a plurality of specific data paths; and
(B) using an Instruction Set Architecture (ISA) module to extract temporal information about an instruction's execution latency, wherein a back end of a compiler is configured to track a position and time-of-use of a stream of data propagating through the processor, wherein the ISA module comprises a set of instructions selected from a group consisting of: a NOP instruction, a Repeat instruction, and synchronization instructions Sync and Notify, wherein the synchronization instructions Sync and Notify are configured to allow functional slices to be initially synchronized, wherein the compiler is configured to determine instruction execution times, and wherein the compiler is configured to enable cooperative parallelism among the functional slices.

9. The method of claim 8, wherein (B) further comprises:
(B1) retrieving pages of instructions from Memory Storage and Retrieval (MEM) partitions;
(B2) providing explicit instruction fetching for the slices by sending fetch instructions across side channels in memory slices;
(B3) providing inter-slice synchronization using the synchronization instructions Sync and Notify to perform a chip-wide barrier synchronization among participating functional slices;
(B4) using explicit NOPs instructions to provide temporal separation between two instructions in the program order; and
(B5) receiving the explicit NOPs instructions from a memory back along the same side channel.

10. The method of claim 9 further comprising:
(C) using one or more superlanes of a set of 20 Superlanes for processing streams of data in 16 lanes, wherein an instruction is performed on all 16 lanes of a first superlane at once in a first cycle, wherein the instruction is performed on all 16 lanes of a second superlane at once in a second cycle, and wherein, over 20 cycles, each instruction is performed on all 320 lanes across the set of 20 superlanes.

* * * * *